US012761617B2

(12) United States Patent
Ramanasankaran et al.

(10) Patent No.: US 12,761,617 B2
(45) Date of Patent: Oct. 13, 2026

(54) BUILDING DATA PLATFORM WITH POLICY LEARNING FOR DIGITAL TWINS

(71) Applicant: Tyco Fire & Security GmbH, Neuhausen am Rheinfall (CH)

(72) Inventors: Rajiv Ramanasankaran, San Jose, CA (US); Michael James Risbeck, Madison, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 943 days.

(21) Appl. No.: 18/083,387

(22) Filed: Dec. 16, 2022

(65) Prior Publication Data

US 2023/0195066 A1 Jun. 22, 2023

Related U.S. Application Data

(60) Provisional application No. 63/292,357, filed on Dec. 21, 2021.

(51) Int. Cl.
*G05B 19/042* (2006.01)

(52) U.S. Cl.
CPC .. *G05B 19/042* (2013.01); *G05B 2219/25011* (2013.01)

(58) Field of Classification Search
CPC .................................................... G05B 19/042
USPC ........................................................... 700/28
See application file for complete search history.

(56) References Cited

U.S. PATENT DOCUMENTS 5,301,109 A 4/1994 Landauer et al.
5,446,677 A 8/1995 Jensen et al.
5,581,478 A 12/1996 Cruse et al.
5,812,962 A 9/1998 Kovac
5,960,381 A 9/1999 Singers et al.
5,973,662 A 10/1999 Singers et al.
6,014,612 A 1/2000 Larson et al.
(Continued)

FOREIGN PATENT DOCUMENTS

AU 2019226217 A1 11/2020
AU 2019226264 A1 11/2020
(Continued)

OTHER PUBLICATIONS

U.S. Appl. No. 17/566,029, Passivelogic, Inc.
(Continued)

*Primary Examiner* — Mohammad Ali
*Assistant Examiner* — Joshua T Sanders
(74) *Attorney, Agent, or Firm* — Foley & Lardner LLP

(57) ABSTRACT

A building system of a building operates to select an instance of one or more entities of one or more particular entity types from a digital twin of the building for creating a policy function, the digital twin including representations of entities of the building and relationships between the entities of the building. The building system operates to perform an optimization that selects one or more inputs of inputs associated with the one or more entities for input to the policy function, selects one or more actions of actions associated with the one or more entities that are outputs of the policy function, and identifies one or more parameters for the policy function. The building system operates to deploy the policy function for the one or more entities by causing the digital twin to include the policy function.

20 Claims, 37 Drawing Sheets

(56) References Cited

U.S. PATENT DOCUMENTS

| | | | |
|---|---|---|---|
| 6,031,547 | A | 2/2000 | Kennedy |
| 6,134,511 | A | 10/2000 | Subbarao |
| 6,157,943 | A | 12/2000 | Meyer |
| 6,285,966 | B1 | 9/2001 | Brown et al. |
| 6,363,422 | B1 | 3/2002 | Hunter et al. |
| 6,385,510 | B1 | 5/2002 | Hoog et al. |
| 6,389,331 | B1 | 5/2002 | Jensen et al. |
| 6,401,027 | B1 | 6/2002 | Xu et al. |
| 6,437,691 | B1 | 8/2002 | Sandelman et al. |
| 6,477,518 | B1 | 11/2002 | Li et al. |
| 6,487,457 | B1 | 11/2002 | Hull et al. |
| 6,493,755 | B1 | 12/2002 | Hansen et al. |
| 6,577,323 | B1 | 6/2003 | Jamieson et al. |
| 6,626,366 | B2 | 9/2003 | Kayahara et al. |
| 6,646,660 | B1 | 11/2003 | Patty |
| 6,704,016 | B1 | 3/2004 | Oliver et al. |
| 6,732,540 | B2 | 5/2004 | Sugihara et al. |
| 6,764,019 | B1 | 7/2004 | Kayahara et al. |
| 6,782,385 | B2 | 8/2004 | Natsumeda et al. |
| 6,813,532 | B2 | 11/2004 | Eryurek et al. |
| 6,816,811 | B2 | 11/2004 | Seem |
| 6,823,680 | B2 | 11/2004 | Jayanth |
| 6,826,454 | B2 | 11/2004 | Sulfstede |
| 6,865,511 | B2 | 3/2005 | Frerichs et al. |
| 6,925,338 | B2 | 8/2005 | Eryurek et al. |
| 6,986,138 | B1 | 1/2006 | Sakaguchi et al. |
| 7,031,880 | B1 | 4/2006 | Seem et al. |
| 7,401,057 | B2 | 7/2008 | Eder |
| 7,552,467 | B2 | 6/2009 | Lindsay |
| 7,627,544 | B2 | 12/2009 | Chkodrov et al. |
| 7,818,249 | B2 | 10/2010 | Lovejoy et al. |
| 7,889,051 | B1 | 2/2011 | Billig et al. |
| 7,996,488 | B1 | 8/2011 | Casabella et al. |
| 8,078,330 | B2 | 12/2011 | Brickfield et al. |
| 8,104,044 | B1 | 1/2012 | Scofield et al. |
| 8,229,470 | B1 | 7/2012 | Ranjan et al. |
| 8,401,991 | B2 | 3/2013 | Wu et al. |
| 8,495,745 | B1 | 7/2013 | Schrecker et al. |
| 8,516,016 | B2 | 8/2013 | Park et al. |
| 8,532,808 | B2 | 9/2013 | Drees et al. |
| 8,532,839 | B2 | 9/2013 | Drees et al. |
| 8,600,556 | B2 | 12/2013 | Nesler et al. |
| 8,635,182 | B2 | 1/2014 | Mackay |
| 8,682,921 | B2 | 3/2014 | Park et al. |
| 8,731,724 | B2 | 5/2014 | Drees et al. |
| 8,737,334 | B2 | 5/2014 | Ahn et al. |
| 8,738,334 | B2 | 5/2014 | Jiang et al. |
| 8,751,487 | B2 | 6/2014 | Byrne et al. |
| 8,788,097 | B2 | 7/2014 | Drees et al. |
| 8,805,995 | B1 | 8/2014 | Oliver |
| 8,843,238 | B2 | 9/2014 | Wenzel et al. |
| 8,874,071 | B2 | 10/2014 | Sherman et al. |
| 8,941,465 | B2 | 1/2015 | Pineau et al. |
| 8,990,127 | B2 | 3/2015 | Taylor |
| 9,070,113 | B2 | 6/2015 | Shafiee et al. |
| 9,116,978 | B2 | 8/2015 | Park et al. |
| 9,185,095 | B1 | 11/2015 | Moritz et al. |
| 9,189,527 | B2 | 11/2015 | Park et al. |
| 9,196,009 | B2 | 11/2015 | Drees et al. |
| 9,229,966 | B2 | 1/2016 | Aymeloglu et al. |
| 9,286,582 | B2 | 3/2016 | Drees et al. |
| 9,311,807 | B2 | 4/2016 | Schultz et al. |
| 9,344,751 | B1 | 5/2016 | Ream et al. |
| 9,354,968 | B2 | 5/2016 | Wenzel et al. |
| 9,507,686 | B2 | 11/2016 | Horn et al. |
| 9,524,594 | B2 | 12/2016 | Ouyang et al. |
| 9,558,196 | B2 | 1/2017 | Johnston et al. |
| 9,652,813 | B2 | 5/2017 | Gifford et al. |
| 9,753,455 | B2 | 9/2017 | Drees |
| 9,811,249 | B2 | 11/2017 | Chen et al. |
| 9,838,844 | B2 | 12/2017 | Emeis et al. |
| 9,886,478 | B2 | 2/2018 | Mukherjee |
| 9,948,359 | B2 | 4/2018 | Horton |
| 10,055,114 | B2 | 8/2018 | Shah et al. |
| 10,055,206 | B2 | 8/2018 | Park et al. |
| 10,116,461 | B2 | 10/2018 | Fairweather et al. |
| 10,169,454 | B2 | 1/2019 | Ait-Mokhtar et al. |
| 10,171,297 | B2 | 1/2019 | Stewart et al. |
| 10,171,586 | B2 | 1/2019 | Shaashua et al. |
| 10,187,258 | B2 | 1/2019 | Nagesh et al. |
| 10,514,963 | B2 | 12/2019 | Shrivastava et al. |
| 10,515,098 | B2 | 12/2019 | Park et al. |
| 10,534,326 | B2 | 1/2020 | Sridharan et al. |
| 10,536,295 | B2 | 1/2020 | Fairweather et al. |
| 10,564,993 | B2 | 2/2020 | Deutsch et al. |
| 10,705,492 | B2 | 7/2020 | Harvey |
| 10,708,078 | B2 | 7/2020 | Harvey |
| 10,760,815 | B2 | 9/2020 | Janakiraman et al. |
| 10,762,475 | B2 | 9/2020 | Song et al. |
| 10,824,120 | B2 | 11/2020 | Ahmed |
| 10,845,771 | B2 | 11/2020 | Harvey |
| 10,854,194 | B2 | 12/2020 | Park et al. |
| 10,862,928 | B1 | 12/2020 | Badawy et al. |
| 10,921,760 | B2 | 2/2021 | Harvey |
| 10,921,972 | B2 | 2/2021 | Park et al. |
| 10,969,133 | B2 | 4/2021 | Harvey |
| 10,986,121 | B2 | 4/2021 | Stockdale et al. |
| 11,016,998 | B2 | 5/2021 | Park et al. |
| 11,024,292 | B2 | 6/2021 | Park et al. |
| 11,038,709 | B2 | 6/2021 | Park et al. |
| 11,041,650 | B2 | 6/2021 | Li et al. |
| 11,054,796 | B2 | 7/2021 | Holaso |
| 11,070,390 | B2 | 7/2021 | Park et al. |
| 11,073,976 | B2 | 7/2021 | Park et al. |
| 11,108,587 | B2 | 8/2021 | Park et al. |
| 11,113,295 | B2 | 9/2021 | Park et al. |
| 11,229,138 | B1 | 1/2022 | Harvey et al. |
| 11,314,726 | B2 | 4/2022 | Park et al. |
| 11,314,788 | B2 | 4/2022 | Park et al. |
| 11,556,105 | B2 | 1/2023 | Cooley et al. |
| 11,561,522 | B2 | 1/2023 | Cooley et al. |
| 11,561,523 | B2 | 1/2023 | Cooley et al. |
| 11,573,551 | B2 | 2/2023 | Cooley et al. |
| 11,586,167 | B2 | 2/2023 | Cooley et al. |
| 2002/0010562 | A1 | 1/2002 | Schleiss et al. |
| 2002/0016639 | A1 | 2/2002 | Smith et al. |
| 2002/0059229 | A1 | 5/2002 | Natsumeda et al. |
| 2002/0123864 | A1 | 9/2002 | Eryurek et al. |
| 2002/0147506 | A1 | 10/2002 | Eryurek et al. |
| 2002/0177909 | A1 | 11/2002 | Fu et al. |
| 2003/0005486 | A1 | 1/2003 | Ridolfo et al. |
| 2003/0014130 | A1 | 1/2003 | Grumelart |
| 2003/0073432 | A1 | 4/2003 | Meade, II |
| 2003/0158704 | A1 | 8/2003 | Triginai et al. |
| 2003/0171851 | A1 | 9/2003 | Brickfield et al. |
| 2003/0200059 | A1 | 10/2003 | Ignatowski et al. |
| 2004/0068390 | A1 | 4/2004 | Saunders |
| 2004/0128314 | A1 | 7/2004 | Katibah et al. |
| 2004/0133314 | A1 | 7/2004 | Ehlers et al. |
| 2004/0199360 | A1 | 10/2004 | Friman et al. |
| 2005/0055308 | A1 | 3/2005 | Meyer et al. |
| 2005/0108262 | A1 | 5/2005 | Fawcett et al. |
| 2005/0154494 | A1 | 7/2005 | Ahmed |
| 2005/0278703 | A1 | 12/2005 | Lo et al. |
| 2005/0283337 | A1 | 12/2005 | Sayal |
| 2006/0095521 | A1 | 5/2006 | Patinkin |
| 2006/0140207 | A1 | 6/2006 | Eschbach et al. |
| 2006/0184479 | A1 | 8/2006 | Levine |
| 2006/0200476 | A1 | 9/2006 | Gottumukkala et al. |
| 2006/0265751 | A1 | 11/2006 | Cosquer et al. |
| 2006/0271589 | A1 | 11/2006 | Horowitz et al. |
| 2007/0028179 | A1 | 2/2007 | Levin et al. |
| 2007/0203693 | A1 | 8/2007 | Estes |
| 2007/0261062 | A1 | 11/2007 | Bansal et al. |
| 2007/0273497 | A1 | 11/2007 | Kuroda et al. |
| 2007/0273610 | A1 | 11/2007 | Baillot |
| 2008/0034425 | A1 | 2/2008 | Overcash et al. |
| 2008/0094230 | A1 | 4/2008 | Mock et al. |
| 2008/0097816 | A1 | 4/2008 | Freire et al. |
| 2008/0186160 | A1 | 8/2008 | Kim et al. |
| 2008/0249756 | A1 | 10/2008 | Chaisuparasmikul |
| 2008/0252723 | A1 | 10/2008 | Park |
| 2008/0281472 | A1 | 11/2008 | Podgorny et al. |
| 2009/0195349 | A1 | 8/2009 | Frader-Thompson et al. |

(56) References Cited

U.S. PATENT DOCUMENTS

| | | | |
|---|---|---|---|
| 2010/0045439 | A1 | 2/2010 | Tak et al. |
| 2010/0058248 | A1 | 3/2010 | Park |
| 2010/0131533 | A1 | 5/2010 | Ortiz |
| 2010/0274366 | A1 | 10/2010 | Fata et al. |
| 2010/0281387 | A1 | 11/2010 | Holland et al. |
| 2010/0286937 | A1 | 11/2010 | Hedley et al. |
| 2010/0324962 | A1 | 12/2010 | Nesler et al. |
| 2011/0015802 | A1 | 1/2011 | Imes |
| 2011/0047418 | A1 | 2/2011 | Drees et al. |
| 2011/0061015 | A1 | 3/2011 | Drees et al. |
| 2011/0071685 | A1 | 3/2011 | Huneycutt et al. |
| 2011/0077950 | A1 | 3/2011 | Hughston |
| 2011/0087650 | A1 | 4/2011 | Mackay et al. |
| 2011/0087988 | A1 | 4/2011 | Ray et al. |
| 2011/0088000 | A1 | 4/2011 | Mackay |
| 2011/0125737 | A1 | 5/2011 | Pothering et al. |
| 2011/0137853 | A1 | 6/2011 | Mackay |
| 2011/0153603 | A1 | 6/2011 | Adiba et al. |
| 2011/0154363 | A1 | 6/2011 | Karmarkar |
| 2011/0157357 | A1 | 6/2011 | Weisensale et al. |
| 2011/0178977 | A1 | 7/2011 | Drees |
| 2011/0191343 | A1 | 8/2011 | Heaton et al. |
| 2011/0205022 | A1 | 8/2011 | Cavallaro et al. |
| 2011/0218777 | A1 | 9/2011 | Chen et al. |
| 2012/0011126 | A1 | 1/2012 | Park et al. |
| 2012/0011141 | A1 | 1/2012 | Park et al. |
| 2012/0022698 | A1 | 1/2012 | Mackay |
| 2012/0062577 | A1 | 3/2012 | Nixon |
| 2012/0064923 | A1 | 3/2012 | Imes et al. |
| 2012/0083930 | A1 | 4/2012 | Ilic et al. |
| 2012/0100825 | A1 | 4/2012 | Sherman et al. |
| 2012/0101637 | A1 | 4/2012 | Imes et al. |
| 2012/0135759 | A1 | 5/2012 | Imes et al. |
| 2012/0136485 | A1 | 5/2012 | Weber et al. |
| 2012/0158633 | A1 | 6/2012 | Eder |
| 2012/0259583 | A1 | 10/2012 | Noboa et al. |
| 2012/0272228 | A1 | 10/2012 | Marndi et al. |
| 2012/0278051 | A1 | 11/2012 | Jiang et al. |
| 2013/0007063 | A1 | 1/2013 | Kalra et al. |
| 2013/0038430 | A1 | 2/2013 | Blower et al. |
| 2013/0038707 | A1 | 2/2013 | Cunningham et al. |
| 2013/0060820 | A1 | 3/2013 | Bulusu et al. |
| 2013/0086497 | A1 | 4/2013 | Ambuhl et al. |
| 2013/0097706 | A1 | 4/2013 | Titonis et al. |
| 2013/0103221 | A1 | 4/2013 | Raman et al. |
| 2013/0167035 | A1 | 6/2013 | Imes et al. |
| 2013/0170710 | A1 | 7/2013 | Kuoch et al. |
| 2013/0204836 | A1 | 8/2013 | Choi et al. |
| 2013/0246916 | A1 | 9/2013 | Reimann et al. |
| 2013/0247205 | A1 | 9/2013 | Schrecker et al. |
| 2013/0262035 | A1 | 10/2013 | Mills |
| 2013/0275174 | A1 | 10/2013 | Bennett et al. |
| 2013/0275908 | A1 | 10/2013 | Reichard |
| 2013/0297050 | A1 | 11/2013 | Reichard et al. |
| 2013/0298244 | A1 | 11/2013 | Kumar et al. |
| 2013/0331995 | A1 | 12/2013 | Rosen |
| 2013/0338970 | A1 | 12/2013 | Reghetti |
| 2014/0032506 | A1 | 1/2014 | Hoey et al. |
| 2014/0059483 | A1 | 2/2014 | Mairs et al. |
| 2014/0081652 | A1 | 3/2014 | Klindworth |
| 2014/0135952 | A1 | 5/2014 | Maehara |
| 2014/0152651 | A1 | 6/2014 | Chen et al. |
| 2014/0172184 | A1 | 6/2014 | Schmidt et al. |
| 2014/0189861 | A1 | 7/2014 | Gupta et al. |
| 2014/0207282 | A1 | 7/2014 | Angle et al. |
| 2014/0258052 | A1 | 9/2014 | Khuti et al. |
| 2014/0269614 | A1 | 9/2014 | Maguire et al. |
| 2014/0277765 | A1 | 9/2014 | Karimi et al. |
| 2014/0278461 | A1 | 9/2014 | Artz |
| 2014/0327555 | A1 | 11/2014 | Sager et al. |
| 2015/0019174 | A1 | 1/2015 | Kiff et al. |
| 2015/0042240 | A1 | 2/2015 | Aggarwal et al. |
| 2015/0105917 | A1 | 4/2015 | Sasaki et al. |
| 2015/0145468 | A1 | 5/2015 | Ma et al. |
| 2015/0156031 | A1 | 6/2015 | Fadell et al. |
| 2015/0168931 | A1 | 6/2015 | Jin |
| 2015/0172300 | A1 | 6/2015 | Cochenour |
| 2015/0178421 | A1 | 6/2015 | Borrelli et al. |
| 2015/0185261 | A1 | 7/2015 | Frader-Thompson et al. |
| 2015/0186777 | A1 | 7/2015 | Lecue et al. |
| 2015/0202962 | A1 | 7/2015 | Habashima et al. |
| 2015/0204563 | A1 | 7/2015 | Imes et al. |
| 2015/0235267 | A1 | 8/2015 | Steube et al. |
| 2015/0241895 | A1 | 8/2015 | Lu et al. |
| 2015/0244730 | A1 | 8/2015 | Vu et al. |
| 2015/0244732 | A1 | 8/2015 | Golshan et al. |
| 2015/0261863 | A1 | 9/2015 | Dey et al. |
| 2015/0263900 | A1 | 9/2015 | Polyakov et al. |
| 2015/0286969 | A1 | 10/2015 | Warner et al. |
| 2015/0295796 | A1 | 10/2015 | Hsiao et al. |
| 2015/0304193 | A1 | 10/2015 | Ishii et al. |
| 2015/0316918 | A1 | 11/2015 | Schleiss et al. |
| 2015/0324422 | A1 | 11/2015 | Elder |
| 2015/0341212 | A1 | 11/2015 | Hsiao et al. |
| 2015/0348417 | A1 | 12/2015 | Ignaczak et al. |
| 2015/0379080 | A1 | 12/2015 | Jochimski |
| 2016/0011753 | A1 | 1/2016 | McFarland et al. |
| 2016/0033946 | A1 | 2/2016 | Zhu et al. |
| 2016/0035246 | A1 | 2/2016 | Curtis |
| 2016/0065601 | A1 | 3/2016 | Gong et al. |
| 2016/0070736 | A1 | 3/2016 | Swan et al. |
| 2016/0078229 | A1 | 3/2016 | Gong et al. |
| 2016/0090839 | A1 | 3/2016 | Stolarczyk |
| 2016/0119434 | A1 | 4/2016 | Dong et al. |
| 2016/0127712 | A1 | 5/2016 | Alfredsson et al. |
| 2016/0139752 | A1 | 5/2016 | Shim et al. |
| 2016/0163186 | A1 | 6/2016 | Davidson et al. |
| 2016/0170390 | A1 | 6/2016 | Xie et al. |
| 2016/0171862 | A1 | 6/2016 | Das et al. |
| 2016/0173816 | A1 | 6/2016 | Huenerfauth et al. |
| 2016/0179315 | A1 | 6/2016 | Sarao et al. |
| 2016/0179342 | A1 | 6/2016 | Sarao et al. |
| 2016/0179990 | A1 | 6/2016 | Sarao et al. |
| 2016/0195856 | A1 | 7/2016 | Spero |
| 2016/0212165 | A1 | 7/2016 | Singla et al. |
| 2016/0239660 | A1 | 8/2016 | Azvine et al. |
| 2016/0239756 | A1 | 8/2016 | Aggour et al. |
| 2016/0247129 | A1 | 8/2016 | Song et al. |
| 2016/0260063 | A1 | 9/2016 | Harris et al. |
| 2016/0313751 | A1 | 10/2016 | Risbeck et al. |
| 2016/0313752 | A1 | 10/2016 | Przybylski |
| 2016/0313902 | A1 | 10/2016 | Hill et al. |
| 2016/0350364 | A1 | 12/2016 | Anicic et al. |
| 2016/0357521 | A1 | 12/2016 | Zhang et al. |
| 2016/0357828 | A1 | 12/2016 | Tobin et al. |
| 2016/0358432 | A1 | 12/2016 | Branscomb et al. |
| 2016/0363336 | A1 | 12/2016 | Roth et al. |
| 2016/0370258 | A1 | 12/2016 | Perez |
| 2016/0378306 | A1 | 12/2016 | Kresl et al. |
| 2016/0379326 | A1 | 12/2016 | Chan-Gove et al. |
| 2017/0006135 | A1 | 1/2017 | Siebel |
| 2017/0011318 | A1 | 1/2017 | Vigano et al. |
| 2017/0017221 | A1 | 1/2017 | Lamparter et al. |
| 2017/0039255 | A1 | 2/2017 | Raj et al. |
| 2017/0052536 | A1 | 2/2017 | Warner et al. |
| 2017/0053441 | A1 | 2/2017 | Nadumane et al. |
| 2017/0063894 | A1 | 3/2017 | Muddu et al. |
| 2017/0068409 | A1 | 3/2017 | Nair |
| 2017/0070775 | A1 | 3/2017 | Taxier et al. |
| 2017/0075984 | A1 | 3/2017 | Deshpande et al. |
| 2017/0084168 | A1 | 3/2017 | Janchookiat |
| 2017/0090437 | A1 | 3/2017 | Veeramani et al. |
| 2017/0093700 | A1 | 3/2017 | Gilley et al. |
| 2017/0098086 | A1 | 4/2017 | Hoernecke et al. |
| 2017/0103327 | A1 | 4/2017 | Penilla et al. |
| 2017/0103403 | A1 | 4/2017 | Chu et al. |
| 2017/0123389 | A1 | 5/2017 | Baez et al. |
| 2017/0134415 | A1 | 5/2017 | Muddu et al. |
| 2017/0177715 | A1 | 6/2017 | Chang et al. |
| 2017/0180147 | A1 | 6/2017 | Brandman et al. |
| 2017/0188216 | A1 | 6/2017 | Koskas et al. |
| 2017/0212482 | A1 | 7/2017 | Boettcher et al. |
| 2017/0212668 | A1 | 7/2017 | Shah et al. |
| 2017/0220641 | A1 | 8/2017 | Chi et al. |

(56) References Cited

U.S. PATENT DOCUMENTS

| | | | |
|---|---|---|---|
| 2017/0230930 | A1 | 8/2017 | Frey |
| 2017/0235817 | A1 | 8/2017 | Deodhar et al. |
| 2017/0251182 | A1 | 8/2017 | Siminoff et al. |
| 2017/0270124 | A1 | 9/2017 | Nagano et al. |
| 2017/0277769 | A1 | 9/2017 | Pasupathy et al. |
| 2017/0278003 | A1 | 9/2017 | Liu |
| 2017/0294132 | A1 | 10/2017 | Colmenares |
| 2017/0315522 | A1 | 11/2017 | Kwon et al. |
| 2017/0315697 | A1 | 11/2017 | Jacobson et al. |
| 2017/0322534 | A1 | 11/2017 | Sinha et al. |
| 2017/0323389 | A1 | 11/2017 | Vavrasek |
| 2017/0329289 | A1 | 11/2017 | Kohn et al. |
| 2017/0336770 | A1 | 11/2017 | Macmillan |
| 2017/0345287 | A1 | 11/2017 | Fuller et al. |
| 2017/0351957 | A1 | 12/2017 | Lecue et al. |
| 2017/0357225 | A1 | 12/2017 | Asp et al. |
| 2017/0357490 | A1 | 12/2017 | Park et al. |
| 2017/0357908 | A1 | 12/2017 | Cabadi et al. |
| 2018/0012159 | A1 | 1/2018 | Kozloski et al. |
| 2018/0013579 | A1 | 1/2018 | Fairweather et al. |
| 2018/0024520 | A1 | 1/2018 | Sinha et al. |
| 2018/0039238 | A1 | 2/2018 | Gärtner et al. |
| 2018/0048485 | A1 | 2/2018 | Pelton et al. |
| 2018/0069932 | A1 | 3/2018 | Tiwari et al. |
| 2018/0114140 | A1 | 4/2018 | Chen et al. |
| 2018/0137288 | A1 | 5/2018 | Polyakov |
| 2018/0157930 | A1 | 6/2018 | Rutschman et al. |
| 2018/0162400 | A1 | 6/2018 | Abdar |
| 2018/0176241 | A1 | 6/2018 | Manadhata et al. |
| 2018/0198627 | A1 | 7/2018 | Mullins |
| 2018/0203961 | A1 | 7/2018 | Aisu et al. |
| 2018/0239982 | A1 | 8/2018 | Rutschman et al. |
| 2018/0275625 | A1 | 9/2018 | Park et al. |
| 2018/0276962 | A1 | 9/2018 | Butler et al. |
| 2018/0292797 | A1 | 10/2018 | Lamparter et al. |
| 2018/0336785 | A1 | 11/2018 | Ghannam et al. |
| 2018/0356775 | A1 | 12/2018 | Harvey |
| 2018/0359111 | A1 | 12/2018 | Harvey |
| 2018/0364654 | A1 | 12/2018 | Locke et al. |
| 2019/0005025 | A1 | 1/2019 | Malabarba |
| 2019/0013023 | A1 | 1/2019 | Pourmohammad et al. |
| 2019/0025771 | A1 | 1/2019 | Park et al. |
| 2019/0037135 | A1 | 1/2019 | Hedge |
| 2019/0042988 | A1 | 2/2019 | Brown et al. |
| 2019/0088106 | A1 | 3/2019 | Grundstrom |
| 2019/0094824 | A1 | 3/2019 | Xie et al. |
| 2019/0096217 | A1 | 3/2019 | Pourmohammad et al. |
| 2019/0102840 | A1 | 4/2019 | Perl et al. |
| 2019/0121801 | A1 | 4/2019 | Jethwa et al. |
| 2019/0138512 | A1 | 5/2019 | Pourmohammad et al. |
| 2019/0147883 | A1 | 5/2019 | Mellenthin et al. |
| 2019/0158309 | A1* | 5/2019 | Park .................... H04L 12/2812 |
| 2019/0163152 | A1 | 5/2019 | Worrall et al. |
| 2019/0163215 | A1* | 5/2019 | Cheng .................... G05B 15/02 |
| 2019/0268178 | A1 | 8/2019 | Fairweather et al. |
| 2019/0310979 | A1 | 10/2019 | Masuzaki et al. |
| 2019/0377306 | A1 | 12/2019 | Harvey |
| 2020/0226156 | A1 | 7/2020 | Borra et al. |
| 2020/0285203 | A1 | 9/2020 | Thakur et al. |
| 2020/0336328 | A1 | 10/2020 | Harvey |
| 2020/0348632 | A1 | 11/2020 | Harvey |
| 2020/0387576 | A1 | 12/2020 | Brett et al. |
| 2020/0396208 | A1 | 12/2020 | Brett et al. |
| 2021/0042299 | A1 | 2/2021 | Migliori |
| 2021/0043221 | A1 | 2/2021 | Yelchuru et al. |
| 2021/0313075 | A1 | 10/2021 | Mc Namara et al. |
| 2021/0325070 | A1 | 10/2021 | Endel et al. |
| 2021/0342961 | A1 | 11/2021 | Winter et al. |
| 2021/0381711 | A1 | 12/2021 | Harvey et al. |
| 2021/0381712 | A1 | 12/2021 | Harvey et al. |
| 2021/0382445 | A1 | 12/2021 | Harvey et al. |
| 2021/0383041 | A1* | 12/2021 | Harvey ................ G05B 19/042 |
| 2021/0383042 | A1 | 12/2021 | Harvey et al. |
| 2021/0383200 | A1 | 12/2021 | Harvey et al. |
| 2021/0383219 | A1 | 12/2021 | Harvey et al. |
| 2021/0383235 | A1 | 12/2021 | Harvey et al. |
| 2021/0383236 | A1 | 12/2021 | Harvey et al. |
| 2022/0066402 | A1 | 3/2022 | Harvey et al. |
| 2022/0066405 | A1 | 3/2022 | Harvey |
| 2022/0066432 | A1 | 3/2022 | Harvey et al. |
| 2022/0066434 | A1 | 3/2022 | Harvey et al. |
| 2022/0066528 | A1 | 3/2022 | Harvey et al. |
| 2022/0066722 | A1 | 3/2022 | Harvey et al. |
| 2022/0066754 | A1 | 3/2022 | Harvey et al. |
| 2022/0066761 | A1 | 3/2022 | Harvey et al. |
| 2022/0067226 | A1 | 3/2022 | Harvey et al. |
| 2022/0067227 | A1 | 3/2022 | Harvey et al. |
| 2022/0067230 | A1 | 3/2022 | Harvey et al. |
| 2022/0069863 | A1 | 3/2022 | Harvey et al. |
| 2022/0070293 | A1 | 3/2022 | Harvey et al. |
| 2022/0121965 | A1 | 4/2022 | Chatterji et al. |
| 2022/0136722 | A1* | 5/2022 | Sharma .............. G05B 19/0421 700/300 |
| 2022/0138684 | A1 | 5/2022 | Harvey |
| 2022/0147000 | A1 | 5/2022 | Cooley et al. |
| 2022/0150124 | A1 | 5/2022 | Cooley et al. |
| 2022/0203287 | A1 | 6/2022 | Wenger et al. |
| 2022/0203288 | A1 | 6/2022 | Wenger et al. |
| 2022/0205962 | A1 | 6/2022 | Vanderkoy |
| 2022/0207215 | A1 | 6/2022 | Liu et al. |
| 2022/0215264 | A1 | 7/2022 | Harvey et al. |
| 2022/0228756 | A1 | 7/2022 | Gupta et al. |
| 2022/0254483 | A1 | 8/2022 | Boisvert et al. |
| 2022/0277851 | A1 | 9/2022 | Wellig |
| 2022/0282886 | A1 | 9/2022 | Hriljac et al. |
| 2022/0305438 | A1 | 9/2022 | Wenger et al. |
| 2022/0305881 | A1 | 9/2022 | Neu et al. |
| 2023/0010757 | A1 | 1/2023 | Preciado |
| 2023/0071312 | A1 | 3/2023 | Preciado et al. |
| 2023/0076011 | A1 | 3/2023 | Preciado et al. |
| 2023/0083703 | A1 | 3/2023 | Meiners |

FOREIGN PATENT DOCUMENTS

| | | | |
|---|---|---|---|
| CN | 101415011 | A | 4/2009 |
| CN | 102136099 | A | 7/2011 |
| CN | 102136100 | A | 7/2011 |
| CN | 102650876 | A | 8/2012 |
| CN | 104040583 | A | 9/2014 |
| CN | 104603832 | A | 5/2015 |
| CN | 104919484 | A | 9/2015 |
| CN | 106204392 | A | 12/2016 |
| CN | 106406806 | A | 2/2017 |
| CN | 106960269 | A | 7/2017 |
| CN | 107147639 | A1 | 9/2017 |
| CN | 107598928 | A | 1/2018 |
| EP | 2 528 033 | A1 | 11/2012 |
| EP | 3 268 821 | B1 | 1/2018 |
| EP | 3 324 306 | A1 | 5/2018 |
| EP | 4 226 263 | A1 | 8/2023 |
| JP | H10-049552 | A | 2/1998 |
| JP | 2003-162573 | A | 6/2003 |
| JP | 2007-018322 | A | 1/2007 |
| JP | 4073946 | B1 | 4/2008 |
| JP | 2008-107930 | A | 5/2008 |
| JP | 2013-152618 | A | 8/2013 |
| JP | 2014-044457 | A | 3/2014 |
| KR | 2016/0102923 | A | 8/2016 |
| WO | WO-2009/020158 | A1 | 2/2009 |
| WO | WO-2011/100255 | A2 | 8/2011 |
| WO | WO-2013/050333 | A1 | 4/2013 |
| WO | WO-2015/106702 | A1 | 7/2015 |
| WO | WO-2015/145648 | A1 | 10/2015 |
| WO | WO-2017/035536 | A1 | 3/2017 |
| WO | WO-2017/192422 | A1 | 11/2017 |
| WO | WO-2017/194244 | A1 | 11/2017 |
| WO | WO-2017/205330 | A1 | 11/2017 |
| WO | WO-2017/213918 | A1 | 12/2017 |
| WO | WO-2018/132112 | A1 | 7/2018 |
| WO | WO-2020/061621 | A1 | 4/2020 |
| WO | WO-2022/042925 | A1 | 3/2022 |
| WO | WO-2022/103812 | A1 | 5/2022 |
| WO | WO-2022/103813 | A1 | 5/2022 |
| WO | WO-2022/103820 | A1 | 5/2022 |

(56) References Cited

FOREIGN PATENT DOCUMENTS

| | | | |
|---|---|---|---|
| WO | WO-2022/103822 | A1 | 5/2022 |
| WO | WO-2022/103824 | A1 | 5/2022 |
| WO | WO-2022/103829 | A1 | 5/2022 |
| WO | WO-2022/103831 | A1 | 5/2022 |

OTHER PUBLICATIONS

U.S. Appl. No. 17/567,275, Passivelogic, Inc.
U.S. Appl. No. 17/722,115, Passivelogic, Inc.
U.S. Appl. No. 17/528,026, filed Nov. 16, 2021, Johnson Controls Tyco IP Holdings LLP.
U.S. Appl. No. 17/528,038, filed Nov. 16, 2021, Johnson Controls Tyco IP Holdings LLP.
Balaji et al, "Brick: Metadata schema for portable smart building applications," Applied Energy, 2018 (20 pages).
Balaji et al, "Brick: Metadata schema for portable smart building applications," Applied Energy, Sep. 15, 2018, 3 pages, (Abstract).
Balaji et al, "Demo Abstract: Portable Queries Using the Brick Schema for Building Applications," BuildSys '16, Palo Alto, CA, USA, Nov. 16-17, 2016 (2 pages).
Balaji, B. et al., "Brick: Towards a Unified Metadata Schema for Buildings." BuildSys '16, Palo Alto, CA, USA, Nov. 16-17, 2016 (10 pages).
Bhattacharya et al., "Short Paper: Analyzing Metadata Schemas for Buildings—The Good, the Bad and the Ugly," BuildSys '15, Seoul, South Korea, Nov. 4-5, 2015 (4 pages).
Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).
Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).
Brick, "Brick: Towards a Unified Metadata Schema for Buildings," URL: chrome-extension://efaidnbmnnnibpcajpcglclefindmkaj/https://brickschema.org/papers/Brick_BuildSys_Presentation.pdf, Presented at BuildSys '16, Nov. 2016 (46 pages).
Brick, "Metadata Schema for Buildings," URL: https://brickschema.org/docs/Brick-Leaflet.pdf, retrieved from internet Dec. 24, 2019 (3 pages).
Chinese Office Action on CN Appl. No. 201780003995.9 dated Apr. 8, 2021 (21 pages with English language translation).
Chinese Office action on CN Appl. No. 201780043400.2 dated Apr. 25, 2021 (15 pages with English language translation).
Curry, E. et al., "Linking building data in the cloud: Integrating cross-domain building data using linked data." Advanced Engineering Informatics, 2013, 27 (pp. 206-219).
Digital Platform Litigation Documents Part 1, includes cover letter, dismissal of case DDE-1-21-cv-01796, IPR2023-00022 (documents filed Jan. 26, 2023-Oct. 7, 2022), and IPR2023-00085 (documents filed Jan. 26, 2023-Oct. 20, 2022) (748 pages total).
Digital Platform Litigation Documents Part 10, includes DDE-1-21-cv-01796 (documents filed Nov. 1, 2022-Dec. 22, 2021 (1795 pages total).
Digital Platform Litigation Documents Part 2, includes IPR2023-00085 (documents filed Oct. 20, 2022) (172 pages total).
Digital Platform Litigation Documents Part 3, includes IPR2023-00085 (documents filed Oct. 20, 2022) and IPR2023-00170 (documents filed Nov. 28, 2022-Nov. 7, 2022) (397 pages total).
Digital Platform Litigation Documents Part 4, includes IPR2023-00170 (documents filed Nov. 7, 2022) and IPR2023-00217 (documents filed Jan. 18, 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2023- Nov. 23, 2022) (316 pages total).
Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).
Digital Platform Litigation Documents Part 9, includes DDE-1-21-cv-01796 (documents filed Jan. 10, 2023-Nov. 1, 2022 (203 pages total).
El Kaed, C. et al., "Building management insights driven by a multi-system semantic representation approach," 2016 IEEE 3rd World Forum on Internet of Things (WF-IoT), Dec. 12-14, 2016, (pp. 520-525).
Ellis, C. et al., "Creating a room connectivity graph of a building from per-room sensor units." BuildSys '12, Toronto, ON, Canada, Nov. 6, 2012 (7 pages).
Extended European Search Report on EP Application No. 18196948.6 dated Apr. 10, 2019 (9 pages).
Fierro et al., "Beyond a House of Sticks: Formalizing Metadata Tags with Brick," BuildSys '19, New York, NY, USA, Nov. 13-14, 2019 (10 pages).
Fierro et al., "Dataset: An Open Dataset and Collection Tool for BMS Point Labels," Data'19, New York, NY, USA, Nov. 10, 2019 (3 pages).
Fierro et al., "Design and Analysis of a Query Processor for Brick," ACM Transactions on Sensor Networks, Jan. 2018, vol. 1, No. 1, art. 1 (25 pages).
Fierro et al., "Design and Analysis of a Query Processor for Brick," BuildSys '17, Delft, Netherlands, Nov. 8-9, 2017 (10 pages).
Fierro et al., "Mortar: An Open Testbed for Portable Building Analytics," BuildSys '18, Shenzhen, China, Nov. 7-8, 2018 (10 pages).
Fierro et al., "Why Brick is a Game Changer for Smart Buildings," URL: https://brickschema.org/papers/Brick_Memoori_Webinar_Presentation.pdf, Memoori Webinar, 2019 (67 pages).
Fierro, "Writing Portable Building Analytics with the Brick Metadata Schema," UC Berkeley, ACM E-Energy, 2019 (39 pages).
Fierro, G., "Design of an Effective Ontology and Query Processor Enabling Portable Building Applications," Electrical Engineering and Computer Sciences, University of California at Berkeley, Technical Report No. UCB/EECS-2019-106, Jun. 27, 2019 (118 pages).
File History for U.S. Appl. No. 12/776,159, filed May 7, 2010 (722 pages).
Final Conference Program, ACM BuildSys 2016, Stanford, CA, USA, Nov. 15-17, 2016 (7 pages).
Gao et al., "A large-scale evaluation of automated metadata inference approaches on sensors from air handling units," Advanced Engineering Informatics, 2018, 37 (pp. 14-30).
Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/feb21/articles/passivelogic/210127124501passivelogic.html, Feb. 2021 (6 pages).
Hu, S. et al., "Building performance optimisation: A hybrid architecture for the integration of contextual information and time-series data," Automation in Construction, 2016, 70 (pp. 51-61).
International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on PCT/US2017/052060, mailed Oct. 5, 2017, 11 pages.
International Search Report and Written Opinion on PCT/US2017/052633, mailed Oct. 23, 2017, 9 pages.
International Search Report and Written Opinion on PCT/US2017/052829, mailed Nov. 27, 2017, 24 pages.
International Search Report and Written Opinion on PCT/US2018/024068, mailed Jun. 15, 2018, 22 pages.

(56) References Cited

OTHER PUBLICATIONS

International Search Report and Written Opinion on PCT/US2018/052971, dated Mar. 1, 2019, 19 pages.
International Search Report and Written Opinion on PCT/US2018/052974, mailed Dec. 19, 2018, 13 pages.
International Search Report and Written Opinion on PCT/US2018/052975, mailed Jan. 2, 2019, 13 pages.
International Search Report and Written Opinion on PCT/US2018/052994, mailed Jan. 7, 2019, 15 pages.
International Search Report and Written Opinion on PCT/US2019/015481, dated May 17, 2019, 78 pages.
International Search Report and Written Opinion on PCT/US2020/058381, dated Jan. 27, 2021, 30 pages.
Japanese Office Action on JP Appl. No. 2018-534963 dated May 11, 2021 (16 pages with English language translation).
Koh et al., "Plaster: An Integration, Benchmark, and Development Framework for Metadata Normalization Methods," BuildSys '18, Shenzhen, China, Nov. 7-8, 2018 (10 pages).
Koh et al., "Scrabble: Transferrable Semi-Automated Semantic Metadata Normalization using Intermediate Representation," BuildSys '18, Shenzhen, China, Nov. 7-8, 2018 (10 pages).
Koh et al., "Who can Access What, and When?" BuildSys '19, New York, NY, USA, Nov. 13-14, 2019 (4 pages).
Li et al., "Event Stream Processing with Out-of-Order Data Arrival," International Conferences on Distributed Computing Systems, 2007, (8 pages).
Nissin Electric Co., Ltd., "Smart power supply system (SPSS)," Outline of the scale verification plan, Nissin Electric Technical Report, Japan, Apr. 23, 2014, vol. 59, No. 1 (23 pages).
Passivelogic, "Explorer: Digital Twin Standard for Autonomous Systems. Made interactive." URL: https://passivelogic.com/software/quantum-explorer/, retrieved from internet Jan. 4, 2023 (13 pages).
Passivelogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).
Quantum Alliance, "Quantum Explorer Walkthrough," 2022, (7 pages) (screenshots from video).
Results of the Partial International Search for PCT/US2018/052971, dated Jan. 3, 2019, 3 pages.
Sinha, Sudhi and Al Huraimel, Khaled, "Reimagining Businesses with AI" John Wiley & Sons, Inc., Hoboken, NJ, USA, 2021 (156 pages).
Sinha, Sudhi R. and Park, Youngchoon, "Building an Effective IoT Ecosystem for Your Business," Johnson Controls International, Springer International Publishing, 2017 (286 pages).
Sinha, Sudhi, "Making Big Data Work for Your Business: A guide to effective Big Data analytics," Impackt Publishing LTD., Birmingham, UK, Oct. 2014 (170 pages).
The Virtual Nuclear Tourist, "Calvert Cliffs Nuclear Power Plant," URL: http://www.nucleartourist.com/us/calvert.htm, Jan. 11, 2006 (2 pages).
University of California at Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2022 (7 pages).
Van Hoof, Bert, "Announcing Azure Digital Twins: Create digital replicas of spaces and infrastructure using cloud, AI and IoT," URL: https://azure.microsoft.com/en-us/blog/announcing-azure-digital-twins-create-digital-replicas-of-spaces-and-infrastructure-using-cloud-ai-and-iot/, Sep. 24, 2018 (11 pages).
W3C, "SPARQL: Query Language for RDF," located on the Wayback Machine, URL: https://web.archive.org/web/20161230061728/http://www.w3.org/TR/rdf-sparql-query/), retrieved from internet Nov. 15, 2022 (89 pages).
Wei et al., "Development and Implementation of Software Gateways of Fire Fighting Subsystem Running on EBI," Control, Automation and Systems Engineering, IITA International Conference on, IEEE, Jul. 2009 (pp. 9-12).
White et al., "Reduce building maintenance costs with AWS IoT TwinMaker Knowledge Graph," The Internet of Things on AWS—Official Blog, URL: https://aws.amazon.com/blogs/iot/reduce-building-maintenance-costs-with-aws-iot-twinmaker-knowledge-graph/, Nov. 18, 2022 (10 pages).
Zhou, Q. et al., "Knowledge-infused and Consistent Complex Event Processing over Real-time and Persistent Streams," Further Generation Computer Systems, 2017, 76 (pp. 391-406).

* cited by examiner

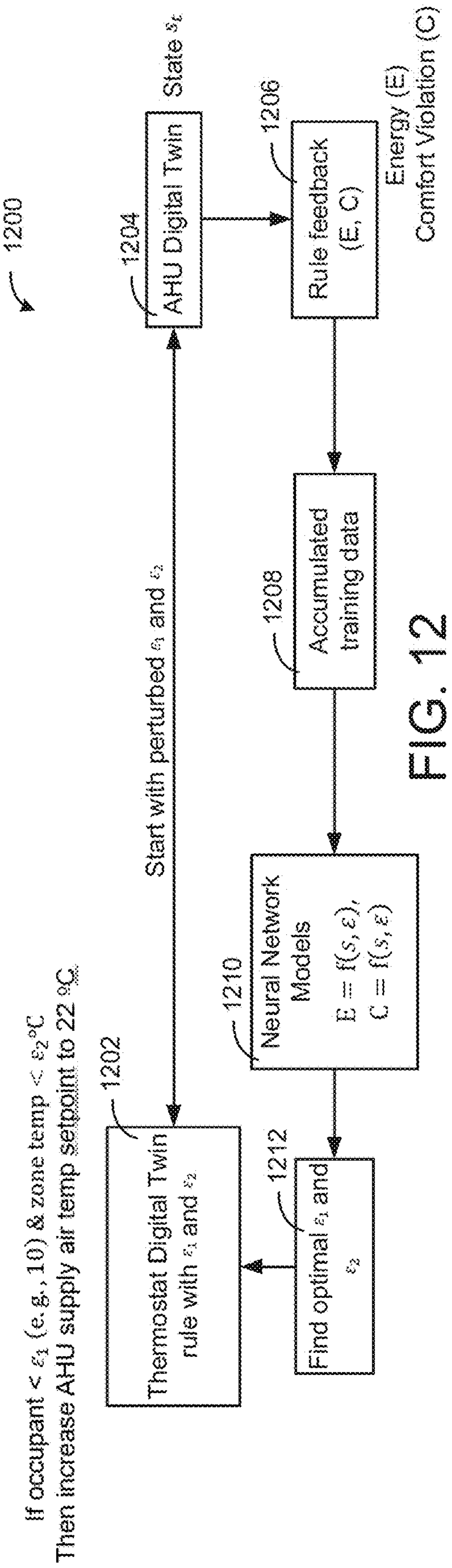
FIG. 12
1400
$$\min_{\varepsilon^*}(\alpha_1 . E + \alpha_2 . C)$$
$$s.t.\ \ E(s,\varepsilon),$$
$$C(s,\varepsilon)$$
FIG. 14
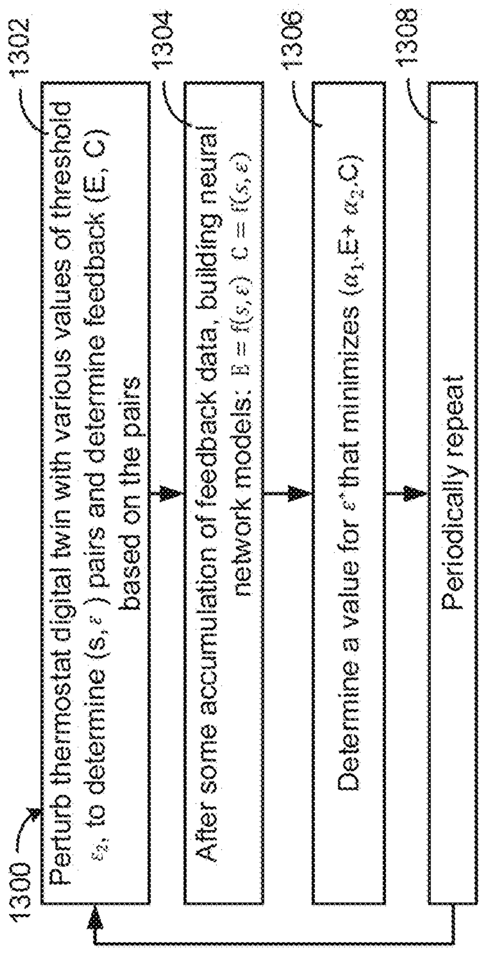
FIG. 13

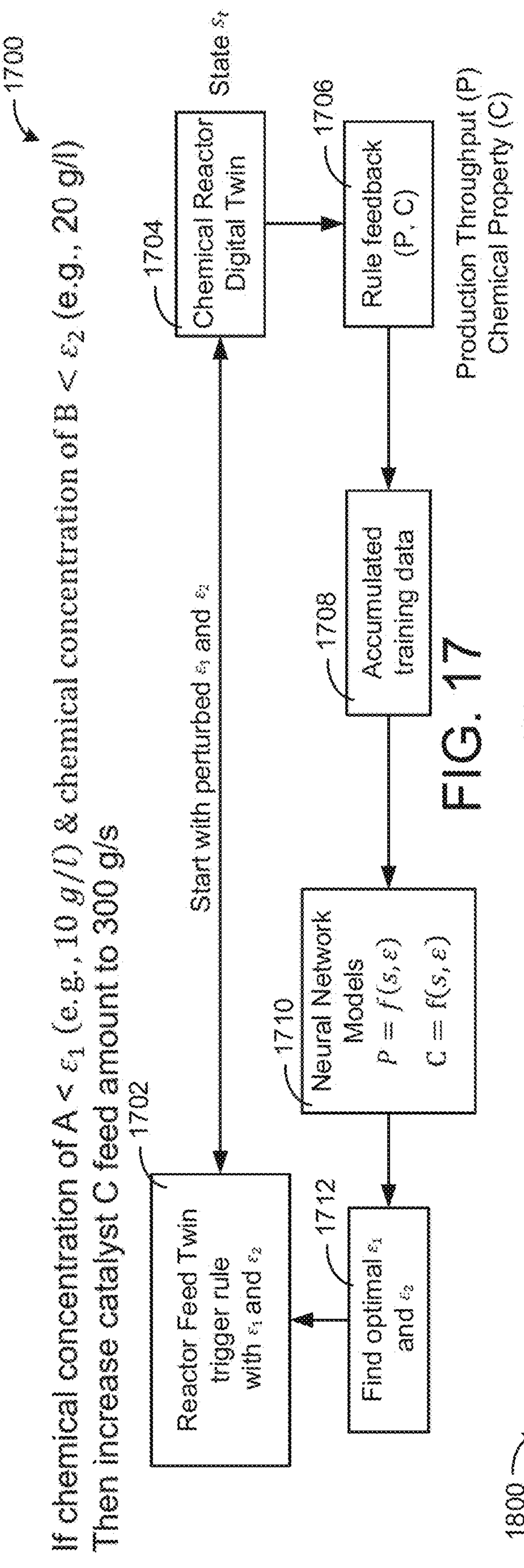
FIG. 17
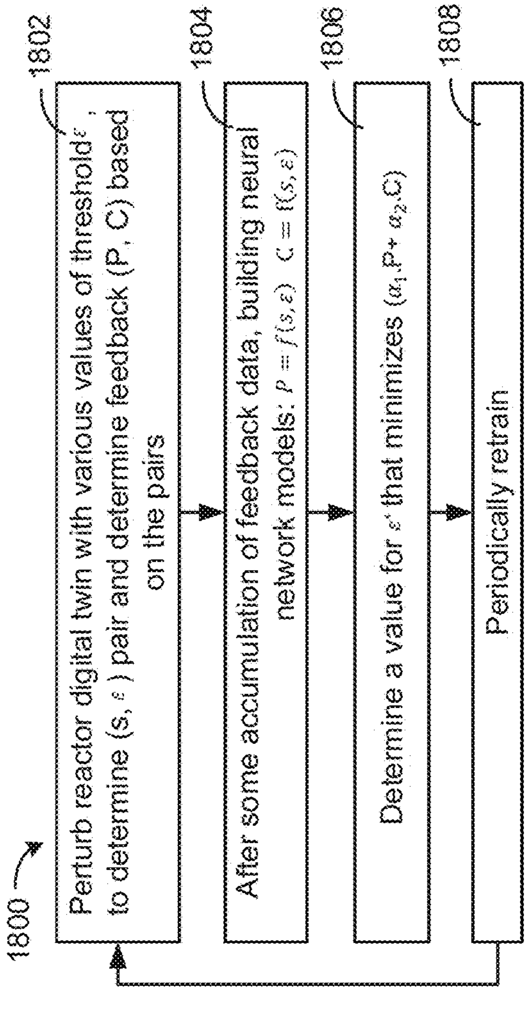
FIG. 18
1900
$$\min_{\varepsilon^*}(\alpha_1 P + \alpha_2 C)$$
$$s.t.\ \ E(s,\varepsilon),$$
$$C(s,\varepsilon)$$
FIG. 19

2100

State (Feed):
- Reactants feed amount
- Catalysts feed amount
- Feed stream temperature
- ...

2102

State (Reactor):
- Product concentration
- Cooling coil temperature
- Product Temperature
- ...

FIG. 21

2550

| | Attributes (2552) | Inherited Attributes (2554) | Triggers (2556) | Actions (2558) |
|---|---|---|---|---|
| Air Handling Unit Digital Twin<br>2502 | • Fan Speed<br>• Static Pressure Setpoint<br>• Outdoor Air Mix | • Supply Air Temp Sensor<br>• Supply Air Flow Sensor<br>• Supply Air Flow Setpoint<br>• Damper Position Setpoint | Inherited Triggers<br>• When ***{VAV_ID}***.ZN-T is [== < > !=] x<br>• When ***{VAV_ID}***.SUPFLOW is [== < > !=] x<br>• When ***{VAV_ID}***.SUPFLSP is [== < > !=] x<br>• When ***{VAV_ID}.{DAMPER_ID}***.DPRPOS is [== < > !=] x | Inherited Actions<br>• Set ***{VAV_ID}***.ZN-T to y<br>• Set ***{VAV_ID}***.SUPFLOW to y<br>• Set ***{VAV_ID}***.SUPFLSP to y<br>• Set ***{VAV_ID}.{DAMPER_ID}***.DPRPOS to y |
| Variable Air Volume Digital Twin<br>2504 | • Zone Temperature (ZN-T) Sensor<br>• Supply Air Flow (SUPFLOW) Sensor<br>• Supply Air Flow Setpoint (SUPFLSP) | • DPRPOS | • When ZN-T is [== < > !=] x<br>• When SUPFLOW is [== < > !=] x<br>• When SUPFLSP is [== < > !=] x<br><br>Inherited Triggers<br>• When ***{DAMPER_ID}***.DPRPOS is [== < > !=] x | • Set ZN-T to y<br>• Set SUPFLOW to y<br>• Set SUPFLSP to y<br><br>Inherited Actions<br>• Set ***{DAMPER_ID}***.DPRPOS to y |
| Damper Digital Twin<br>2506 | • Damper Position Setpoint (DPRPOS) | | • When DPRPOS is [== < > !=] x | • Set DPRPOS to y |

FIG. 25B

2750

| | Attributes (2752) | Inherited Attributes (2754) | Triggers (2756) | Actions (2758) |
|---|---|---|---|---|
| Air Handling Unit Digital Twin <u>2702</u> | • Fan Speed<br>• Static Pressure Setpoint<br>• Outdoor Air Mix | • Supply Air Temp Sensor<br>• Supply Air Flow Sensor<br>• Supply Air Flow Setpoint<br>• Damper Position Setpoint | • When ***total*** SUPFLOW is [== < > !=] x<br>Inherited Triggers<br>• When ***either/both*** ZN-T is [== < > !=] x<br>• When ***either/both*** SUPFLOW is [== < > !=] x<br>• When ***either/both*** SUPFLSP is [== < > !=] x<br>• When ***either/both*** DPRPOS is [== < > !=] x | Inherited Actions<br>• Set ***all*** ZN-T to y<br>• Set ***all*** SUPFLOW to y<br>• Set ***all*** SUPFLSP to y |
| Variable Air Volume Digital Twin <u>2704</u> | • Zone Temperature (ZN-T) Sensor<br>• Supply Air Flow (SUPFLOW) Sensor<br>• Supply Air Flow Setpoint (SUPFLSP) | • Deamper Position Setpoint DPRPOS | • When ZN-T is [== < > !=] x<br>• When SUPFLOW is [== < > !=] x<br>• When SUPFLSP is [== < > !=] x<br><br>Inherited Triggers<br>• When ***{DAMPER_ID}***.DPRPOS is [== < > !=] x | • Set ZN-T to y<br>• Set SUPFLOW to y<br>• Set SUPFLSP to y<br><br>Inherited Actions<br>• Set ***{DAMPER_ID}***.DPRPOS to y |

FIG. 27B

2950

| | Attributes (2952) | Inherited Attributes (2954) | Triggers (2956) | Actions (2958) |
|---|---|---|---|---|
| Sustainability Digital Twin <br> 2802 | • Sustainability Score<br>• Sustainability Mode | • HVAC DT Attributes<br>• Lighting DT Attributes<br>• Occupancy DT Attributes | • When ***SUSTAINABILITY Score*** is [== < > !=] x<br>• When ***SUSTAINABILITY Mode*** is y<br>Inherited Triggers<br>• HVAC Triggers<br>• Lighting Triggers<br>• Occupancy Triggers | • Set ***SUSTAINABILITY Mode*** is y<br><br>Inherited Triggers<br>• HVAC Actions<br>• Lighting Actions<br>• Occupancy Actions |
| HVAC Digital Twin 2804<br>Lighting Digital Twin 2806<br>Occupancy Digital Twin 2808 | • HVAC Mode<br>• Lighting Mode<br>• Occupancy Mode | • HVAC DT Attributes<br>• Lighting DT Attributes<br>• Occupancy DT Attributes | • HVAC Triggers<br>• Lighting Triggers<br>• Occupancy Triggers | • HVAC Actions<br>• Lighting Actions<br>• Occupancy Actions |

FIG. 29B

BUILDING DATA PLATFORM WITH POLICY LEARNING FOR DIGITAL TWINS

CROSS-REFERENCE TO RELATED PATENT APPLICATION

This application claims the benefit of, and priority to, U.S. Patent Application No. 63/292,357 filed Dec. 21, 2021, the entirety of which is incorporated by reference herein.

BACKGROUND

This application relates generally to a building system of a building. This application relates more particularly to systems for managing and processing data of the building system.

A building may aggregate and store building data received from building equipment and/or other data sources. The building data can be stored in a database. The building can include a building system that operates analytic and/or control applications against the data of the database to control the building equipment. However, the development and/or deployment of the analytic and/or control applications may be time consuming and require a significant amount of software development. Furthermore, the analytic and/or control applications may lack flexibility to adapt to changing circumstances in the building.

SUMMARY

One implementation of the present disclosure is a building system of a building. The building system includes one or more memory devices including instructions stored thereon that, when executed by one or more processors, cause the one or more processors to select an instance of one or more entities of one or more particular entity types from a digital twin of the building for creating a policy function, the digital twin including representations of entities of the building and relationships between the entities of the building. The instructions cause the one or more processors to perform an optimization that selects one or more inputs of inputs associated with the one or more entities for input to the policy function, selects one or more actions of actions associated with the one or more entities that are outputs of the policy function, and identifies one or more parameters for the policy function. The instructions cause the one or more processors to deploy the policy function for the one or more entities by causing the digital twin to include the policy function.

In some embodiments, the policy function generates first values for the one or more actions based on the one or more parameters and second values of the one or more inputs.

In some embodiments, the instructions cause the one or more processors to perform the optimization by performing first optimizations each with a single input of the inputs and one action of the actions, selecting a first input of the inputs associated with a highest performance indicated by the first optimizations, performing second optimizations with the first input and another single input of the inputs, and selecting a pair of the first input and a second input of the inputs, the pair associated with another highest performance indicated by the second optimizations.

In some embodiments, the instructions cause the one or more processors to generate combinations of the inputs and the actions. In some embodiments, the instructions cause the one or more processors to perform optimizations on the combinations and select one combination of the combinations for the policy function, the one combination associated with a highest performance indicated by the optimizations.

In some embodiments, the digital twin executes the policy function by generating first values for the one or more actions of the policy function based on second values of the one or more inputs, the first values of the one or more actions causing one or more devices of the building to control environmental conditions of the building.

In some embodiments, the instructions cause the one or more processors to perform a first set of optimizations to identify one or more first inputs of the inputs to determine a first action of the actions for the policy function and perform a second set of optimizations to identify one or more second inputs of the inputs to determine a second action of the actions for the policy function.

In some embodiments, the instructions cause the one or more processors to generate a first policy function based on the optimization for a first state of the one or more entities, the first policy function trained to optimize one or more first goals and generate a second policy function based on the optimization for a second state of the one or more entities, the second policy function trained to optimize one or more second goals different from the one or more first goals.

In some embodiments, the policy function is a piece-wise function including pieces relating the one or more inputs to the one or more actions. In some embodiments, the pieces are defined based on the one or more parameters of the policy function.

In some embodiments, the instructions cause the one or more processors to perform the optimization by maximizing or minimizing an objective function based on one or more constraints.

In some embodiments, the objective function indicates at least one of, or a weighted combination of, occupant comfort or energy consumption.

In some embodiments, the instructions cause the one or more processors to select a simulation model that simulates behavior of the one or more entities and train the simulation model based on at least one of timeseries data or metadata of the one or more entities. In some embodiments, the instructions cause the one or more processors to perform the optimization based on simulating the behavior of the one or more entities with the simulation model.

In some embodiments, the simulation model is linked to a template indicating the one or more particular entity types that the simulation model performs a simulation for.

In some embodiments, the simulation model is a pre-trained model. In some embodiments, the instructions cause the one or more processors to train the simulation model based on the timeseries data or the metadata of the one or more entities to tune the simulation model to perform simulations specific to the one or more entities.

In some embodiments, the instructions cause the one or more processors to simulate the behavior of the one or more entities with the simulation model based on values of the one or more actions and optimize an objective function with one or more constraints based on the behavior of the one or more entities simulated by the simulation model for the one or more actions.

Another implementation of the present disclosure is a method. The method includes selecting, by one or more processing circuits, an instance of one or more entities of one or more particular entity types from a digital twin of a building for creating a policy function, the digital twin including representations of entities of the building and relationships between the entities of the building. The method includes performing, by the one or more processing circuits, an optimization that selects one or more inputs of inputs associated with the one or more entities for input to the policy function, selects one or more actions of actions associated with the one or more entities that are outputs of the policy function, and identifies one or more parameters for the policy function. The method includes deploying, by the one or more processing circuits, the policy function for the one or more entities by causing the digital twin to include the policy function.

In some embodiments, the policy function generates first values for the one or more actions based on the one or more parameters and second values of the one or more inputs.

In some embodiments, the method includes performing, by the one or more processing circuits by performing first optimizations each with a single input of the inputs and one action of the actions, selecting a first input of the inputs associated with a highest performance indicated by the first optimizations, performing second optimizations with the first input and another single input of the inputs, and selecting a pair of the first input and a second input of the inputs, the pair associated with another highest performance indicated by the second optimizations.

In some embodiments, the method includes generating, by the one or more processing circuits, combinations of the inputs and the actions, performing, by the one or more processing circuits, optimizations on the combinations, and selecting, by the one or more processing circuits, one combination of the combinations for the policy function, the one combination associated with a highest performance indicated by the optimizations.

In some embodiments, the method includes selecting, by the one or more processing circuits, a simulation model that simulates the behavior of the one or more entities and training, by the one or more processing circuits the simulation model based on at least one of timeseries data or metadata of the one or more entities.

Another implementation of the present disclosure is one or more storage medium storing instructions thereon, that, when executed by one or more processors, cause the one or more processors to select an instance of one or more entities of one or more particular entity types from a digital twin of a building for creating a policy function, the digital twin including representations entities of the building and relationships between the entities of the building. The instructions cause the one or more processors to perform an optimization that selects one or more inputs of inputs associated with the one or more entities for input to the policy function, selects one or more actions of actions associated with the one or more entities that are outputs of the policy function, and identifies one or more parameters for the policy function and deploy the policy function for the one or more entities by causing the digital twin to include the policy function.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 12 is a block diagram of a trigger rule of a thermostat digital twin where parameters of the trigger rule is trained, according to an exemplary embodiment.

FIG. 13 is a flow diagram of a process for identifying values for the parameters of the trigger rule of FIG. 12, according to an exemplary embodiment.

FIG. 14 is a minimization that can be performed to identify the values for the parameters of the trigger rule of FIGS. 12-13, according to an exemplary embodiment.

FIG. 17 is a block diagram of a trigger rule of a chemical reactor digital twin where parameters of the trigger rule are trained, according to an exemplary embodiment.

FIG. 18 is a flow diagram of a process for identifying values for the parameters of the trigger rule of FIG. 17, according to an exemplary embodiment.

FIG. 19 is a minimization that can be performed to identify the values for the parameters of the trigger rule of FIGS. 17-18, according to an exemplary embodiment.

FIG. 21 is lists of states of a reactor and a feed of a reactor that can be included in the trigger rule and the action rule of FIGS. 12-15, according to an exemplary embodiment.

FIG. 25B is a table indicating attributes, inherited attributes, triggers, and actions for the digital twins of the FIG. 25A, according to an exemplary embodiment.

FIG. 27B is a table indicating attributes, inherited attributes, triggers, and actions for the digital twins of FIG. 27A, according to an exemplary embodiment.

FIG. 29B is a table indicating attributes, inherited attributes, triggers, and actions for the digital twins of FIG. 29A, according to an exemplary embodiment.

DETAILED DESCRIPTION

Figure 1:
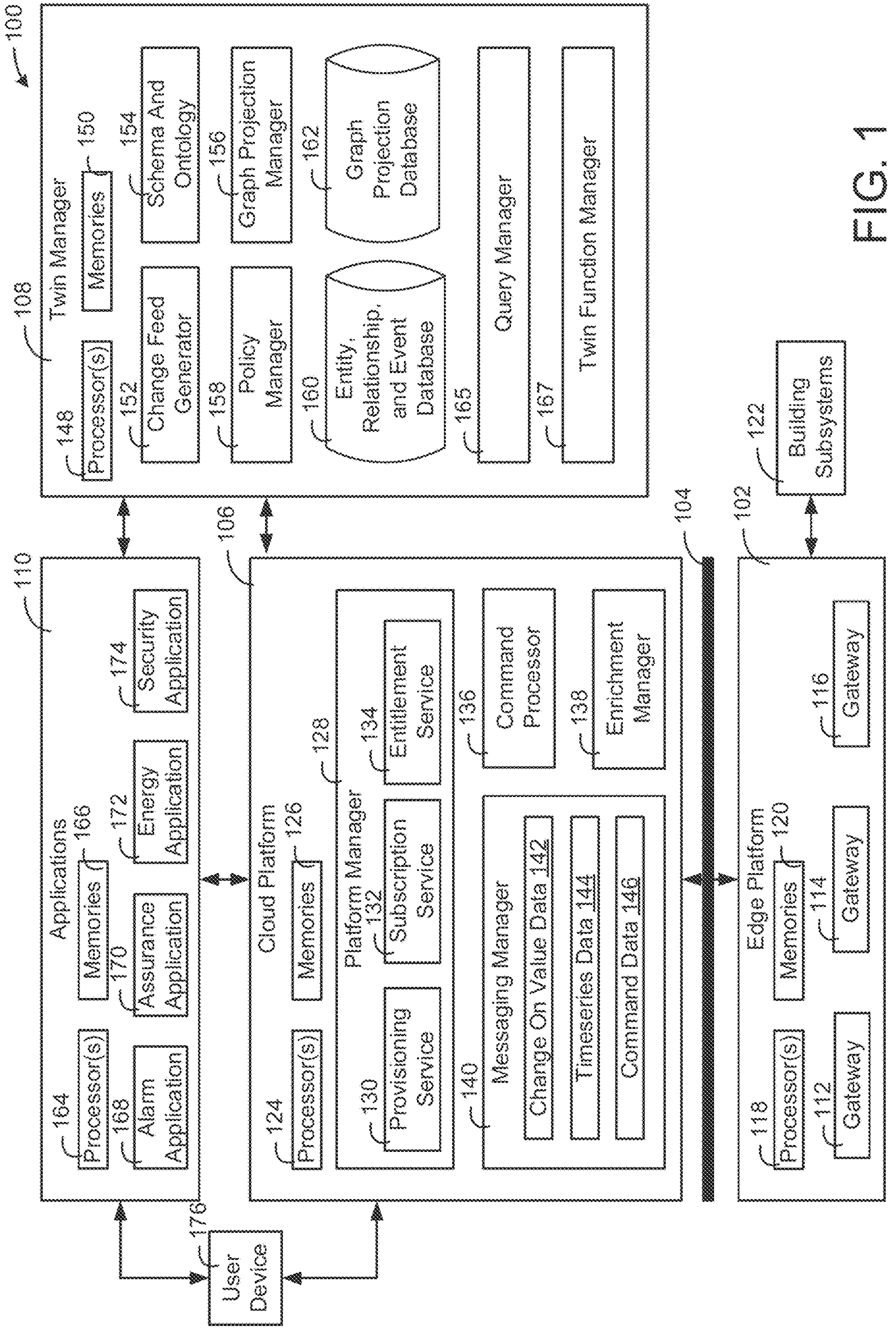
FIG. 1 is a block diagram of a building data platform including an edge platform, a cloud platform, and a twin manager, according to an exemplary embodiment.

Referring generally to the FIGURES, systems and methods for digital twins of a building are shown, according to various exemplary embodiments. A digital twin can be a virtual representation of a building and/or an entity of the building (e.g., space, piece of equipment, occupant, etc.). Furthermore, the digital twin can represent a service performed in a building, e.g., facility management, clean air optimization, energy prediction, equipment maintenance, equipment control, etc.

In some embodiments, the digital twin can include an information data store and a connector. The information data store can store the information describing the entity that the digital twin operates for (e.g., attributes of the entity, measurements associated with the entity, control points or commands of the entity, etc.). In some embodiments, the data store can be a graph including various nodes and/or edges. The connector can be a software component that provides telemetry from the entity (e.g., physical device) to the information store. Furthermore, the digital twin can include artificial intelligence (AI), e.g., an AI agent. The AI can be one or more machine learning algorithms and/or models that operate based on information of the information data store and outputs information. The AI agent can run against a common data model, e.g., BRICK, and can be easily implemented in various different buildings, e.g., against various different building models. Running against BRICK can allow for the AI agent to be plug-and-play and reduce AI design and/or deployment time.

In some embodiments, the AI agent for/of the digital twin can call an AI service to determine inferences and/or predict future data values. In some embodiments, the predictions are potential future states. In some embodiments, the predictions predict a timeseries of a data point into the future. The predictions could be predicted indoor temperature for an hour, inferred future air quality from 15 minute air quality readings, etc. In some embodiments, the digital twin can store predicted and/or inferred information in a graph data store as a node in the graph data store related to an entity that the digital twin represents or otherwise operates for. In some embodiments, the digital twin, or other digital twins, can operate against the predicted and/or inferred data, e.g., operate to construct and implement control algorithms for operating equipment of a building based on predicted future data points of the building.

Furthermore, the AI agent can include various operational capabilities, e.g., the ability to generate an action, derive a value, etc. The capabilities may be triggers and/or actions. The triggers and/or actions can be conditions that define when and/or how command and control occurs for an entity. The triggers and/or actions can be rule based conditional and operational statements that are associated with a specific digital twin, e.g., are stored and executed by an AI agent of the digital twin. In some embodiments, a building system can identify actions and/or triggers (or parameters for the actions and/or triggers) through machine learning algorithms. In some embodiments, the building system can evaluate the conditions/context of the graph and determine and/or modify the triggers and actions of a digital twin. In some embodiments, the triggers, actions, or various other operational functions can be capabilities of a digital twin.

In some embodiments, the building system can create a digital twin by combining multiple digital twins together. In this regard, a high level digital twin can be generated from other digital twins. In some embodiments, the digital twins can be combined based on a hierarchy of digital twins such that lower level digital twins are incorporated into higher level digital twins. For example, the building system may, in some embodiments, generate multiple lower level digital twins in order to group the lower level digital twins into a higher level digital twin. In some embodiments, the building system can analyze existing digital twins to collect and group the digital twins into a higher level digital twin. In some embodiments, the building system can automatically build the high level digital twins.

In some embodiments, the building system can learn a policy function for a digital twin. The policy function may define combinations of one or more inputs, one or more outputs, and/or policy function parameters. The digital twin can use the policy function to generate analytics and/or control operation of various systems of a building. For example, the policy function could cause various systems to control environmental conditions of the building (e.g., temperature, humidity, airflow, air changes, etc.).

In some embodiments, the building system can use a simulation model that simulates the behavior of a particular entity or entities of a building. The simulation model can be a machine learning model, in some embodiments, that can be trained based on collected data of the entity and/or entities. The building system can use the simulation model, together with the objective function, to perform an optimization that identifies a particular set of input variables, output variables, and policy function parameters. For example, the building system can identify, for any given action of the policy function, what the corresponding behavior of the entity or entities will be based on the simulation model. This corresponding behavior can be used in the objective function (or constraints of the objective function) to learn and/or tune the parameters of the policy function.

In some embodiments, the building system can iteratively perform a police optimization for various possible combinations of input and output variables for a policy function. In some embodiments, the building system can identify a small (or smallest) set of input and output variables that delivers a particular level of performance for a policy function. For example, the building system could include a rule that selects at most four input parameters for any one output parameter of the building system. The building system could identify performances of a set of policy functions with four or less input parameters for one output parameter and select the policy function from the set of policy functions with the highest performance (e.g., best optimization result, lowest optimization constraint violations, etc.). By reducing the number of input and output variables in the policy function, the policy function is reduced in complexity and is computationally easier to train. These policy functions are further less likely to misbehave when deployed.

In some embodiments, the objective function used to train the policy function indicates one or multiple outcome goals. The outcome goals can be energy usage, financial cost, occupant comfort, infection risk of an infectious disease, air quality, etc. The various outcome goals can be weighted individually in the objective function. In some embodiments, a user can review the policy functions and select between the policy functions based on the current priorities of the user. In some embodiments, the identified policy function can be deployed in a digital twin infrastructure, e.g., deployed in a digital twin (e.g., a high level solution digital twin) and/or in a control application.

Referring now to FIG. 1, a building data platform 100 including an edge platform 102, a cloud platform 106, and a twin manager 108 are shown, according to an exemplary embodiment. The edge platform 102, the cloud platform 106, and the twin manager 108 can each be separate services deployed on the same or different computing systems. In some embodiments, the cloud platform 106 and the twin manager 108 are implemented in off premises computing systems, e.g., outside a building. The edge platform 102 can be implemented on-premises, e.g., within the building. However, any combination of on-premises and off-premises components of the building data platform 100 can be implemented.

The building data platform 100 includes applications 110. The applications 110 can be various applications that operate to manage the building subsystems 122. The applications 110 can be remote or on-premises applications (or a hybrid of both) that run on various computing systems. The applications 110 can include an alarm application 168 configured to manage alarms for the building subsystems 122. The applications 110 include an assurance application 170 that implements assurance services for the building subsystems 122. In some embodiments, the applications 110 include an energy application 172 configured to manage the energy usage of the building subsystems 122. The applications 110 include a security application 174 configured to manage security systems of the building.

In some embodiments, the applications 110 and/or the cloud platform 106 interacts with a user device 176. In some embodiments, a component or an entire application of the applications 110 runs on the user device 176. The user device 176 may be a laptop computer, a desktop computer, a smartphone, a tablet, and/or any other device with an input interface (e.g., touch screen, mouse, keyboard, etc.) and an output interface (e.g., a speaker, a display, etc.).

The applications 110, the twin manager 108, the cloud platform 106, and the edge platform 102 can be implemented on one or more computing systems, e.g., on processors and/or memory devices. For example, the edge platform 102 includes processor(s) 118 and memories 120, the cloud platform 106 includes processor(s) 124 and memories 126, the applications 110 include processor(s) 164 and memories 166, and the twin manager 108 includes processor(s) 148 and memories 150.

The processors can be a general purpose or specific purpose processors, an application specific integrated circuit (ASIC), one or more field programmable gate arrays (FPGAs), a group of processing components, or other suitable processing components. The processors may be configured to execute computer code and/or instructions stored in the memories or received from other computer readable media (e.g., CDROM, network storage, a remote server, etc.).

The memories can include one or more devices (e.g., memory units, memory devices, storage devices, etc.) for storing data and/or computer code for completing and/or facilitating the various processes described in the present disclosure. The memories can include random access memory (RAM), read-only memory (ROM), hard drive storage, temporary storage, non-volatile memory, flash memory, optical memory, or any other suitable memory for storing software objects and/or computer instructions. The memories can include database components, object code components, script components, or any other type of information structure for supporting the various activities and information structures described in the present disclosure. The memories can be communicably connected to the processors and can include computer code for executing (e.g., by the processors) one or more processes described herein.

The edge platform 102 can be configured to provide connection to the building subsystems 122. The edge platform 102 can receive messages from the building subsystems 122 and/or deliver messages to the building subsystems 122. The edge platform 102 includes one or multiple gateways, e.g., the gateways 112-116. The gateways 112-116 can act as a gateway between the cloud platform 106 and the building subsystems 122. The gateways 112-116 can be the gateways described in U.S. Provisional Patent Application No. 62/951,897 filed Dec. 20, 2019, the entirety of which is incorporated by reference herein. In some embodiments, the applications 110 can be deployed on the edge platform 102. In this regard, lower latency in management of the building subsystems 122 can be realized.

The edge platform 102 can be connected to the cloud platform 106 via a network 104. The network 104 can communicatively couple the devices and systems of building data platform 100. In some embodiments, the network 104 is at least one of and/or a combination of a Wi-Fi network, a wired Ethernet network, a ZigBee network, a Bluetooth network, and/or any other wireless network. The network 104 may be a local area network or a wide area network (e.g., the Internet, a building WAN, etc.) and may use a variety of communications protocols (e.g., BACnet, IP, LON, etc.). The network 104 may include routers, modems, servers, cell towers, satellites, and/or network switches. The network 104 may be a combination of wired and wireless networks.

The cloud platform 106 can be configured to facilitate communication and routing of messages between the applications 110, the twin manager 108, the edge platform 102, and/or any other system. The cloud platform 106 can include a platform manager 128, a messaging manager 140, a command processor 136, and an enrichment manager 138. In some embodiments, the cloud platform 106 can facilitate messaging between the building data platform 100 via the network 104.

The messaging manager 140 can be configured to operate as a transport service that controls communication with the building subsystems 122 and/or any other system, e.g., managing commands to devices (C2D), commands to connectors (C2C) for external systems, commands from the device to the cloud (D2C), and/or notifications. The messaging manager 140 can receive different types of data from the applications 110, the twin manager 108, and/or the edge platform 102. The messaging manager 140 can receive change on value data 142, e.g., data that indicates that a value of a point has changed. The messaging manager 140 can receive timeseries data 144, e.g., a time correlated series of data entries each associated with a particular time stamp. Furthermore, the messaging manager 140 can receive command data 146. All of the messages handled by the cloud platform 106 can be handled as an event, e.g., the data 142-146 can each be packaged as an event with a data value occurring at a particular time (e.g., a temperature measurement made at a particular time).

The cloud platform 106 includes a command processor 136. The command processor 136 can be configured to receive commands to perform an action from the applications 110, the building subsystems 122, the user device 176, etc. The command processor 136 can manage the commands, determine whether the commanding system is authorized to perform the particular commands, and communicate the commands to the commanded system, e.g., the building subsystems 122 and/or the applications 110. The commands could be a command to change an operational setting that control environmental conditions of a building, a command to run analytics, etc.

The cloud platform 106 includes an enrichment manager 138. The enrichment manager 138 can be configured to enrich the events received by the messaging manager 140. The enrichment manager 138 can be configured to add contextual information to the events. The enrichment manager 138 can communicate with the twin manager 108 to retrieve the contextual information. In some embodiments, the contextual information is an indication of information related to the event. For example, if the event is a timeseries temperature measurement of a thermostat, contextual information such as the location of the thermostat (e.g., what room), the equipment controlled by the thermostat (e.g., what VAV), etc. can be added to the event. In this regard, when a consuming application, e.g., one of the applications 110 receives the event, the consuming application can operate based on the data of the event, the temperature measurement, and also the contextual information of the event.

The enrichment manager 138 can solve a problem that when a device produces a significant amount of information, the information may contain simple data without context. An example might include the data generated when a user scans a badge at a badge scanner of the building subsystems 122. This physical event can generate an output event including such information as "DeviceBadgeScannerID," "BadgeID," and/or "Date/Time." However, if a system sends this data to a consuming application, e.g., Consumer A and a Consumer B, each customer may need to call the building data platform knowledge service to query information with queries such as, "What space, build, floor is that badge scanner in?" or "What user is associated with that badge?"

By performing enrichment on the data feed, a system can be able to perform inferences on the data. A result of the enrichment may be transformation of the message "DeviceBadgeScannerId, BadgeId, Date/Time," to "Region, Building, Floor, Asset, DeviceId, BadgeId, UserName, EmployeeId, Date/Time Scanned." This can be a significant optimization, as a system can reduce the number of calls by 1/n, where n is the number of consumers of this data feed.

By using this enrichment, a system can also have the ability to filter out undesired events. If there are 100 building in a campus that receive 100,000 events per building each hour, but only 1 building is actually commissioned, only 1/10 of the events are enriched. By looking at what events are enriched and what events are not enriched, a system can do traffic shaping of forwarding of these events to reduce the cost of forwarding events that no consuming application wants or reads.

An example of an event received by the enrichment manager 138 may be:

{
"id": "someguid",
"eventType": "Device_Heartbeat",
"eventTime": "2018-01-27T00:00:00+00:00"
"eventValue": 1,
"deviceID": "someguid"

-continued

```
}
```

An example of an enriched event generated by the enrichment manager 138 may be:

```
{
"id": "someguid",
"eventType": "Device_Heartbeat",
"eventTime": "2018-01-27T00:00:00+00:00"
"eventValue": 1,
"deviceID": "someguid",
"buildingName": "Building-48",
"buildingID": "SomeGuid",
"panelID": "SomeGuid",
"panelName": "Building-48-Panel-13",
"cityID": 371,
"cityName": "Milwaukee",
"stateID": 48,
"stateName": "Wisconsin (WI)",
"countryID": 1,
"countryName": "United States"
}
```

By receiving enriched events, an application of the applications 110 can be able to populate and/or filter what events are associated with what areas. Furthermore, user interface generating applications can generate user interfaces that include the contextual information based on the enriched events.

The cloud platform 106 includes a platform manager 128. The platform manager 128 can be configured to manage the users and/or subscriptions of the cloud platform 106. For example, what subscribing building, user, and/or tenant utilizes the cloud platform 106. The platform manager 128 includes a provisioning service 130 configured to provision the cloud platform 106, the edge platform 102, and the twin manager 108. The platform manager 128 includes a subscription service 132 configured to manage a subscription of the building, user, and/or tenant while the entitlement service 134 can track entitlements of the buildings, users, and/or tenants.

The twin manager 108 can be configured to manage and maintain a digital twin. The digital twin can be a digital representation of the physical environment, e.g., a building. The twin manager 108 can include a change feed generator 152, a schema and ontology 154, a projection manager 156, a policy manager 158, an entity, relationship, and event database 160, and a graph projection database 162.

Figure 11:
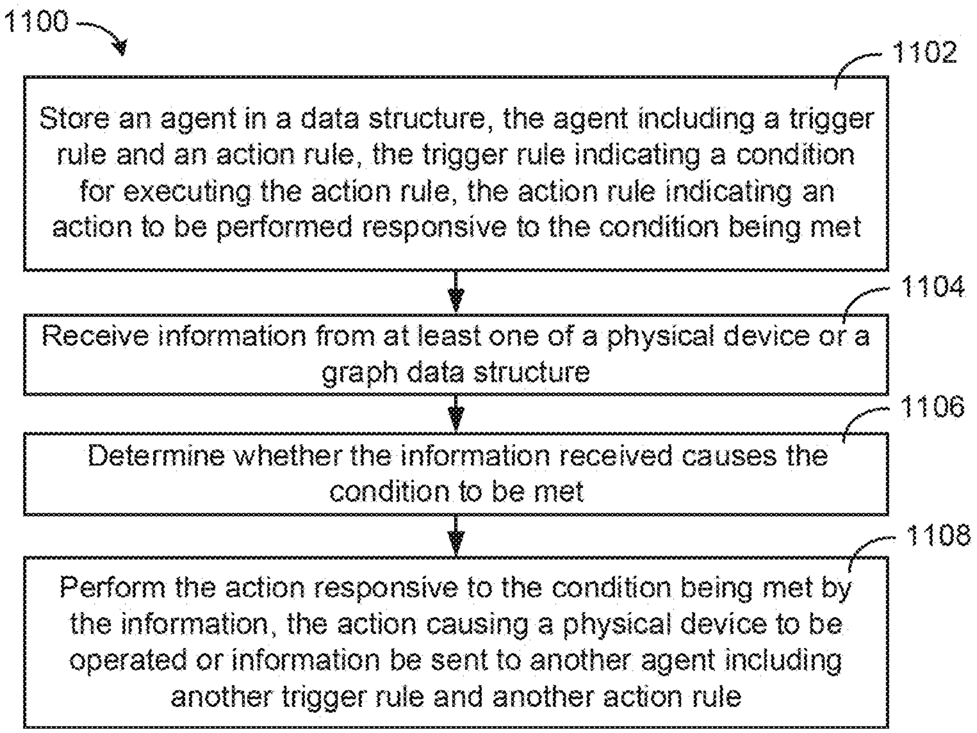
FIG. 11 is a flow diagram an agent of a digital twin executing a trigger rule and an action rule, according to an exemplary embodiment.

The graph projection manager 156 can be configured to construct graph projections and store the graph projections in the graph projection database 162. Examples of graph projections are shown in FIGS. 11-13. Entities, relationships, and events can be stored in the database 160. The graph projection manager 156 can retrieve entities, relationships, and/or events from the database 160 and construct a graph projection based on the retrieved entities, relationships and/or events. In some embodiments, the database 160 includes an entity-relationship collection for multiple subscriptions.

In some embodiment, the graph projection manager 156 generates a graph projection for a particular user, application, subscription, and/or system. In this regard, the graph projection can be generated based on policies for the particular user, application, and/or system in addition to an ontology specific for that user, application, and/or system. In this regard, an entity could request a graph projection and the graph projection manager 156 can be configured to generate the graph projection for the entity based on policies and an ontology specific to the entity. The policies can indicate what entities, relationships, and/or events the entity has access to. The ontology can indicate what types of relationships between entities the requesting entity expects to see, e.g., floors within a building, devices within a floor, etc. Another requesting entity may have an ontology to see devices within a building and applications for the devices within the graph.

The graph projections generated by the graph projection manager 156 and stored in the graph projection database 162 can be a knowledge graph and is an integration point. For example, the graph projections can represent floor plans and systems associated with each floor. Furthermore, the graph projections can include events, e.g., telemetry data of the building subsystems 122. The graph projections can show application services as nodes and API calls between the services as edges in the graph. The graph projections can illustrate the capabilities of spaces, users, and/or devices. The graph projections can include indications of the building subsystems 122, e.g., thermostats, cameras, VAVs, etc. The graph projection database 162 can store graph projections that keep up a current state of a building.

The graph projections of the graph projection database 162 can be digital twins of a building. Digital twins can be digital replicas of physical entities that enable an in-depth analysis of data of the physical entities and provide the potential to monitor systems to mitigate risks, manage issues, and utilize simulations to test future solutions. Digital twins can play an important role in helping technicians find the root cause of issues and solve problems faster, in supporting safety and security protocols, and in supporting building managers in more efficient use of energy and other facilities resources. Digital twins can be used to enable and unify security systems, employee experience, facilities management, sustainability, etc.

In some embodiments the enrichment manager 138 can use a graph projection of the graph projection database 162 to enrich events. In some embodiments, the enrichment manager 138 can identify nodes and relationships that are associated with, and are pertinent to, the device that generated the event. For example, the enrichment manager 138 could identify a thermostat generating a temperature measurement event within the graph. The enrichment manager 138 can identify relationships between the thermostat and spaces, e.g., a zone that the thermostat is located in. The enrichment manager 138 can add an indication of the zone to the event.

Furthermore, the command processor 136 can be configured to utilize the graph projections to command the building subsystems 122. The command processor 136 can identify a policy for a commanding entity within the graph projection to determine whether the commanding entity has the ability to make the command. For example, the command processor 136, before allowing a user to make a command, determine, based on the graph projection database 162, to determine that the user has a policy to be able to make the command.

In some embodiments, the policies can be conditional based policies. For example, the building data platform 100 can apply one or more conditional rules to determine whether a particular system has the ability to perform an action. In some embodiments, the rules analyze a behavioral based biometric. For example, a behavioral based biometric can indicate normal behavior and/or normal behavior rules for a system. In some embodiments, when the building data platform 100 determines, based on the one or more conditional rules, that an action requested by a system does not match a normal behavior, the building data platform 100 can deny the system the ability to perform the action and/or request approval from a higher level system.

For example, a behavior rule could indicate that a user has access to log into a system with a particular IP address between 8 A.M. through 5 P.M. However, if the user logs in to the system at 7 P.M., the building data platform 100 may contact an administrator to determine whether to give the user permission to log in.

The change feed generator 152 can be configured to generate a feed of events that indicate changes to the digital twin, e.g., to the graph. The change feed generator 152 can track changes to the entities, relationships, and/or events of the graph. For example, the change feed generator 152 can detect an addition, deletion, and/or modification of a node or edge of the graph, e.g., changing the entities, relationships, and/or events within the database 160. In response to detecting a change to the graph, the change feed generator 152 can generate an event summarizing the change. The event can indicate what nodes and/or edges have changed and how the nodes and edges have changed. The events can be posted to a topic by the change feed generator 152.

The change feed generator 152 can implement a change feed of a knowledge graph. The building data platform 100 can implement a subscription to changes in the knowledge graph. When the change feed generator 152 posts events in the change feed, subscribing systems or applications can receive the change feed event. By generating a record of all changes that have happened, a system can stage data in different ways, and then replay the data back in whatever order the system wishes. This can include running the changes sequentially one by one and/or by jumping from one major change to the next. For example, to generate a graph at a particular time, all change feed events up to the particular time can be used to construct the graph.

The change feed can track the changes in each node in the graph and the relationships related to them, in some embodiments. If a user wants to subscribe to these changes and the user has proper access, the user can simply submit a web API call to have sequential notifications of each change that happens in the graph. A user and/or system can replay the changes one by one to reinstitute the graph at any given time slice. Even though the messages are "thin" and only include notification of change and the reference "id/seq id," the change feed can keep a copy of every state of each node and/or relationship so that a user and/or system can retrieve those past states at any time for each node. Furthermore, a consumer of the change feed could also create dynamic "views" allowing different "snapshots" in time of what the graph looks like from a particular context. While the twin manager 108 may contain the history and the current state of the graph based upon schema evaluation, a consumer can retain a copy of that data, and thereby create dynamic views using the change feed.

The schema and ontology 154 can define the message schema and graph ontology of the twin manager 108. The message schema can define what format messages received by the messaging manager 140 should have, e.g., what parameters, what formats, etc. The ontology can define graph projections, e.g., the ontology that a user wishes to view. For example, various systems, applications, and/or users can be associated with a graph ontology. Accordingly, when the graph projection manager 156 generates an graph projection for a user, system, or subscription, the graph projection manager 156 can generate a graph projection according to the ontology specific to the user. For example, the ontology can define what types of entities are related in what order in a graph, for example, for the ontology for a subscription of "Customer A," the graph projection manager 156 can create relationships for a graph projection based on the rule:

Region ←→ Building ←→ Floor ←→ Space ←→ Asset

For the ontology of a subscription of "Customer B," the graph projection manager 156 can create relationships based on the rule:

Building ←→ Floor ←→ Asset

The policy manager 158 can be configured to respond to requests from other applications and/or systems for policies. The policy manager 158 can consult a graph projection to determine what permissions different applications, users, and/or devices have. The graph projection can indicate various permissions that different types of entities have and the policy manager 158 can search the graph projection to identify the permissions of a particular entity. The policy manager 158 can facilitate fine grain access control with user permissions. The policy manager 158 can apply permissions across a graph, e.g., if "user can view all data associated with floor 1" then they see all subsystem data for that floor, e.g., surveillance cameras, HVAC devices, fire detection and response devices, etc.

The twin manager 108 includes a query manager 165 and a twin function manager 167. The query manger 164 can be configured to handle queries received from a requesting system, e.g., the user device 176, the applications 110, and/or any other system. The query manager 165 can receive queries that include query parameters and context. The query manager 165 can query the graph projection database 162 with the query parameters to retrieve a result. The query manager 165 can then cause an event processor, e.g., a twin function, to operate based on the result and the context. In some embodiments, the query manager 165 can select the twin function based on the context and/or perform operates based on the context. In some embodiments, the query manager 165 is configured to perform the operations described with reference to FIGS. 5-10.

The twin function manager 167 can be configured to manage the execution of twin functions. The twin function manager 167 can receive an indication of a context query that identifies a particular data element and/or pattern in the graph projection database 162. Responsive to the particular data element and/or pattern occurring in the graph projection database 162 (e.g., based on a new data event added to the graph projection database 162 and/or change to nodes or edges of the graph projection database 162, the twin function manager 167 can cause a particular twin function to execute. The twin function can execute based on an event, context, and/or rules. The event can be data that the twin function executes against. The context can be information that provides a contextual description of the data, e.g., what device the event is associated with, what control point should be updated based on the event, etc. The twin function manager 167 can be configured to perform the operations of the FIGS. 11-15.

Figure 2:
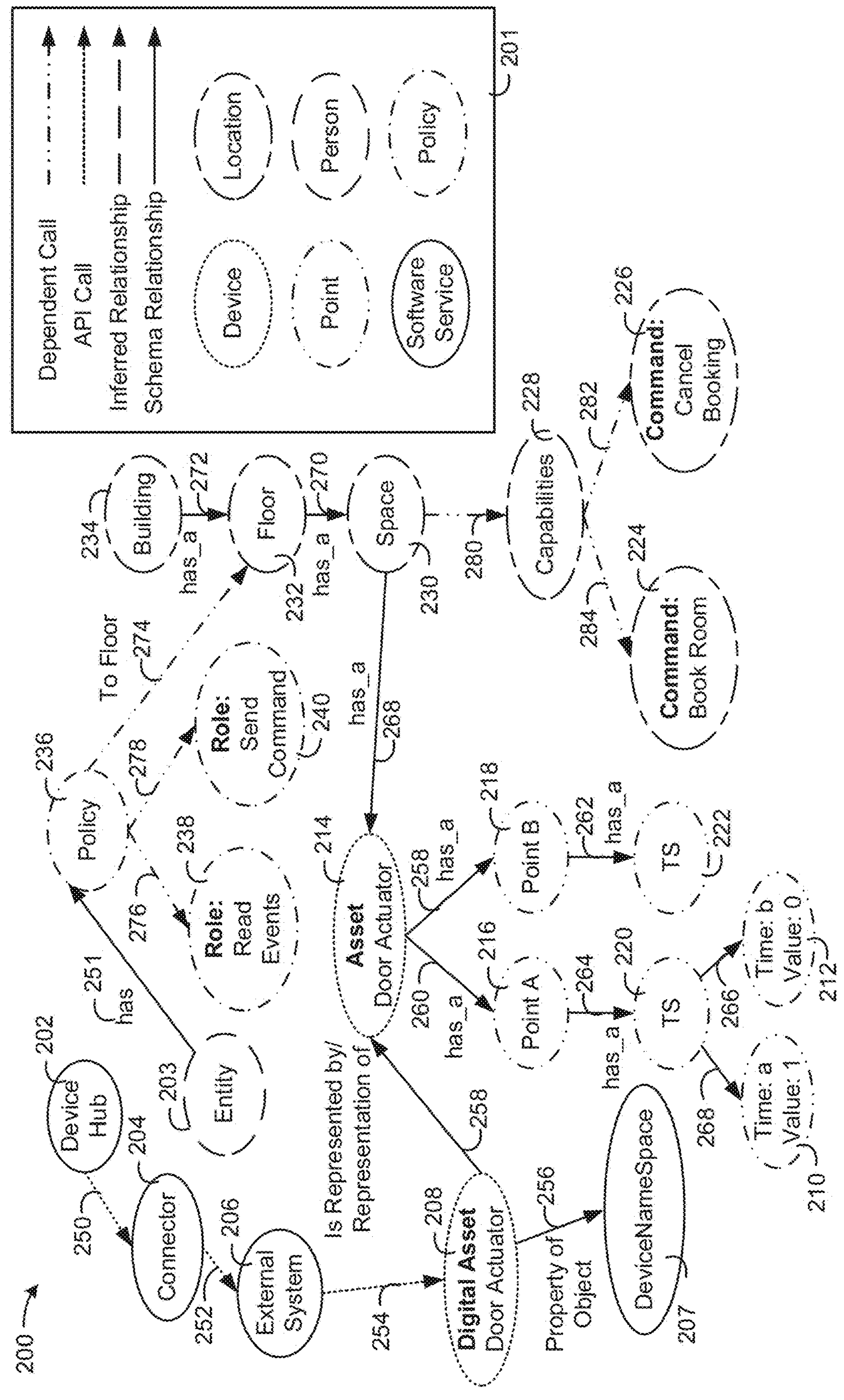
FIG. 2 is a graph projection of the twin manager of FIG. 1 including application programming interface (API) data, capability data, policy data, and services, according to an exemplary embodiment.

Referring now to FIG. 2, a graph projection 200 of the twin manager 108 including application programming interface (API) data, capability data, policy data, and services is shown, according to an exemplary embodiment. The graph projection 200 includes nodes 202-240 and edges 250-272. The nodes 202-240 and the edges 250-272 are defined according to the key 201. The nodes 202-240 represent different types of entities, devices, locations, points, persons, policies, and software services (e.g., API services). The edges 250-272 represent relationships between the nodes 202-240, e.g., dependent calls, API calls, inferred relationships, and schema relationships (e.g., BRICK relationships).

The graph projection 200 includes a device hub 202 which may represent a software service that facilitates the communication of data and commands between the cloud platform 106 and a device of the building subsystems 122, e.g., door actuator 214. The device hub 202 is related to a connector 204, an external system 206, and a digital asset "Door Actuator" 208 by edge 250, edge 252, and edge 254.

The cloud platform 106 can be configured to identify the device hub 202, the connector 204, the external system 206 related to the door actuator 214 by searching the graph projection 200 and identifying the edges 250-254 and edge 258. The graph projection 200 includes a digital representation of the "Door Actuator," node 208. The digital asset "Door Actuator" 208 includes a "DeviceNameSpace" represented by node 207 and related to the digital asset "Door Actuator" 208 by the "Property of Object" edge 256.

The "Door Actuator" 214 has points and timeseries. The "Door Actuator" 214 is related to "Point A" 216 by a "has_a" edge 260. The "Door Actuator" 214 is related to "Point B" 218 by a "has_A" edge 258. Furthermore, timeseries associated with the points A and B are represented by nodes "TS" 220 and "TS" 222. The timeseries are related to the points A and B by "has_a" edge 264 and "has_a" edge 262. The timeseries "TS" 220 has particular samples, sample 210 and 212 each related to "TS" 220 with edges 268 and 266 respectively. Each sample includes a time and a value. Each sample may be an event received from the door actuator that the cloud platform 106 ingests into the entity, relationship, and event database 160, e.g., ingests into the graph projection 200.

The graph projection 200 includes a building 234 representing a physical building. The building includes a floor represented by floor 232 related to the building 234 by the "has_a" edge from the building 234 to the floor 232. The floor has a space indicated by the edge "has_a" 270 between the floor 232 and the space 230. The space has particular capabilities, e.g., is a room that can be booked for a meeting, conference, private study time, etc. Furthermore, the booking can be canceled. The capabilities for the floor 232 are represented by capabilities 228 related to space 230 by edge 280. The capabilities 228 are related to two different commands, command "book room" 224 and command "cancel booking" 226 related to capabilities 228 by edge 284 and edge 282 respectively.

If the cloud platform 106 receives a command to book the space represented by the node, space 230, the cloud platform 106 can search the graph projection 200 for the capabilities for the 228 related to the space 230 to determine whether the cloud platform 106 can book the room.

In some embodiments, the cloud platform 106 could receive a request to book a room in a particular building, e.g., the building 234. The cloud platform 106 could search the graph projection 200 to identify spaces that have the capabilities to be booked, e.g., identify the space 230 based on the capabilities 228 related to the space 230. The cloud platform 106 can reply to the request with an indication of the space and allow the requesting entity to book the space 230.

The graph projection 200 includes a policy 236 for the floor 232. The policy 236 is related set for the floor 232 based on a "To Floor" edge 274 between the policy 236 and the floor 232. The policy 236 is related to different roles for the floor 232, read events 238 via edge 276 and send command 240 via edge 278. The policy 236 is set for the entity 203 based on has edge 251 between the entity 203 and the policy 236.

The twin manager 108 can identify policies for particular entities, e.g., users, software applications, systems, devices, etc. based on the policy 236. For example, if the cloud platform 106 receives a command to book the space 230. The cloud platform 106 can communicate with the twin manager 108 to verify that the entity requesting to book the space 230 has a policy to book the space. The twin manager 108 can identify the entity requesting to book the space as the entity 203 by searching the graph projection 200. Furthermore, the twin manager 108 can further identify the edge has 251 between the entity 203 and the policy 236 and the edge 1178 between the policy 236 and the command 240.

Furthermore, the twin manager 108 can identify that the entity 203 has the ability to command the space 230 based on the edge 1174 between the policy 236 and the edge 270 between the floor 232 and the space 230. In response to identifying the entity 203 has the ability to book the space 230, the twin manager 108 can provide an indication to the cloud platform 106.

Furthermore, if the entity makes a request to read events for the space 230, e.g., the sample 210 and the sample 212, the twin manager 108 can identify the edge has 251 between the entity 203 and the policy 236, the edge 1178 between the policy 236 and the read events 238, the edge 1174 between the policy 236 and the floor 232, the "has a" edge 270 between the floor 232 and the space 230, the edge 268 between the space 230 and the door actuator 214, the edge 260 between the door actuator 214 and the point A 216, the "has a" edge 264 between the point A 216 and the TS 220, and the edges 268 and 266 between the TS 220 and the samples 210 and 212 respectively.

Figure 3:
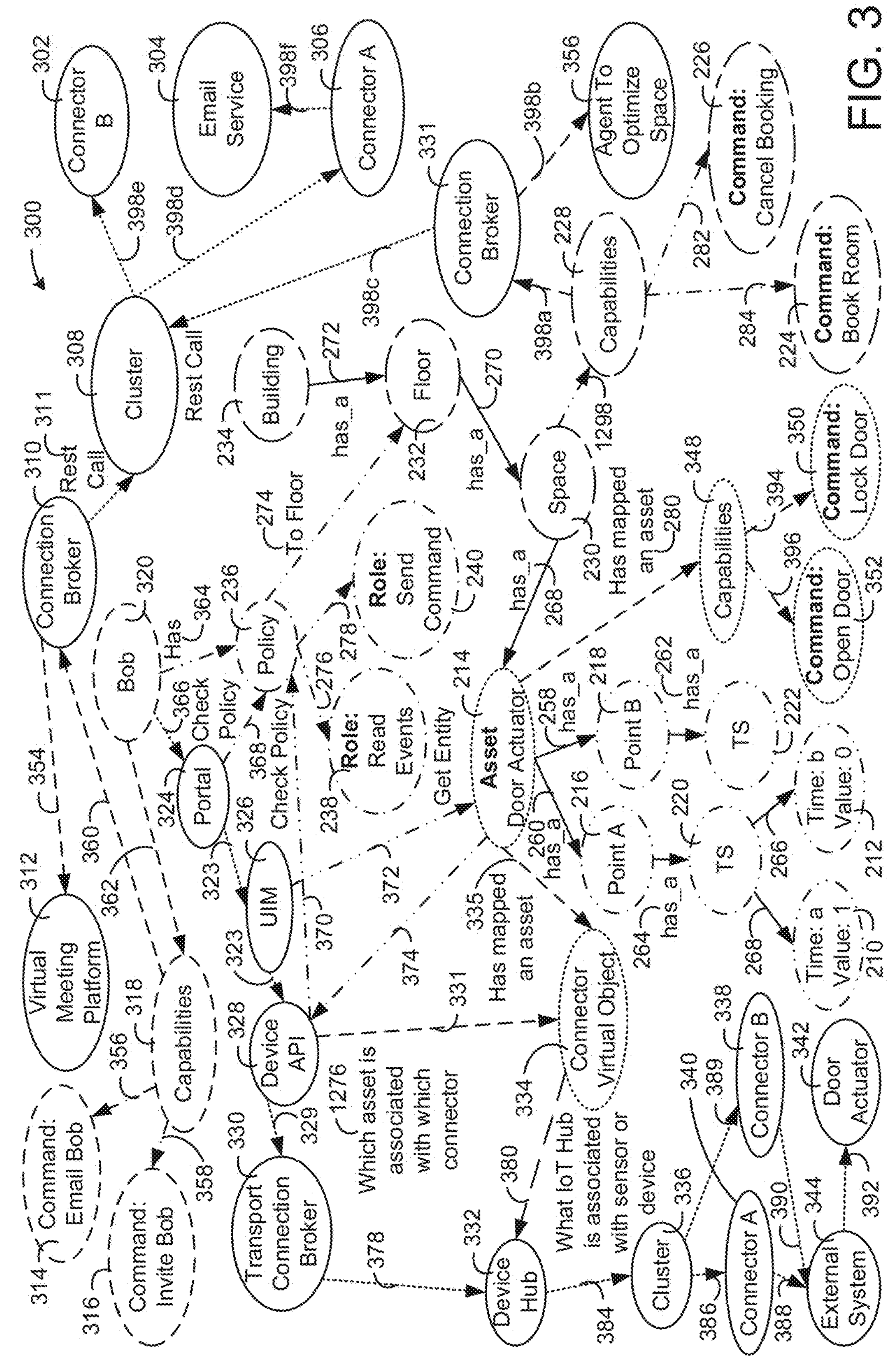
FIG. 3 is another graph projection of the twin manager of FIG. 1 including application programming interface (API) data, capability data, policy data, and services, according to an exemplary embodiment.

Referring now to FIG. 3, a graph projection 300 of the twin manager 108 including application programming interface (API) data, capability data, policy data, and services is shown, according to an exemplary embodiment. The graph projection 300 includes the nodes and edges described in the graph projection 200 of FIG. 2. The graph projection 300 includes a connection broker 331 related to capabilities 228 by edge 398*a*. The connection broker 331 can be a node representing a software application configured to facilitate a connection with another software application. In some embodiments, the cloud platform 106 can identify the system that implements the capabilities 228 by identifying the edge 398*a* between the capabilities 228 and the connection broker 331.

The connection broker 331 is related to an agent that optimizes a space 356 via edge 398*b*. The agent represented by the node 356 can book and cancel bookings for the space represented by the node 230 based on the edge 398*b* between the connection broker 331 and the node 356 and the edge 398*a* between the capabilities 228 and the connection broker 331.

The connection broker 331 is related to a cluster 308 by edge 398*c*. Cluster 308 is related to connector B 302 via edge 398*e* and connector A 306 via edge 398*d*. The connector A 306 is related to an external email service 304. A connection broker 310 is related to cluster 308 via an edge 311 representing a rest call that the connection broker represented by node 310 can make to the cluster represented by cluster 308.

The connection broker 310 is related to a virtual meeting platform 312 by an edge 354. The node 312 represents an external system that represents a virtual meeting platform. The connection broker represented by node 310 can represent a software component that facilitates a connection between the cloud platform 106 and the virtual meeting platform represented by node 312. When the cloud platform 106 needs to communicate with the virtual meeting platform represented by the node 312, the cloud platform 106 can identify the edge 354 between the connection broker 310 and the virtual meeting platform 312 and select the connection broker represented by the node 310 to facilitate communication with the virtual meeting platform represented by the node 312.

A capabilities node 318 can be connected to the connection broker 310 via edge 360. The capabilities 318 can be capabilities of the virtual meeting platform represented by the node 312 and can be related to the node 312 through the edge 360 to the connection broker 310 and the edge 354 between the connection broker 310 and the node 312. The capabilities 318 can define capabilities of the virtual meeting platform represented by the node 312. The node 320 is related to capabilities 318 via edge 362. The capabilities may be an invite bob command represented by node 316 and an email bob command represented by node 314. The capabilities 318 can be linked to a node 320 representing a user, Bob. The cloud platform 106 can facilitate email commands to send emails to the user Bob via the email service represented by the node 304. The node 304 is related to the connect a node 306 via edge 398*f* Furthermore, the cloud platform 106 can facilitate sending an invite for a virtual meeting via the virtual meeting platform represented by the node 312 linked to the node 318 via the edge 358.

The node 320 for the user Bob can be associated with the policy 236 via the "has" edge 364. Furthermore, the node 320 can have a "check policy" edge 366 with a portal node 324. The device API node 328 has a check policy edge 370 to the policy node 236. The portal node 324 has an edge 368 to the policy node 236. The portal node 324 has an edge 323 to a node 326 representing a user input manager (UIM). The portal node 324 is related to the UIM node 326 via an edge 323. The UIM node 326 has an edge 323 to a device API node 328. The UIM node 326 is related to the door actuator node 214 via edge 372. The door actuator node 214 has an edge 374 to the device API node 328. The door actuator 214 has an edge 335 to the connector virtual object 334. The device hub 332 is related to the connector virtual object via edge 380. The device API node 328 can be an API for the door actuator 214. The connector virtual object 334 is related to the device API node 328 via the edge 331.

The device API node 328 is related to a transport connection broker 330 via an edge 329. The transport connection broker 330 is related to a device hub 332 via an edge 378. The device hub represented by node 332 can be a software component that hands the communication of data and commands for the door actuator 214. The cloud platform 106 can identify where to store data within the graph projection 300 received from the door actuator by identifying the nodes and edges between the points 216 and 218 and the device hub node 332. Similarly, the cloud platform 106 can identify commands for the door actuator that can be facilitated by the device hub represented by the node 332, e.g., by identifying edges between the device hub node 332 and an open door node 352 and an lock door node 350. The door actuator 114 has an edge "has mapped an asset" 280 between the node 214 and a capabilities node 348. The capabilities node 348 and the nodes 352 and 350 are linked by edges 396 and 394.

The device hub 332 is linked to a cluster 336 via an edge 384. The cluster 336 is linked to connector A 340 and connector B 338 by edges 386 and the edge 389. The connector A 340 and the connector B 338 is linked to an external system 344 via edges 388 and 390. The external system 344 is linked to a door actuator 342 via an edge 392.

Figure 4:
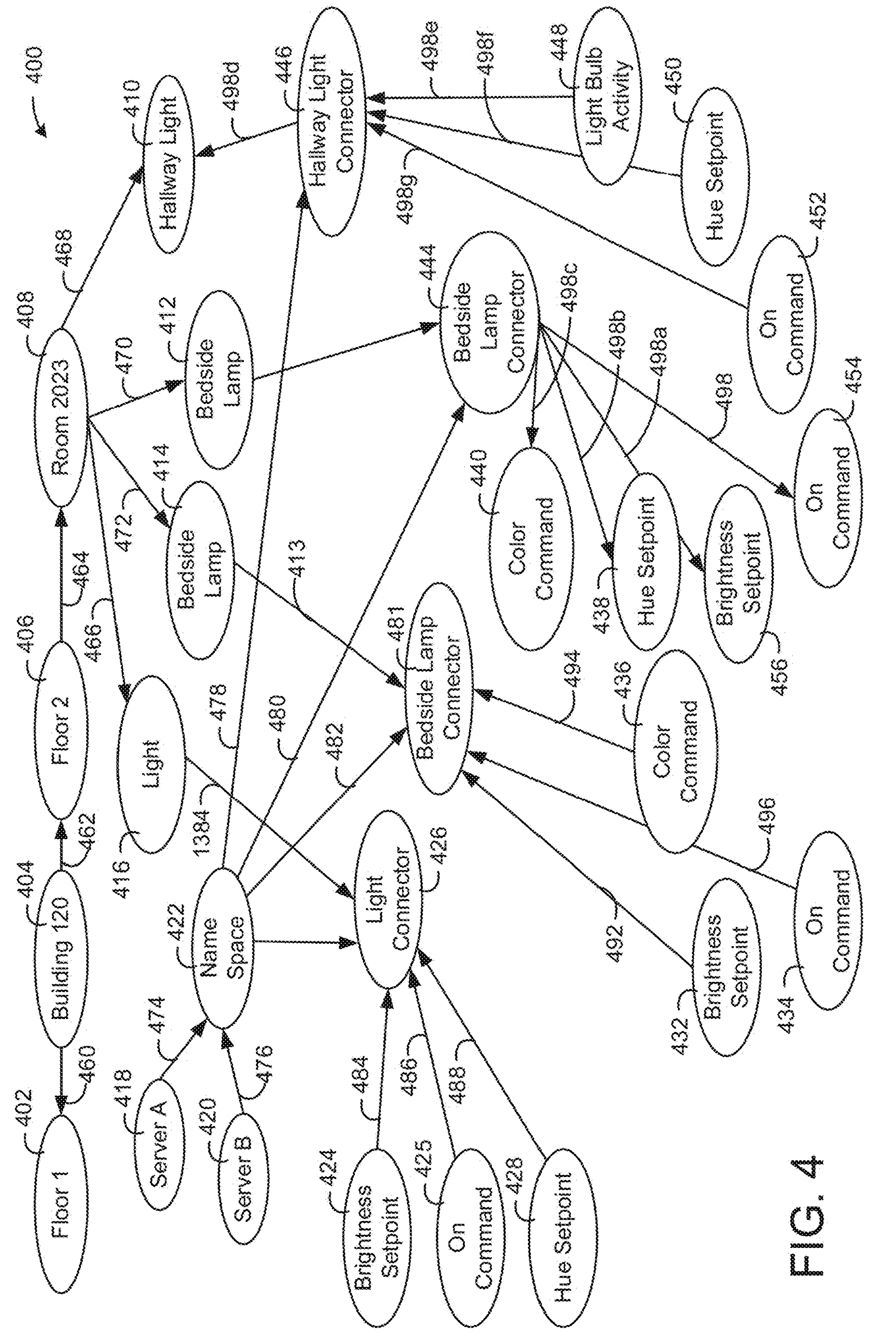
FIG. 4 is a graph projection of the twin manager of FIG. 1 including equipment and capability data for the equipment, according to an exemplary embodiment.

Referring now to FIG. 4, a graph projection 400 of the twin manager 108 including equipment and capability data for the equipment is shown, according to an exemplary embodiment. The graph projection 400 includes nodes 402-456 and edges 360-498*f*. The cloud platform 106 can search the graph projection 400 to identify capabilities of different pieces of equipment.

A building node 404 represents a particular building that includes two floors. A floor 1 node 402 is linked to the building node 404 via edge 460 while a floor 2 node 406 is linked to the building node 404 via edge 462. The floor 2 includes a particular room 2023 represented by edge 464 between floor 2 node 406 and room 2023 node 408. Various pieces of equipment are included within the room 2023. A light represented by light node 416, a bedside lamp node 414, a bedside lamp node 412, and a hallway light node 410 are related to room 2023 node 408 via edge 466, edge 472, edge 470, and edge 468.

The light represented by light node 416 is related to a light connector 426 via edge 484. The light connector 426 is related to multiple commands for the light represented by the light node 416 via edges 484, 486, and 488. The commands may be a brightness setpoint 424, an on command 425, and a hue setpoint 428. The cloud platform 106 can receive a request to identify commands for the light represented by the light 416 and can identify the nodes 424-428 and provide an indication of the commands represented by the node 424-428 to the requesting entity. The requesting entity can then send commands for the commands represented by the nodes 424-428.

The bedside lamp node 414 is linked to a bedside lamp connector 481 via an edge 413. The connector 481 is related to commands for the bedside lamp represented by the bedside lamp node 414 via edges 492, 496, and 494. The command nodes are a brightness setpoint node 432, an on command node 434, and a color command 436. The hallway light 410 is related to a hallway light connector 446 via an edge 498*d*. The hallway light connector 446 is linked to multiple commands for the hallway light node 410 via edges 498*g*, 498*f*, and 498*e*. The commands are represented by an on command node 452, a hue setpoint node 450, and a light bulb activity node 448.

The graph projection 400 includes a name space node 422 related to a server A node 418 and a server B node 420 via edges 474 and 476. The name space node 422 is related to the bedside lamp connector 481, the bedside lamp connector 444, and the hallway light connector 446 via edges 482, 480, and 478. The bedside lamp connector 444 is related to commands, e.g., the color command node 440, the hue setpoint command 438, a brightness setpoint command 456, and an on command 454 via edges 498*c*, 498*b*, 498*a*, and 498.

Figure 5:
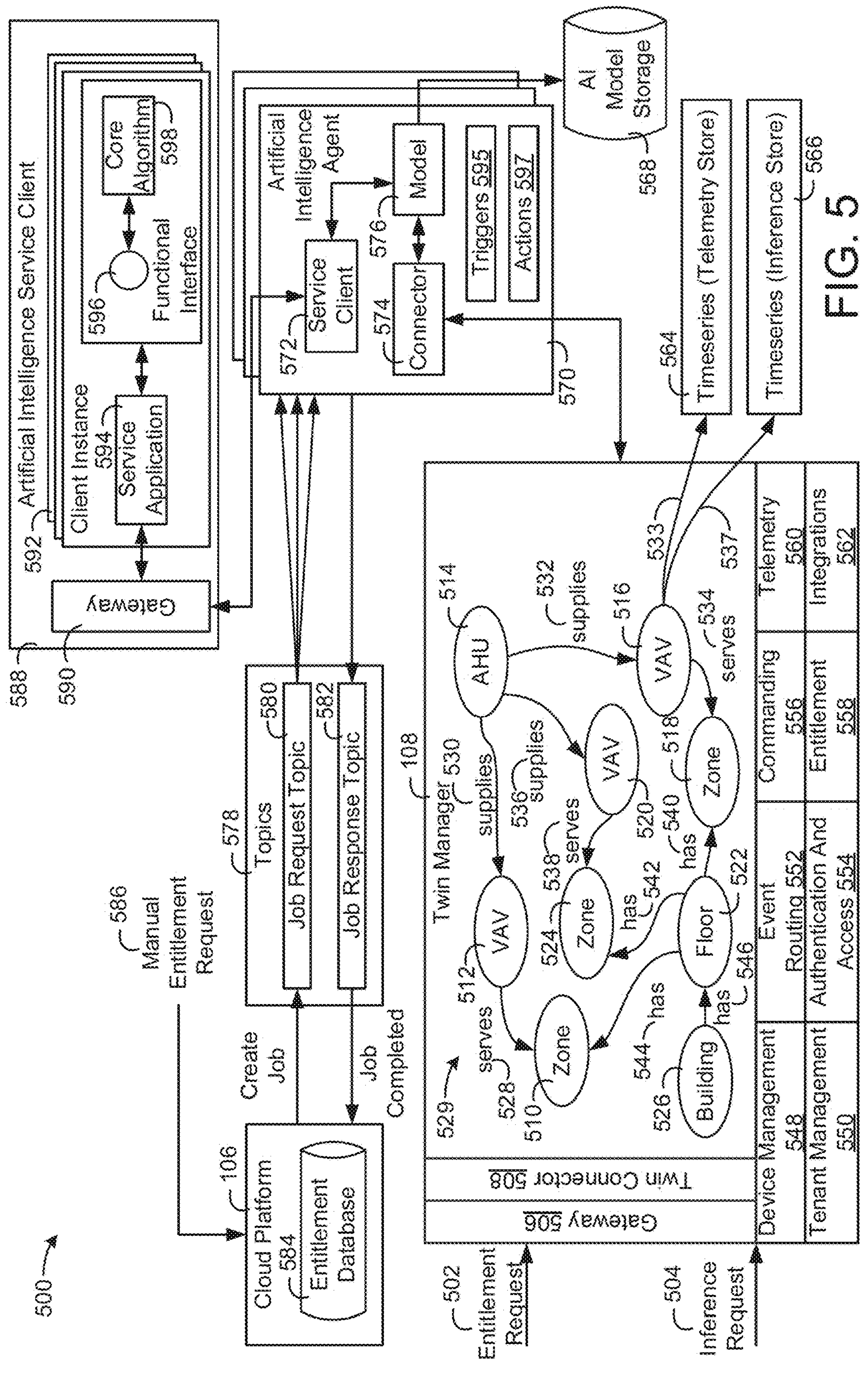
FIG. 5 is a block diagram of a system for managing a digital twin where an artificial intelligence agent can be executed to infer information for an entity of a graph, according to an exemplary embodiment.

Referring now to FIG. 5, a system 500 for managing a digital twin where an artificial intelligence agent can be executed to infer and/or predict information for an entity of a graph is shown, according to an exemplary embodiment. The system 500 can be components of the building data platform 100, e.g., components run on the processors and memories of the edge platform 102, the cloud platform 106, the twin manager 108, and/or the applications 110. The system 500 can, in some implementations, implement a digital twin with artificial intelligence.

A digital twin (or a shadow) may be a computing entity that describes a physical thing (e.g., a building, spaces of a building, devices of a building, people of the building, equipment of the building, etc.) through modeling the physical thing through a set of attributes that define the physical thing. A digital twin can refer to a digital replica of physical assets (a physical device twin) and can be extended to store processes, people, places, systems that can be used for various purposes. The digital twin can include both the ingestion of information and actions learned and executed through artificial intelligence agents.

In FIG. 5, the digital twin can be a graph 529 managed by the twin manager 108 and/or artificial intelligence agents 570. In some embodiments, the digital twin is the combination of the graph 529 with the artificial intelligence agents 570. In some embodiments, the digital twin enables the creation of a chronological time-series database of telemetry events for analytical purposes. In some embodiments, the graph 529 uses the BRICK schema.

The twin manager 108 stores the graph 529 which may be a graph data structure including various nodes and edges interrelating the nodes. The graph 529 may be the same as, or similar to, the graph projections described herein with reference to FIGS. 1-4. The graph 529 includes nodes 510-526 and edges 528-546. The graph 529 includes a building node 526 representing a building that has a floor indicated by the "has" edge 546 to the floor node 522. The floor node 522 is relate to a zone node 510 via a "has" edge 544 indicating that the floor represented by the node 522 has a zone represented by the zone 510.

The floor node 522 is related to the zone node 518 by the "has" edge 540 indicating that the floor represented by the floor node 522 has another zone represented by the zone node 518. The floor node 522 is related to another zone node 524 via a "has" edge 542 representing that the floor represented by the floor node 522 has a third zone represented by the zone node 524.

The graph 529 includes an AHU node 514 representing an AHU of the building represented by the building node 526. The AHU node 514 is related by a "supplies" edge 530 to the VAV node 512 to represent that the AHU represented by the AHU node 514 supplies air to the VAV represented by the VAV node 512. The AHU node 514 is related by a "supplies" edge 536 to the VAV node 520 to represent that the AHU represented by the AHU node 514 supplies air to the VAV represented by the VAV node 520. The AHU node 514 is related by a "supplies" edge 532 to the VAV node 516 to represent that the AHU represented by the AHU node 514 supplies air to the VAV represented by the VAV node 516.

The VAV node 516 is related to the zone node 518 via the "serves" edge 534 to represent that the VAV represented by the VAV node 516 serves (e.g., heats or cools) the zone represented by the zone node 518. The VAV node 520 is related to the zone node 524 via the "serves" edge 538 to represent that the VAV represented by the VAV node 520 serves (e.g., heats or cools) the zone represented by the zone node 524. The VAV node 512 is related to the zone node 510 via the "serves" edge 528 to represent that the VAV represented by the VAV node 512 serves (e.g., heats or cools) the zone represented by the zone node 510.

Furthermore, the graph 529 includes an edge 533 related to a timeseries node 564. The timeseries node 564 can be information stored within the graph 529 and/or can be information stored outside the graph 529 in a different database (e.g., a timeseries database). In some embodiments, the timeseries node 564 stores timeseries data (or any other type of data) for a data point of the VAV represented by the VAV node 516. The data of the timeseries node 564 can be aggregated and/or collected telemetry data of the timeseries node 564.

Furthermore, the graph 529 includes an edge 537 related to a timeseries node 566. The timeseries node 566 can be information stored within the graph 529 and/or can be information stored outside the graph 529 in a different database (e.g., a timeseries database). In some embodiments, the timeseries node 566 stores timeseries data (or any other type of data) for a data point of the VAV represented by the VAV node 516. The data of the timeseries node 564 can be inferred information, e.g., data inferred by one of the artificial intelligence agents 570 and written into the timeseries node 564 by the artificial intelligence agent 570. In some embodiments, the timeseries 564 and/or 566 are stored in the graph 529 but are stored as references to timeseries data stored in a timeseries database.

The twin manager 108 includes various software components. For example, the twin manager 108 includes a device management component 548 for managing devices of a building. The twin manager 108 includes a tenant management component 550 for managing various tenant subscriptions. The twin manager 108 includes an event routing component 552 for routing various events. The twin manager 108 includes an authentication and access component 554 for performing user and/or system authentication and grating the user and/or system access to various spaces, pieces of software, devices, etc. The twin manager 108 includes a commanding component 556 allowing a software application and/or user to send commands to physical devices. The twin manager 108 includes an entitlement component 558 that analyzes the entitlements of a user and/or system and grants the user and/or system abilities based on the entitlements. The twin manager 108 includes a telemetry component 560 that can receive telemetry data from physical systems and/or devices and ingest the telemetry data into the graph 529. Furthermore, the twin manager 108 includes an integrations component 562 allowing the twin manager 108 to integrate with other applications.

The twin manager 108 includes a gateway 506 and a twin connector 508. The gateway 506 can be configured to integrate with other systems and the twin connector 508 can be configured to allow the gateway 506 to integrate with the twin manager 108. The gateway 506 and/or the twin connector 508 can receive an entitlement request 502 and/or an inference request 504. The entitlement request 502 can be a request received from a system and/or a user requesting that an AI agent action be taken by the AI agent 570. The entitlement request 502 can be checked against entitlements for the system and/or user to verify that the action requested by the system and/or user is allowed for the user and/or system. The inference request 504 can be a request that the AI agent 570 generates an inference, e.g., a projection of information, a prediction of a future data measurement, an extrapolated data value, etc.

The cloud platform 106 is shown to receive a manual entitlement request 586. The request 586 can be received from a system, application, and/or user device (e.g., from the applications 110, the building subsystems 122, and/or the user device 176). The manual entitlement request 586 may be a request for the AI agent 570 to perform an action, e.g., an action that the requesting system and/or user has an entitlement for. The cloud platform 106 can receive the manual entitlement request 586 and check the manual entitlement request 586 against an entitlement database 584 storing a set of entitlements to verify that the requesting system has access to the user and/or system. The cloud platform 106, responsive to the manual entitlement request 586 being approved, can create a job for the AI agent 570 to perform. The created job can be added to a job request topic 580 of a set of topics 578.

The job request topic 580 can be fed to AI agents 570. For example, the topics 580 can be fanned out to various AI agents 570 based on the AI agent that each of the topics 580 pertains to (e.g., based on an identifier that identifies an agent and is included in each job of the topic 580). The AI agents 570 include a service client 572, a connector 574, and a model 576. The model 576 can be loaded into the AI agent 570 from a set of AI models stored in the AI model storage 568. The AI model storage 568 can store models for making energy load predictions for a building, weather forecasting models for predicting a weather forecast, action/decision models to take certain actions responsive to certain conditions being met, an occupancy model for predicting occupancy of a space and/or a building, etc. The models of the AI model storage 568 can be neural networks (e.g., convolutional neural networks, recurrent neural networks, deep learning networks, etc.), decision trees, support vector machines, and/or any other type of artificial intelligence, machine learning, and/or deep learning category. In some embodiments, the models are rule based triggers and actions that include various parameters for setting a condition and defining an action.

The AI agent 570 can include triggers 595 and actions 597. The triggers 595 can be conditional rules that, when met, cause one or more of the actions 597. The triggers 595 can be executed based on information stored in the graph 529 and/or data received from the building subsystems 122. The actions 597 can be executed to determine commands, actions, and/or outputs. The output of the actions 597 can be stored in the graph 529 and/or communicated to the building subsystems 122.

The AI agent 570 can include a service client 572 that causes an instance of an AI agent to run. The instance can be hosted by the artificial intelligence service client 588. The client 588 can cause a client instance 592 to run and communicate with the AI agent 570 via a gateway 590. The client instance 592 can include a service application 594 that interfaces with a core algorithm 598 via a functional interface 596. The core algorithm 598 can run the model 576, e.g., train the model 576 and/or use the model 576 to make inferences and/or predictions.

In some embodiments, the core algorithm 598 can be configured to perform learning based on the graph 529. In some embodiments, the core algorithm 598 can read and/or analyze the nodes and relationships of the graph 529 to make decisions. In some embodiments, the core algorithm 598 can be configured to use telemetry data (e.g., the timeseries data 564) from the graph 529 to make inferences on and/or perform model learning. In some embodiments, the result of the inferences can be the timeseries 566. In some embodiments, the timeseries 564 is an input into the model 576 that predicts the timeseries 566.

In some embodiments, the core algorithm 598 can generate the timeseries 566 as an inference for a data point, e.g., a prediction of values for the data point at future times. The timeseries 564 may be actual data for the data point. In this regard, the core algorithm 598 can learn and train by comparing the inferred data values against the true data values. In this regard, the model 576 can be trained by the core algorithm 598 to improve the inferences made by the model 576.

Figure 6:
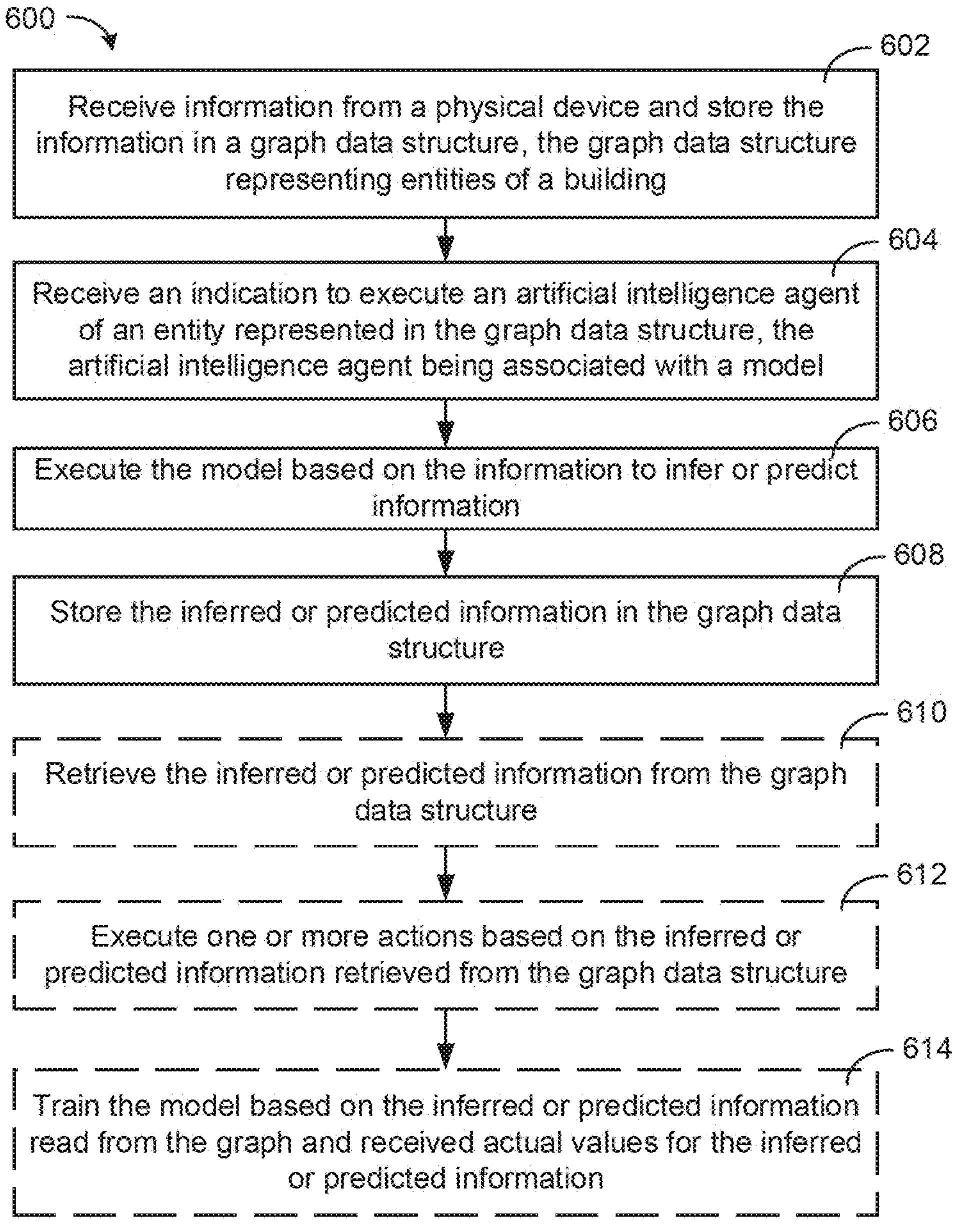
FIG. 6 is a flow diagram of a process for executing an artificial intelligence agent to infer and/or predict information, according to an exemplary embodiment.

Referring now to FIG. 6, a process 600 for executing an artificial intelligence agent to infer and/or predict information is shown, according to an exemplary embodiment. The process 600 can be performed by the system 500 and/or components of the system 500. The process 600 can be performed by the building data platform 100. Furthermore, the process 600 can be performed by any computing device described herein.

In step 602, the twin manager 108 receives information from a physical device and stores the information, or a link to the information, in the graph 529. For example, the telemetry component 560 can receive telemetry data from physical devices, e.g., the building subsystems 122. The telemetry can be measured data values, a log of historical equipment commands, etc. The telemetry component 560 can store the received information in the graph 529 by relating a node storing the information to a node representing the physical device. For example, the telemetry component 560 can store timeseries data as the timeseries 566 along by identifying that the physical device is a VAV represented by the VAV node 516 and that an edge 537 relates the VAV node 516 to the timeseries node 566.

In step 604, the twin manager 108 and/or the cloud platform 106 receives an indication to execute an artificial intelligence agent of an entity represented in the graph 529, the AI agent being associated with a model. In some embodiments, the indication is created by a user and provided via the user device 176. In some embodiments, the indication is created by an application, e.g., one of the applications 110. In some embodiments, the indication is a triggering event that triggers the agent and is received from the building subsystems 122 and/or another agent (e.g., an output of one agent fed into another agent).

In some embodiments, the AI agent is an agent for a specific entity represented in the graph 529. For example, the agent could be a VAV maintenance agent configured to identify whether a VAV (e.g., a VAV represented by the nodes 512, 520, and/or 516) should have maintenance performed at a specific time. Another agent could be a floor occupant prediction agent that is configure to predict the occupancy of a particular floor of a building, e.g., the floor represented by the floor node 522.

Responsive to receiving the indication, in step 606, the AI agent 570 causes a client instance 592 to run the model 576 based on the information received in step 602. In some embodiments, the information received in step 602 is provided directly to the AI agent 570. In some embodiments, the information is read from the graph 529 by the AI agent 570.

In step 608, the AI agent 570 stores the inferred and/or predicted information in the graph 529 (or stores the inferred and/or predicted information in a separate data structure with a link to the graph 529). In some embodiments, the AI agent 570 identifies that the node that represents the physical entity that the AI agent 570 inferred and/or predicted information for, e.g., the VAV represented by the VAV 516. The AI agent 570 can identify that the timeseries node 566 stores the inferred and/or predicted information by identifying the edge 537 between the VAV node 516 and the timeseries node 566.

In step 610, the AI agent 570 can retrieve the inferred or predicted information from the graph 529 responsive to receiving an indication to execute the model of the AI agent 570 of the inferred or predicted information, e.g., similar to the step 604. In step 612, the AI agent 570 can execute one or more actions based on the inferred and/or predicted information of the step 610 based the inferred and/or predicted information retrieved from the graph 529. In some embodiments, the AI agent 570 executes the model 576 based on the inferred and/or predicted information.

In step 614, the AI agent 570 can train the model 576 based on the inferred or predicted information read from the graph 529 and received actual values for the inferred or predicted information. In some embodiments, the AI agent 570 can train and update parameters of the model 576. For example, the timeseries 564 may represent actual values for a data point of the VAV represented by the VAV node 516. The timeseries 566 can be the inferred and/or predicted information. The AI agent 570 can compare the timeseries 564 and the timeseries 566 to determine an error in the inferences and/or predictions of the model 576. The error can be used by the model 576 to update and train the model 576.

Figure 7:
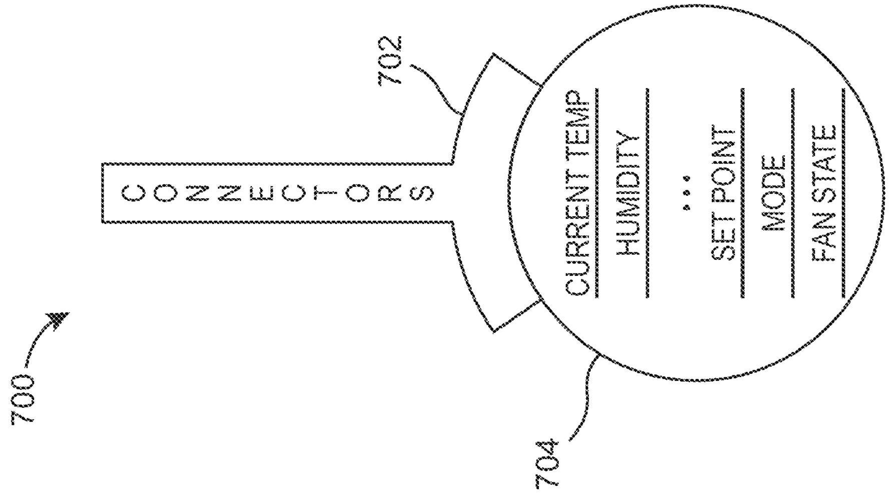
FIG. 7 is a diagram of a digital twin including a connector and a database, according to an exemplary embodiment.

Referring now to FIG. 7, a digital twin 700 including a connector and a database is shown, according to an exemplary embodiment. The digital twin 700 can be a software component stored and/or managed by the building data platform 100. The building data platform 100 includes connectors 702 and a database 704. The database 704 can store data attributes for a physical entity, e.g., a building, a VAV, etc. that describe the current state and/or operation of the physical entity. The connector 702 can be a software component that receives data from the physical device represented by the digital twin 700 and updates the attributes of the database 704. For example, the connector 702 can ingest device telemetry data into the database 704 to update the attributes of the digital twin 700.

Figure 8:
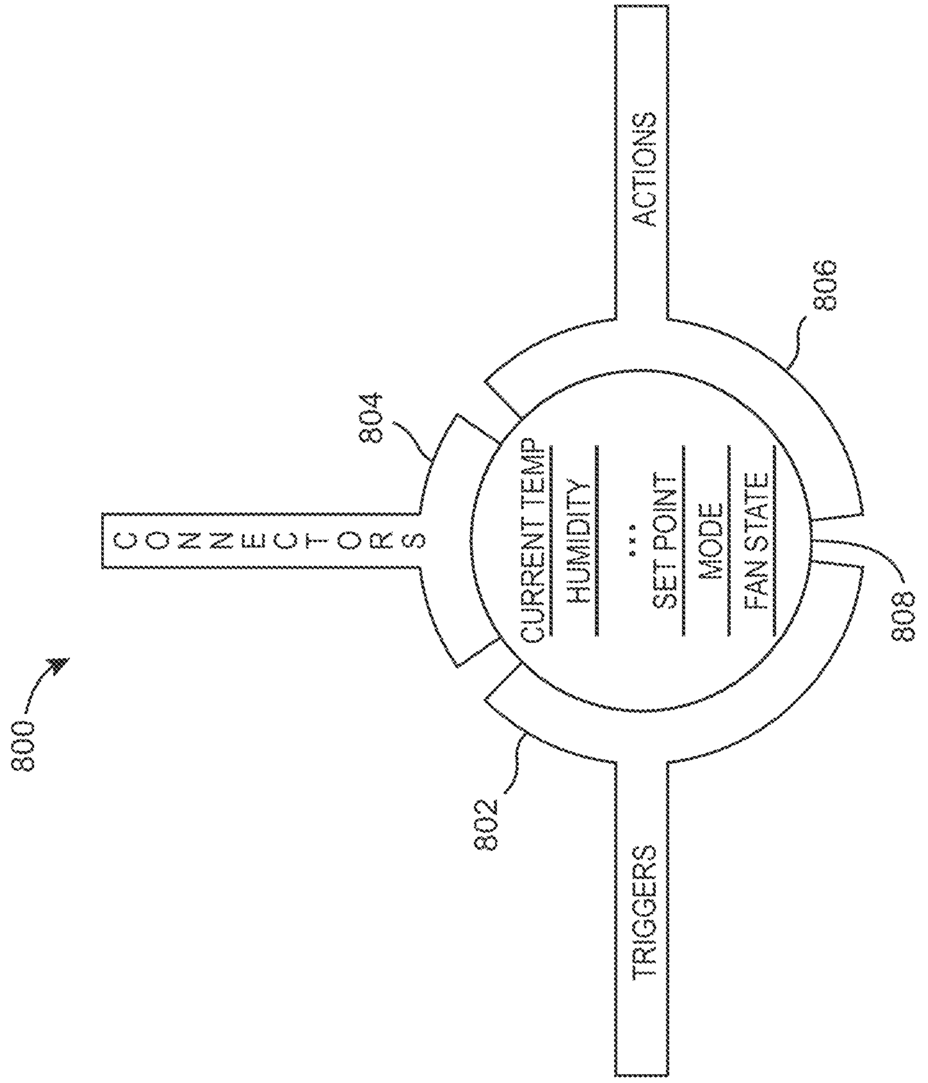
FIG. 8 is a block diagram of a digital twin including triggers, connectors, actions, and a graph, according to an exemplary embodiment.

Referring now to FIG. 8, a digital twin 800 including triggers 802, connectors 804, actions 806, and a graph 808 is shown, according to an exemplary embodiment. The digital twin 800 can be a digital replica of physical assets (e.g., a physical device twin, sensor twin, actuator twin, building device twin, etc.) and can be used to store processes, people, places, systems that can be used for various purposes. The digital twins can be created, managed, stored, and/or operated on by the building data platform 100.

In some cases, the devices can also be actuated on (told to perform an action). For example, a thermostat has sensors to measure temperature and humidity. A thermostat can also be asked to perform an action of setting the setpoint for a HVAC system. In this regard, the digital twin 800 can be configured so that information that the digital twin 800 can be made aware of can be stored by the digital twin 800 and there are also actions that the digital twin 800 can take.

The digital twin 800 can include a connector 804 that ingests device telemetry into the graph 808 and/or update the digital twin attributes stored in the graph 808. In some embodiments, the connectors 804 can ingest external data received from external data sources into the graph 808. The external data could be weather data, calendar data, etc. In some embodiments, the connectors 804 can send commands back to the devices, e.g., the actions determined by the actions 806.

The digital twin 800 includes triggers 802 which can set conditional logic for triggering the actions 706. The digital twin 800 can apply the attributes stored in the graph 808 against a rule of the triggers 802. When a particular condition of the rule of the triggers 802 involving that attribute is met, the actions 706 can execute. One example of a trigger could be a conditional question, "when the temperature of the zone managed by the thermostat reaches x degrees Fahrenheit." When the question is met by the attributes store din the graph 808, a rule of the actions 706 can execute.

The digital twin 800 can, when executing the actions 806, update an attribute of the graph 808, e.g., a setpoint, an operating setting, etc. These attributes can be translated into commands that the building data platform 100 can send to physical devices that operate based on the setpoint, the operating setting, etc. An example of an action rule for the actions 806 could be the statement, "update the setpoint of the HVAC system for a zone to x Degrees Fahrenheit."

In some embodiments, the triggers 802 and/or the actions 806 are predefined and/or manually defined through user input of the user device 176. In some cases, it may be difficult for a user to determine what the parameter values of the trigger rule should be (e.g., what values maximize a particular reward or minimize a particular penalty). Similarly, it may be difficult for a user to determine what the parameter values of the action rule should be (e.g., what values maximize the particular reward or minimize the particular penalty). Furthermore, even if the user is able to identify the ideal parameter values for the triggers 802 and the actions 806, the ideal values for the parameters may not be constant and may instead change over time. Therefore, it would be desirable if the values of the attributes for the triggers 802 and the actions 806 are tuned optimally and automatically by the building data platform 100 by observing the responses from other related digital twins.

Causal patterns between one or more digital twins having their triggering conditions satisfied and one or more digital twins (including the triggering digital twin) actuating by sending specific commands to their physical counterparts could be learned and defined by the building data platform 100. Automated learning can be used by the building data platform 100 during real operations, by running simulations using digital twins, or using predicted inference within the digital twin. There may not even be the need for all standard operating procedures in building systems to be defined upfront by a user since patterns of interaction between digital twins can be learned by the building data platform 100 to define and recommend those to building and facility owners.

Figure 9:
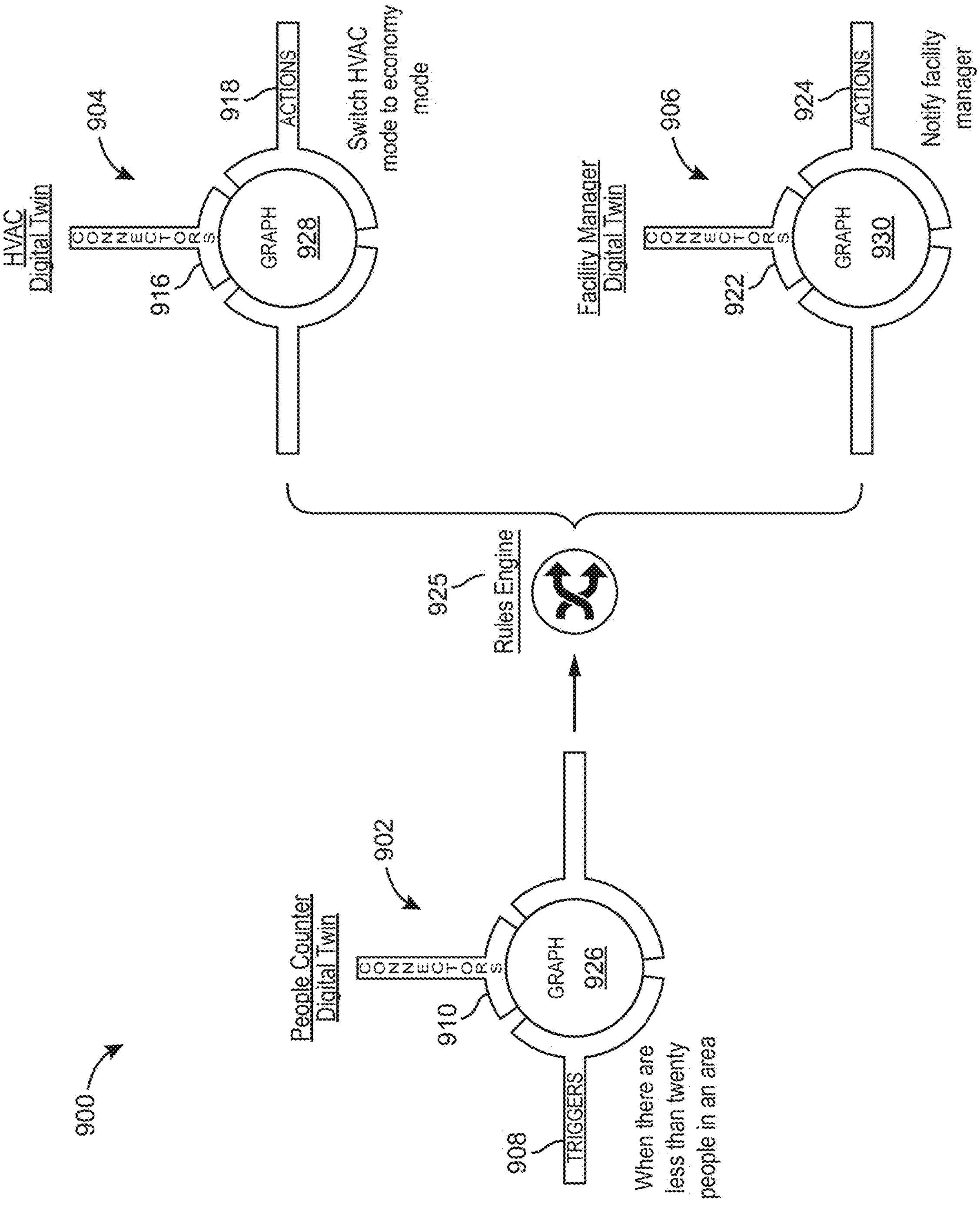
FIG. 9 is a block diagram of a people counter digital twin, an HVAC digital twin, and a facility manager digital twin that have triggers and actions that are interconnected, according to an exemplary embodiment.

Referring now to FIG. 9, a system 900 of digital twins including a people counter digital twin 902, an HVAC digital twin 904, and a facility manager digital twin 906 that have triggers and actions that are interconnected is shown, according to an exemplary embodiment. In FIG. 9, the people counter digital twin 902 is shown including triggers 908, connectors 910, actions 912, and the graph 926.

The system 900 further includes an HVAC digital twin 904 that includes triggers 914, connectors 916, and actions 918. The system further includes the facility manager digital twin 906 that includes triggers 920, connectors 922, and actions 924. In some embodiments, the graph 926, the graph 928, and the graph 930 are the same graph or different graphs. In some embodiments, the graphs 926-930 are the graph 529.

In the system 900, the actions 912 are connected to the triggers 914 and the triggers 920. In this regard, whatever action is taken by the people counter digital twin 902, the result of the action will be provided to the HVAC digital twin 904 and the facility manager digital twin 906. The people counter digital twin 902 can output a "low occupancy" attribute which can be stored in the graph 926 and/or provided to the HVAC digital twin 904 and/or the facility manager digital twin 906. In some embodiments, if all of the digital twins use and/or have access to the same graph, if the people counter digital twin 902 stores the low occupancy indicator in the graph, the HVAC digital twin 904 and the facility manager digital twin 906 can read the attribute from the graph.

In some embodiments, the trigger 908 is the logical condition, "when there are less than twenty people in a particular area." Responsive to an occupancy count of the particular area is less than twenty, which the people counter digital twin 902 can determine from models and/or information of the graph 926, a low occupancy indication can be generated by the actions 912. The low occupancy indication can be provided to the HVAC digital twin 904.

In some embodiments, the trigger 914 of the HVAC digital twin 904 can be the logical condition, "if there is low occupancy." Similarly, the trigger 920 of the facility manager digital twin 906 can be the logical condition, "if there is low occupancy." Responsive to the trigger 914 being triggered, the actions 918 can execute to switch an HVAC mode to an economy mode. The economy mode status for an HVAC system can be stored in the graph 928 and/or communicated to an HVAC controller to execute on. Responsive to the trigger 920 being triggered, the actions 924 can execute to notify a facility manager of the low occupancy status, e.g., send a notification to a user device of the facility manager.

In some embodiments, the digital twins of the system 900 can be solution twins, e.g., the people counter digital twin 902, the HVAC digital twin 904, the facility manager digital twin 906, etc. The digital twin can be a solution twin because it represents a particular software solutions for the building. For example, in some embodiments, an occupancy sensor digital twin of a zone could be triggered with under-utilized criteria (e.g., the triggering of the people counter digital twin 902 shown in FIG. 9). The people counter digital twin 902 could be configured to identify what AHU is serving the zone that it has made an occupancy detection for based on the nodes and/or edges of the graph 926 relating a zone node for the zone and an AHU node for the AHU. In some embodiments, the AHU digital twin can evaluate the desired setting for the zone through running a simulation with one or more models. In some embodiments, an FM digital twin can evaluate space arrangement and/or purposing.

Figure 10:
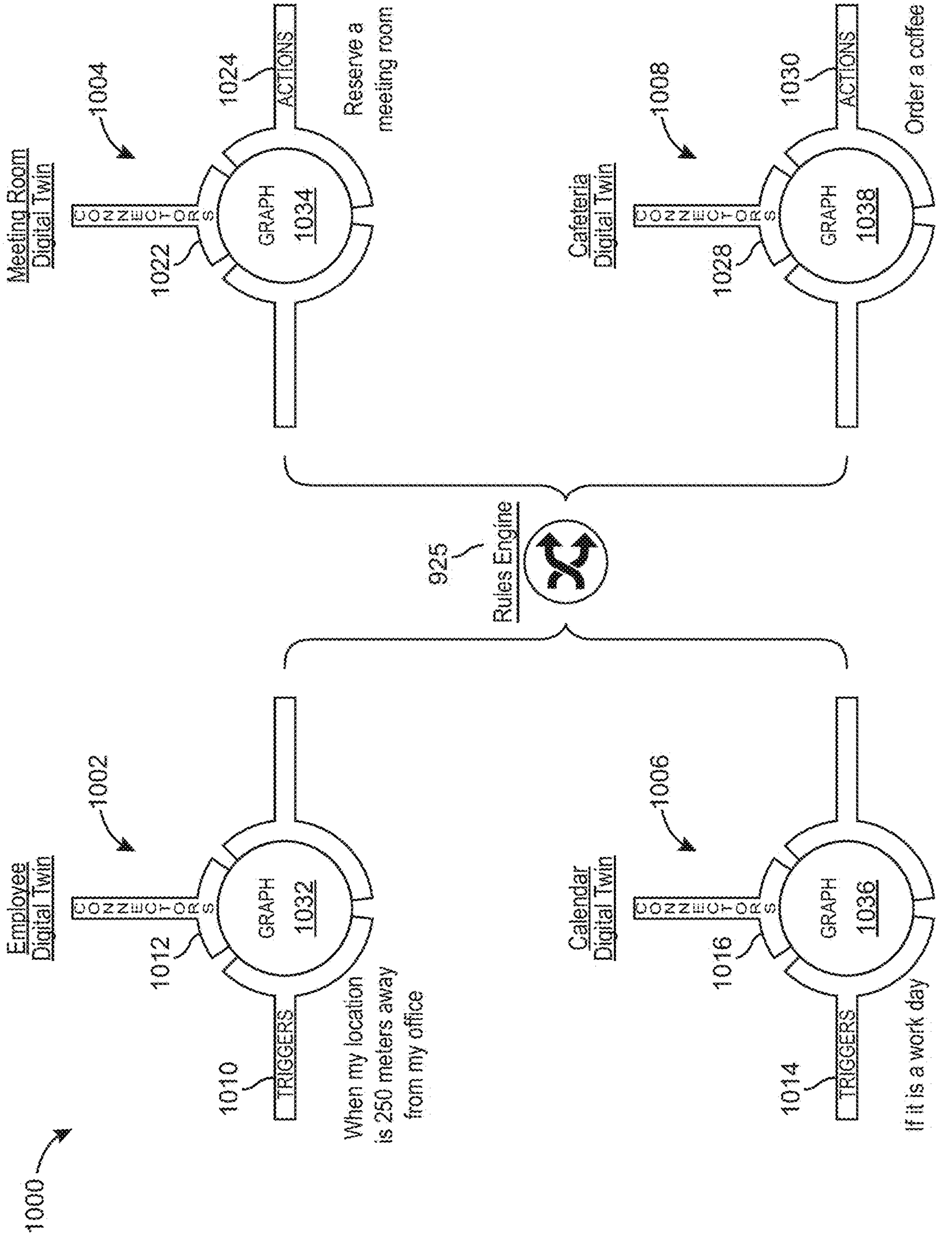
FIG. 10 is a block diagram of an employee digital twin, a calendar digital twin, a meeting room digital twin, and a cafeteria digital twin that have triggers and actions that are interconnected, according to an exemplary embodiment.

Referring now to FIG. 10, a system 1000 including an employee digital twin 1002, a calendar digital twin 1006, a meeting room digital twin 1004, and a cafeteria digital twin 1008 that have triggers and actions that are interconnected is shown, according to an exemplary embodiment. The system 1000 includes a solution digital twin for an employee, a meeting room, a cafeteria, and a calendar. In the system 1000, an employee digital twin 1002 and a calendar digital twin 1006 cause one or more associated digital twins, a meeting room digital twin 1004 and a cafeteria digital twin 1008 to execute. In FIG. 10, the state of the digital twins 1002 and 1006 are provided to the digital twins 1004 and 1008 as conditions for the triggers 1020 and 1026. The calendar digital twin 1006 can include a connector 1016, the meeting room digital twin can include a connector 1022, and the cafeteria digital twin 1008 can include a connector 1028 for ingesting information into the graphs 1034-1038.

In FIG. 10, the employee digital twin 1002 includes a graph 1032, the calendar digital twin 1006 includes a graph 1036, the meeting room digital twin 1004 includes a graph 1034, and the cafeteria digital twin 1008 includes a graph 1038. The graphs 1032-1038 can be the same graphs and/or different graphs and can be the same as, or similar to, the graph 529.

The employee digital twin 1002 can generate an "occupant near office" indication via the actions 1012 responsive to the trigger 1010 triggering when a particular occupant is a particular instance (e.g., 250 meters) from their office. The digital twin 1002 can identify the occupant, the occupant's office, and the location of the office through analyzing the nodes and/or edge of the graph 1032. The calendar digital twin 1006 determines, based on calendar data (e.g., calendar data stored in the graph 1036), whether it is a work day via the trigger 1014 (e.g., is a day Monday through Friday). Responsive to determining that it is a work day, the calendar digital twin 1006 generates an indication that it is a work day via the actions 1018.

The meeting room digital twin 1004 can receive the work day indication from the calendar digital twin 1006 and can receive the occupant near office indication from the employee digital twin 1002. The meeting room digital twin 1004 can take actions to reserve a meeting room via the actions 1024 responsive to the trigger 1020 indicating that the occupant is near their office and it is a work day. The cafeteria digital twin 1008 can receive the "occupant near office" indication from the employee digital twin 1002 and can receive the "it is a work day" indication from the calendar digital twin 1006. The cafeteria digital twin 1008 can trigger the ordering of a coffee for the occupant via the trigger 1030 responsive to the trigger 1026 being triggered.

Referring now to FIG. 11, a process 1100 of an agent executing a trigger rule and an action rule is shown, according to an exemplary embodiment. The process 1100 can be performed by the system 500 and/or components of the system 500. In some embodiments, the building data platform 100 can perform the process 1100. Furthermore, the process 1100 can be performed by any computing device described herein.

In step 1102, the building data platform can store an agent 570 in a data structure. The agent 570 can include a trigger rule indicating a condition for executing an action rule and an action rule indicating an action to be performed responsive to the condition being met. In some embodiments, the model 576 includes, or can be replaced with, the trigger rule and the action rule. The trigger rule and the action rule can be logical statements and/or conditions that include parameter values and/or create an output action. The parameter values can, in some embodiments, be identified through a learning process, e.g., as described through FIGS. 12-22.

In step 1104, the agent 570 can receive information from at least one of a physical device and/or from the graph 529. The information can be generated by a physical device, e.g., the building subsystems 122. The building data platform 100 can, in some embodiments, receive the information from the physical device, ingest the information into the graph 529, and the agent 570 can read the information from the graph 529. In some embodiments, the agent 570 can check the information of the graph 529 against a trigger rule at a set period.

In step 1106, the agent 570 determines whether the information received in the step 1104 causes the condition to be met. The agent 570 can apply the information to the trigger rule to determine whether the trigger rule is triggered, i.e., the condition of the trigger rule being met.

In step 1108, the agent 570 can perform the action responsive to the condition being met by the information determined in step 1106. The action may cause a physical device to be operated or information be sent to another agent including another trigger rule and another action rule. In some embodiments, the action can be performed by executing the action rule of the agent 570. The action rule can perform an action based on one or more parameter value of the action rule. In some embodiments, the action output of the action rule can be sent directly to the physical device, e.g., the building subsystems 122. In some embodiments, the action output can be stored into the graph 529. Another operating component of the building data platform 100, e.g., the command processor 136, can read the action from the graph 529 can communicate a corresponding command to the building subsystems 122.

Referring generally to FIGS. 12-23, systems and methods for using artificial intelligence to determine triggers and actions for an agent is shown. The triggers can trigger autonomously based on received data and cause an action to occur. In some embodiments, multiple digital twins can interact with each other by identifying interrelationships between each other via the graph 529, e.g., a VAV digital twin could interact with an AHU digital twin responsive to identifying that a VAV represented by the VAV digital twin is related to an AHU represented by the AHU digital twin via the graph 529. The digital twins can in some embodiments, simulate the impact of triggers and/or actions to validate and learn triggers and/or actions.

In some embodiments, the building data platform 100 can perform q-learning (Reinforcement Learning) to train and/or retrain the triggers and/or actions of the agents. In some embodiments, the data used to train and/or retrain the triggers and/or actions can be simulated data determined by another digital twin.

One digital twin may have trigger conditions such as, "when the outside temperature is $x_0$," "when the inside humidity is x %," "when an AI-driven algorithm's threshold is reached," and "when it is a certain day of the week." In responsive to one or multiple triggers being met, the digital twin can perform actions (e.g., capabilities of a device either inherent and/or digital twin enhanced). The actions can include setting a setpoint to a value $x_0$. The actions can be to run a fan for x minutes. The actions can be to start an AI-driven energy saving schedule. The actions can be to change a mode status to an away status. In some embodiments, the building data platform 100 can user other digital twins to simulate a reward for various values of the triggers and/or actions. The reward can be optimized to determine values for the parameters of the triggers and/or actions.

In some embodiments, allowing the digital twin to learn and adjust the parameters of the triggers and/or rules allows the digital twin to optimize responses to internal and/or external events in real-time. In some embodiments, the digital twin performs operations with the correlation of contextual relationships to provide spatial intelligence. In some embodiments, the digital twin allows for AI-based self-learning solutions to operate on top of the digital twin. The digital twin can capture comprehensive data that drives rich analytics for security, compliance, etc. In some embodiments, the digital twin can enable and perform simulations.

In some embodiments, the building data platform 100 can identify events and/or event patterns if the building data platform 100 identifies a pattern that suggests a trigger and/or action should be updated. For example, if the building data platform 100 identifies a pattern occurring in a building, the building data platform 100 can set triggers and/or actions in digital twins to allow the pattern to occur automatically. For example, if a user closes their blinds at 5:00 P.M. regularly on weekdays, this could indicate that the user desires the blinds to be closed at 5:00 P.M. each day. The building data platform 100 can set a blind control digital twin to trigger a blind closing action at 5:00 P.M. each day.

In some embodiments, an agent of a digital twin can predict an inference in the future indicating that some action should be performed in the future. The building data platform 100 can identify that the action should be performed in the future and can set up a flow so that a prediction of one digital twin can be fed into another digital twin that can perform the action.

Referring now to FIG. 12, a system 1200 of a trigger rule 1202 of a thermostat digital twin where parameters of the trigger rule 1202 are trained is shown, according to an exemplary embodiment. In some embodiments, the system 1200 can implement a model that rewards triggers and/or actions of the thermostat digital twin using a neural network that is trained from data aggregated from a related digital twin of the thermostat digital twin, an air handler unit digital twin.

The building data platform 100 can perturb parameters, $\varepsilon_1$ and $\varepsilon_2$ of the trigger rule 1202 of the thermostat digital twin. The trigger rule 1202 may be that if a number of occupants is greater than $\varepsilon_1$ and a zone temperature is less than $\varepsilon_2$° C. the rule is triggered and a corresponding action be performed. The corresponding action can be to increase a supply air temperature setpoint of an AHU to 22° C. The perturbation of the parameters can be increasing or decreasing the parameters in set amounts from existing values. The perturbation of the parameters can be selecting a space of values for the parameters and/or randomizing the parameters and/or parameter space.

With the perturbed values for $\varepsilon_1$ and $\varepsilon_2$, the AHU digital twin 1204 can simulate the state of the AHU via the AHU digital twin 1204 for various conditions of occupant number and zone temperature. The result of the various states of the AHU digital twin 1204. The simulation can be performed by the AI agent 570 via the model 576. The output of the model 576 can be the simulated states, e.g., timeseries 566.

The building data platform 100 can analyze the states produced by the AHU digital twin 1204 to determine energy and comfort results from the states of the AHU digital twin 1204. For example, an energy score can be generated for each state. For example, a power consumption level can be determined for each state. Similarly, a comfort violation score can be determined for each state. The comfort violation can indicate whether or not a temperature, humidity, or other condition of a physical space controlled by the AHU would be uncomfortable for a user (e.g., go below or above certain levels).

The building data platform 100 can generate accumulated training data. The accumulated training data can include the values of the parameters $\varepsilon_1$ and $\varepsilon_2$, the state of the AHU digital twin 1204 for each value of the parameters, and the energy score and comfort violation score for each state. In some embodiments, the triggers and/or actions that can be recommended for the thermostat digital twin can be determined by observing the responses of other digital twins on perturbed thresholds of existing triggers and/or actions.

The building data platform 100 can generate neural networks 1210 for predicting an energy score based on the parameters $\varepsilon_1$ and $\varepsilon_2$. Furthermore, the neural networks 1210 can indicate a comfort violation score for the parameters $\varepsilon_1$ and $\varepsilon_2$. The neural networks 1210 can be trained by the building data platform 100 based on the accumulated training data 1208.

Based on the trained neural network models 1210, the building data platform 100 can determine optimal values for the parameters $\varepsilon_1$ and $\varepsilon_2$. The building data platform 100 can search a space of potential values for $\varepsilon_1$ and $\varepsilon_2$ that consider predicted energy scores and/or comfort violation scores predicted by the trained neural network models 1210. The optimization can be the relation 1400 shown in FIG. 14. The optimization 1212 performed by the building data platform 100 can be a method of computing the optimal threshold of a trigger conditions using the neural network models 1210 of rewards (e.g., energy and comfort) and solving constrained optimization model. Similarly, the optimization 1212 performed by the building data platform 100 to determine the optimal threshold of action commands using the neural network models 1210 of rewards and solving constrained optimization.

In some embodiments, the optimal values for the parameters found by the building data platform 100 can be presented to a user for review and/or approval via a user interface, e.g., via the user device 176. In some embodiments, the recommendations produced by the building data platform 100 through the components 1202-1212 can be restricted by only looking at state/value changes of digital twins that are nearest neighbors in the graph 529, e.g., two nodes are directed related by one edge, e.g., a thermostat node for the thermostat digital twin is directed to an AHU node for the AHU digital twin 1204. In some embodiments, the building data platform 100 can use spatial correlation to assume contextual relationship between assets that can affect each other's attribute states/values.

Referring now to FIG. 13, a process 1300 for identifying values for the parameters of the trigger rule 1202 of FIG. 12 is shown, according to an exemplary embodiment. The process 1300 can be performed by the building data platform 100 and/or any component of the building data platform 100. The process 1300 can be performed by the system 500 and/or components of the system 500. Furthermore, the process 1300 can be performed by any computing device described herein.

In step 1302, the building data platform 100 can perturb a thermostat digital twin (e.g., the thermostat digital twin rule 1202) with various value for thresholds and/or other parameters, ε. The result of the perturbed parameters can result in various states, s. The states can be states predicted by the thermostat digital twin or another digital twin that operates based on the thresholds and/or parameters E, e.g., the AHU digital twin 1204. The perturbations and simulated states can result in pairs (S, ε). The pairs can be used to determine feedback for energy and/or comfort, e.g., (E, C).

In step 1304, the building data platform 100 can building neural network models, e.g., the neural networks 1210 based on the data determined in step 1302. The neural networks 1210 can predict energy rewards as a function of the state and the parameters, e.g., E=f(s, ε). Furthermore, the neural networks 1210 can predict comfort rewards as a function of the state and the parameters, e.g., C=f(s, ε).

In step 1306, the building data platform 100 can determine a value for the parameter, E that minimizes a relation, ($\alpha_1 \cdot E + \alpha_2 \cdot C$). The minimization is shown in relation 1400 of FIG. 14. The values of $\alpha_1$ and $\alpha_2$ can weigh the various rewards in the relation that is minimized, e.g., the energy reward and/or the comfort reward. In step 1308, the building data platform 100 can periodically repeat the steps 1302-1306. For example. For example, the building data platform 100 can repeat the steps at a defined time period. In some embodiments, the building data platform 100 can compute rewards for the actions of the thermostat digital twin. If the rewards indicate that the thermostat digital twin need retraining, the building data platform 100 can repeat the steps 1302-1308.

Figure 15:
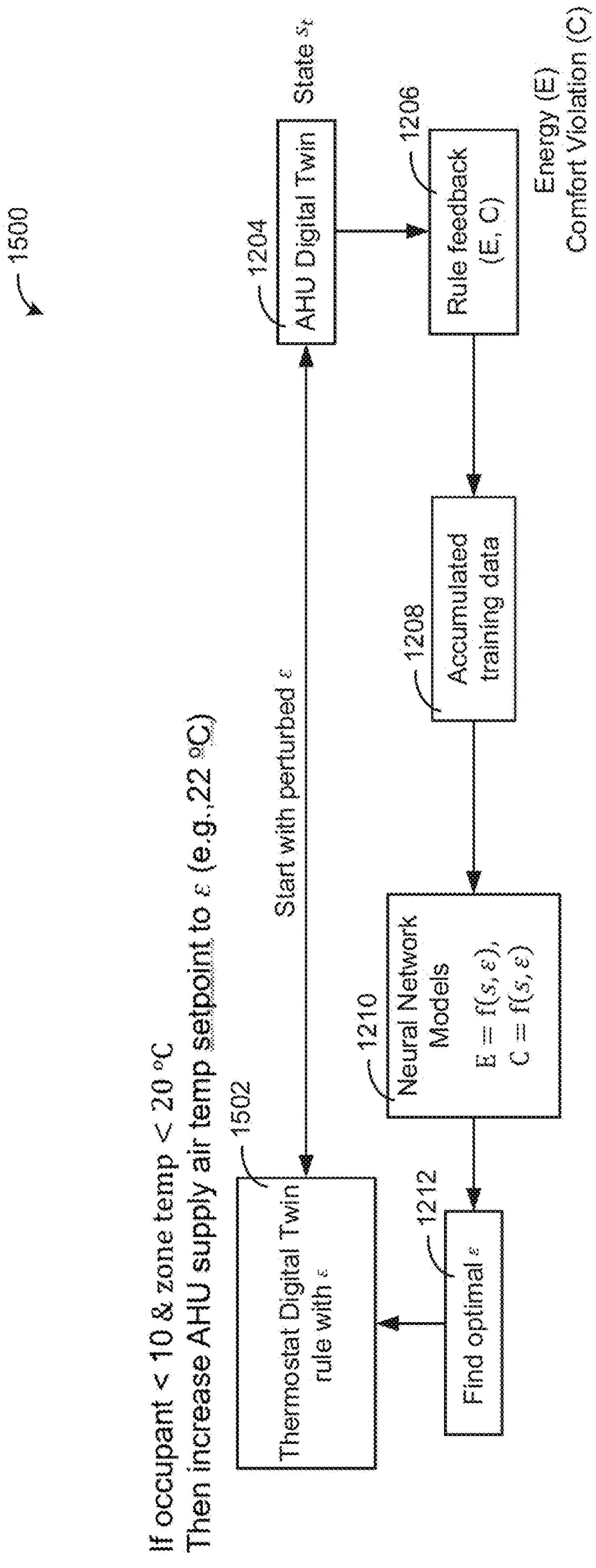
FIG. 15 is a block diagram of an action rule of a thermostat digital twin where parameters of the action rule is trained, according to an exemplary embodiment.

Referring now to FIG. 15, a system 1500 of components where an action rule 1502 of a thermostat digital twin is shown where parameters of the action rule 1502 are trained, according to an exemplary embodiment. The system 1500 can include similar and/or the same components of FIG. 14. The process 1300 of FIG. 13 can be applied to the action rule 1502 to train the parameters of the action rule 1502.

The thermostat digital twin rule 1502 can be an action rule that if a trigger is met (e.g., the trigger 1402), the action rule 1502 executes to command the AHU digital twin 1204. The trigger rule may be to execute the action rule if an occupant count is greater than ten and a zone temperature is less than twenty degrees Celsius. The action rule 1502 may be to increase an AHU supply air temperature setpoint to a value, e.g., ε. The value can, in some embodiments, be 22 degrees Celsius.

The building data platform 100 can predict states resulting from perturbed values of E by executing the AHU digital twin 1204 to simulate the states. The building data platform 100 can collect rule feedback 1206 to construct accumulated training data 1208. Furthermore, the building data platform 100 can train neural network models 1210 based on the accumulated training data 1208 and find optimal values for the parameter E based on the trained neural network models 1210

Figure 16:
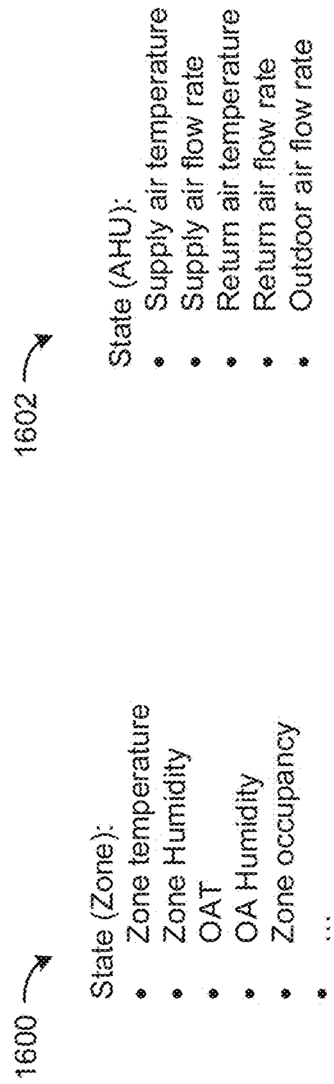
FIG. 16 is lists of states of a zone and of an air handler unit that can be used to train the parameters of the trigger rule and the action rule of the thermostat digital twins of FIGS. 12-15, according to an exemplary embodiment.

Referring now to FIG. 16, a list 1600 and a list 1602 of states of a zone and of an air handler unit that can be used to train the parameters of the trigger rule and the action rule of the thermostat digital twins of FIGS. 12-15 is shown, according to an exemplary embodiment. The list 1600 includes states for a zone. The states can be zone temperature, zone humidity, outdoor air temperature, outdoor air humidity, zone occupancy, etc. These states can be predicted and/or determined based on a digital twin for a space based on perturbed parameter values for a trigger rule, an action rule, weather forecasts, etc. In this regard, the rule feedback 1206, in some embodiments, can be generated based on the digital twin for the space and used to tune the values of the parameters for the trigger rule 1402 and/or the action rule 1502.

The list 1602 includes states for an AHU. The states can be supply air temperature, supply air flow rate, return air temperature, return air flow rate, outdoor air flow rate, etc. These states can be predicted and/or determined based on a digital twin for an AHU (e.g., the AHU digital twin 1204) based on perturbed parameter values for a trigger rule, an action rule, etc. In this regard, the rule feedback 1206 in some embodiments, can be generated based on the digital twin for the AHU and used to tune the values of the parameters for the trigger rule 1402 and/or the action rule 1502.

Referring now to FIG. 17, a system 1700 of a trigger rule of a chemical reactor digital twin where parameters of a trigger rule are trained is shown, according to an exemplary embodiment. A reactor feed digital twin which may model the feed of a chemical reactor can include various trigger rules and/or action rules, e.g., the trigger rule 1702. The trigger rule 1702 can be that if a chemical concentration of a first chemical A is less than $\varepsilon_1$ (e.g., 10 g/l) and a chemical concentration of a second chemical B is less than $\varepsilon_2$ (e.g., 20 g/l) then an action rule is triggered. The action rule may be increase a catalyst C feed amount to 300 g/s.

The building data platform 100 can perturb the values for the parameters $\varepsilon_1$ and $\varepsilon_2$ of the reactor feed digital twin trigger rule 1702 (e.g., pseudo-randomly, increasing and/or decreasing in a particular number of predefined increments, etc.). A chemical reactor digital twin 1704 can simulate a state of the chemical reactor for the various perturbed parameters $\varepsilon_1$ and $\varepsilon_2$. The building data platform 100 can determine a rule feedback 1706 for the state simulate by the chemical reactor digital twin 1704. The rule feedback 1706 can identify scores for production throughput (P) and chemical property (C).

The building data platform 100 can accumulate training data 1708. The accumulated training data 1708 can include the feedback 1706, the state simulated by the chemical reactor digital twin 1704, and/or the parameter values for $\varepsilon_1$ and $\varepsilon_2$. The building data platform 100 can train neural network models 1710 to predict production throughput and/or chemical property for the various parameter and/or state pairs, e.g., the state resulting from the parameters of the trigger rule 1702. The building data platform 100 can use the trained neural network models 1710 to identify optimal values for $\varepsilon_1$ and $\varepsilon_2$. In element 1712, the building data platform 100 can identify values for $\varepsilon_1$ and $\varepsilon_2$ that minimize the relation 1900 shown in FIG. 19. In some embodiment, the optimization can optimize production throughput and/or chemical property.

Referring now to FIG. 18, a process 1800 for identifying values for the parameters of the trigger rule of FIG. 17 is shown, according to an exemplary embodiment. The process 1800 can be performed by the building data platform 100 and/or any component of the building data platform 100. The process 1800 can be performed by the system 500 and/or components of the system 500. Furthermore, the process 1800 can be performed by any computing device described herein. The steps 1802-1808 can be the same as or similar to the steps 1302-1308. However, the steps 1802-1808 can be executed for a reactor digital twin and the reward for training the neural networks and be production throughput and chemical property.

In step 1802, the building data platform 100 can perturb a reactor digital twin 1704 with various values of a threshold E of a trigger rule 1702 with various values which cause the reactor digital twin to determine resulting states for the various values of the threshold, ε. The states and the values for the threshold E can create state threshold pairs. The pairs can be used to determine feedback, e.g., production throughput and chemical property.

In step 1804, after some accumulation of feedback data, the building data platform 100 can build neural network models 1710 based on the pairs that predict production throughput and chemical property based on the values for the threshold ε. In step 1806, the building data platform 100 can determine a value for the threshold ε that maximizes a reward and/or minimizes a penalty. The building data platform 100 can minimize the relation 1900 of FIG. 19. In step 1808, the building data platform 100 can periodically retrain the values for the threshold ε for the trigger rule 1702.

Figure 20:
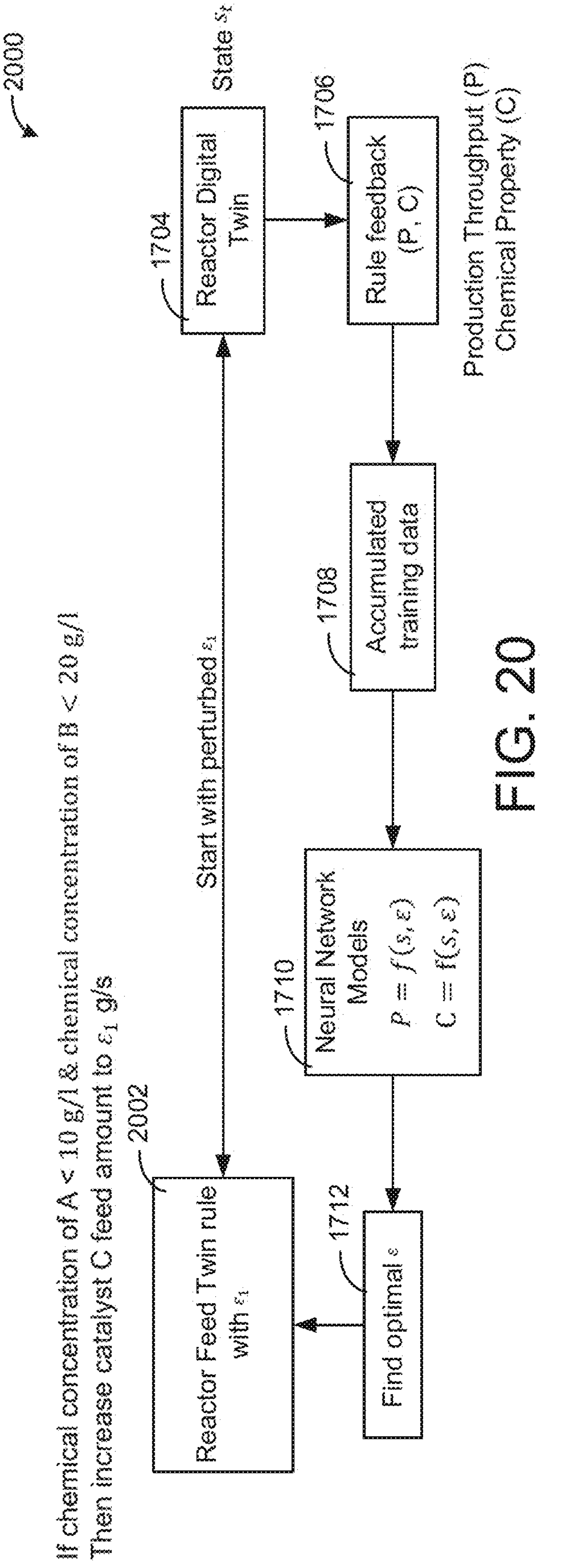
FIG. 20 is a block diagram of an action rule of a chemical reactor digital twin where parameters of the action rule are trained, according to an exemplary embodiment.

Referring now to FIG. 20, a system 2000 including an action rule 2002 of a chemical reactor digital twin where parameters of the action rule 2002 are trained is shown, according to an exemplary embodiment. The reactor feed twin rule 2002 can be an action rule to increase a catalyst C feed amount to $\varepsilon_1$ g/s in response to an trigger rule being triggered, e.g., the trigger rule 1702. The building data platform 100 can perturb the values of the parameter $\varepsilon_1$ and the reactor digital twin 1704 can predict states resulting from the perturbed parameter. The building data platform 100 can determine rule feedback 1706 and generate accumulated training data 1708 based on the rule feedback 1706. The building data platform 100 can train the neural network models 1710. Based on the neural network models 1710, the building data platform 100 can find optimal values for the parameter $\varepsilon_1$.

Referring now to FIG. 21, a list 2100 and a list 2102 of states of a feed of a reactor and a reactor that can be included in the trigger rule and the action rule of FIGS. 12-15 are shown, according to an exemplary embodiment. The list 2100 includes states for a feed of a chemical reactor. The states can be reactants feed amount, catalysts feed amount, feed stream temperature, etc. These states can be predicted and/or determined based on a digital twin for a space based on perturbed parameter values for a trigger rule, an action rule, etc. In this regard, the rule feedback 1706 in some embodiments, can be generated based on the digital twin for the space and used to tune the values of the parameters for the trigger rule 1702 and/or the action rule 2002.

The list 2102 includes states for a chemical reactor. The states can be product concentration, cooling coil temperature, product temperature, etc. These states can be predicted and/or determined based on a digital twin for a chemical reactor (e.g., the reactor digital twin 1704) based on perturbed parameter values for a trigger rule, an action rule, etc. In this regard, the rule feedback 1706 in some embodiments, can be generated based on the digital twin for the chemical reactor and used to tune the values of the parameters for the trigger rule 1702 and/or the action rule 2002.

Figure 22:
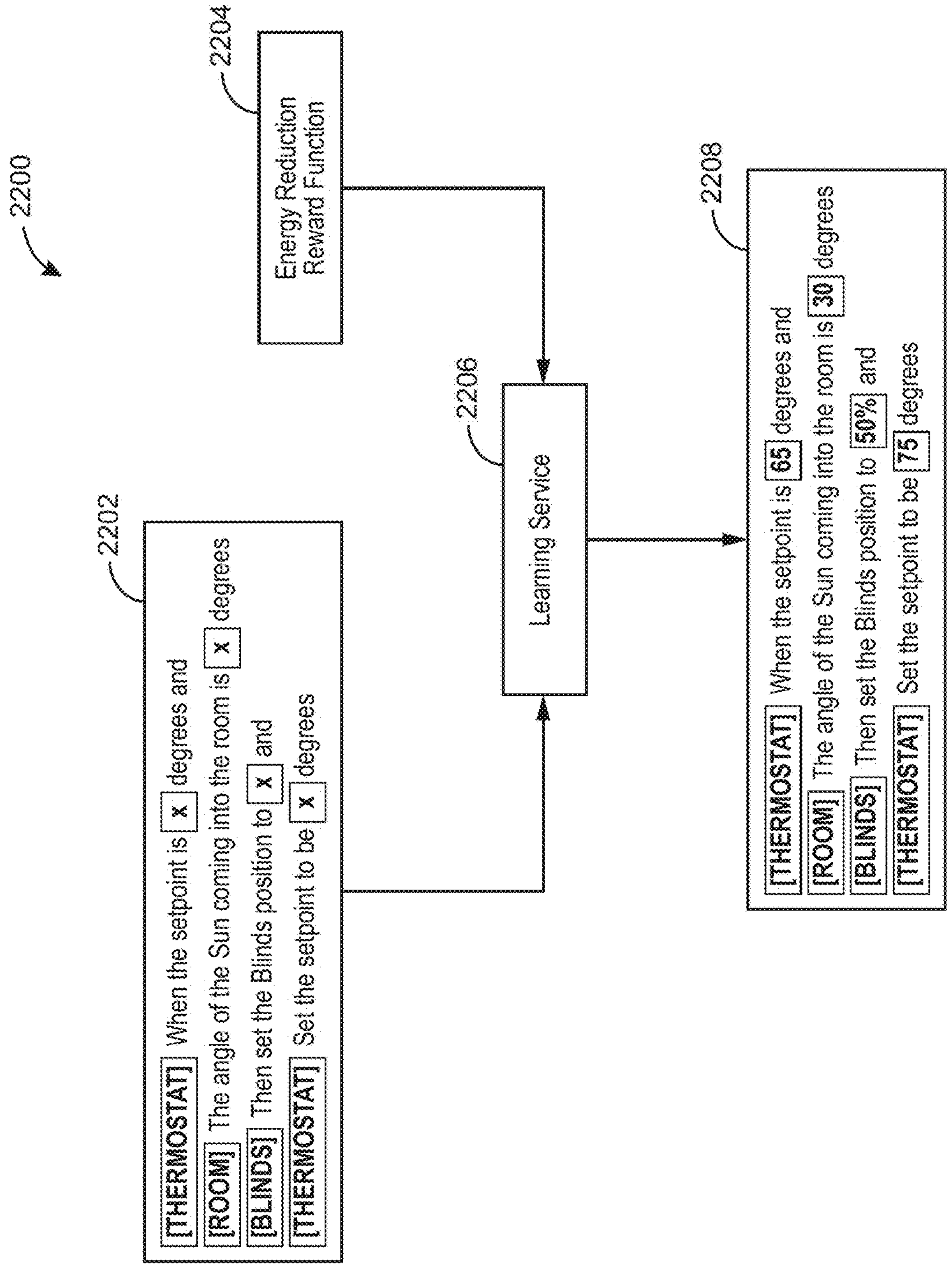
FIG. 22 is a block diagram of triggers and actions that can be constructed and learned for a digital twin, according to an exemplary embodiment.

Referring now to FIG. 22, a system 2200 where triggers and actions that can be constructed and learned for a digital twin is shown, according to an exemplary embodiment. Considering a building where a room in the building has a thermostat, the building data platform 100 can construct triggers and/or actions of an agent of a digital twin or the room. The triggers and/or actions can be determined with an energy reduction reward function 2204 by a learning service 2206. The energy reduction reward function 2204 can produce triggers and/or actions that have values that minimize energy usage.

In some embodiments, the building data platform 100 can search the graph 529 to identify information related to the space, e.g., related pieces of equipment, spaces, people, etc. For example, the building data platform 100 can identify which entities of the graph 529 are related and operate to affect each other. The building data platform 100 can identify which actions each entity can perform and/or what measurements each entity can make, e.g., by identifying related data nodes for each entity. The identified entities, measurements, and/or commands can be combined into the rule 2202 by the building data platform 100.

In some embodiments, the learning service 2206, which may be a component of the building data platform 100, can run a learning process with the rule 2202 and/or one or more reward functions (e.g., comfort reward function, carbon footprint reduction reward function, the energy reduction reward function 2204, etc.). The learning service 2206 can learn the rule 2208 from the rule 2202 and/or the energy reduction reward function 2204.

The learning service 2206 can run an optimization to determine combinations between measurements and actions triggered based on the measurements. The learning service 2206 can determine values for each measurement and/or action. Furthermore, the learning service 2206 can identify the relational operations for causing a trigger, e.g., equals to, greater than, less than, not equal to, etc. Furthermore, the learning service 2206 can identify action operations, e.g., increase by a particular amount, decrease by a particular amount, set an output equal to a value, run a particular algorithm, etc.

Figure 23:
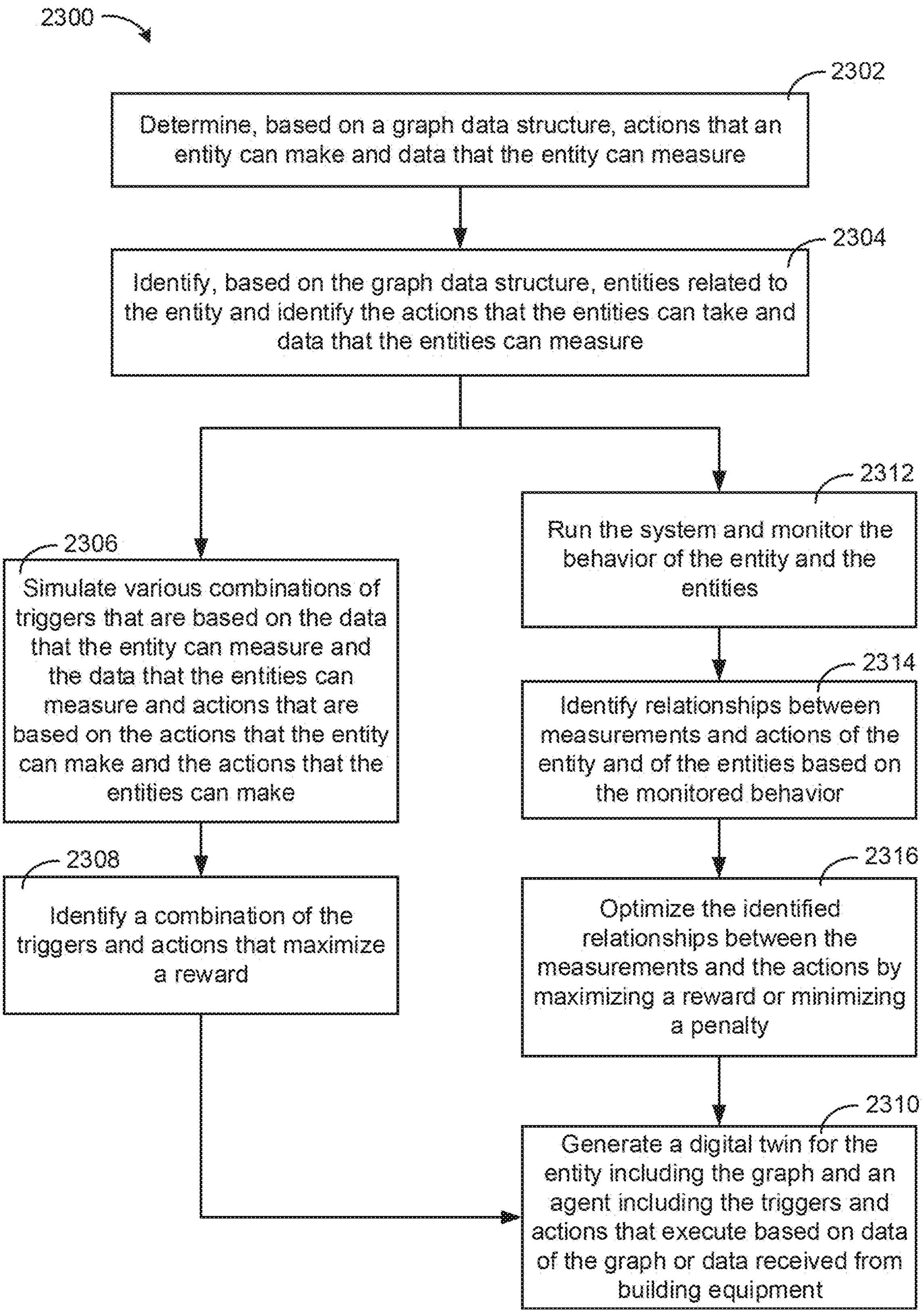
FIG. 23 is a flow diagram of a process for constructing triggers and actions for a digital twin, according to an exemplary embodiment.

Referring now to FIG. 23, a process 2300 for constructing triggers and actions for a digital twin is shown, according to an exemplary embodiment. In some embodiments, the process 2300 can be performed by the building data platform 100. In some embodiments, the process 2300 can be performed by the learning service 2206.

In step 2302, the building data platform 100 can determine actions that a particular entity can take and data that the entity can measure by analyzing a graph 529. The entity can be a thermostat, an air handler unit, a zone of a building, a person, a VAV unit, and/or any other entity. For example, if the entity is a thermostat the building data platform 100 could identify room temperature measurements for a thermostat and/or a cooling stage command, a heating stage command, a fan command, etc. that the thermostat can perform. Responsive to identifying data that the entity can measure, the building data platform 100 can generate a trigger condition based on the data type, e.g., when the temperature is equal to, less than, greater than, and/or not equal to some parameter value, trigger an action.

In step 2304, the building data platform 100 identifies, based on the graph 529, entities related to the entity and actions that the entities can take and data that the entities can measure. For example, if the entity is for a thermostat for a zone, the building data platform 100, could identify a shade control system for controlling a shade of the zone, an air handler unit that serves the zone, a VAV that serves the zone, etc. For example, the building data platform 100 can identify, based on the building graph 529, that a binds node is associated with a zone node that the thermostat node is related to. The building data platform 100 can identify a list of actions that the entities can perform, e.g., setting blind position from 0% (fully open) to 100% (fully closed).

In some 2306, the building data platform 100 can simulate various combinations of triggers that tare based on the data that the entity and/or entities can measure and actions that are based on the actions that the entity and/or entities can make. The building data platform 100 can simulate various combinations, trigger operations, action operations, and/or parameters.

In step 2308, the building data platform 100 can identify a combination of triggers and actions that maximizes a reward. The building data platform 100 can search the simulated combinations of triggers and/or actions to identify a trigger and/or action that maximizes a reward and/or minimizes a reward. In some embodiments, the building data platform 100 uses a policy gradient and value function instead of brute force to try out combinations of the triggers and/or actions in the steps 2306-2308.

In some embodiments, the building data platform 100 can identify the operations for the triggers and/or actions. For example, the operation could be comparing a measurement to a threshold, determining whether a measurement is less than a threshold, determining whether a measurement is greater than the threshold, determining whether the measurement is not equal to the threshold, etc.

In step 2310, the building data platform 100 can generate a digital twin for the entity. The entity can include (or reference) the graph 529 and include an agent that operates the triggers and/or actions. The triggers and/or actions can operate based on the graph 529 and/or based on data received building equipment, e.g., the building subsystems 122.

In step 2312, the building data platform 100 can run a building system of a building and monitor the behavior of the entity and entities of the building. In some embodiments, the building system can be the building subsystems 122. In step 2314, the building data platform 100 can identify relationships between the measurements and actions of the entity and/or the entities based on the monitored behavior. The building data platform 100 can discover existing relationships by identifying how the measurements are currently affecting actions based on the monitored behavior. In step 2316, the building data platform 100 can optimize the identified relationships between the measurements and the actions by maximizing a reward or minimizing a penalty.

Referring generally to FIGS. 24-35, systems and methods for a high level digital twin are shown and described. The high level digital twin can be a digital twin formed from multiple lower level digital twins. In some embodiments, each digital twin can include operational capabilities, e.g., triggers and/or actions (e.g., the triggers 595 and the actions 597) and/or various other operational functions, e.g., a model (e.g., the model 576), machine learning models, artificial intelligence, computer applications, etc. In some embodiments, the capabilities of digital twins can be combined together into a higher level digital twin.

In some embodiments, the digital twins can be ordered in terms of a hierarchy, e.g., higher to lower level digital twins. The higher level digital twins can inherit the capabilities of the lower level digital twins. This form of inheritance may be a "reverse inheritance" where parent twins inherit the capabilities of children twins. The various high level digital twins can be formed based on similarities or relationships between digital twins or in an unrelated manner, e.g., unrelated digital twins grouped together to form a solution twin that operates to perform some action that provides a building solution.

Figure 24:
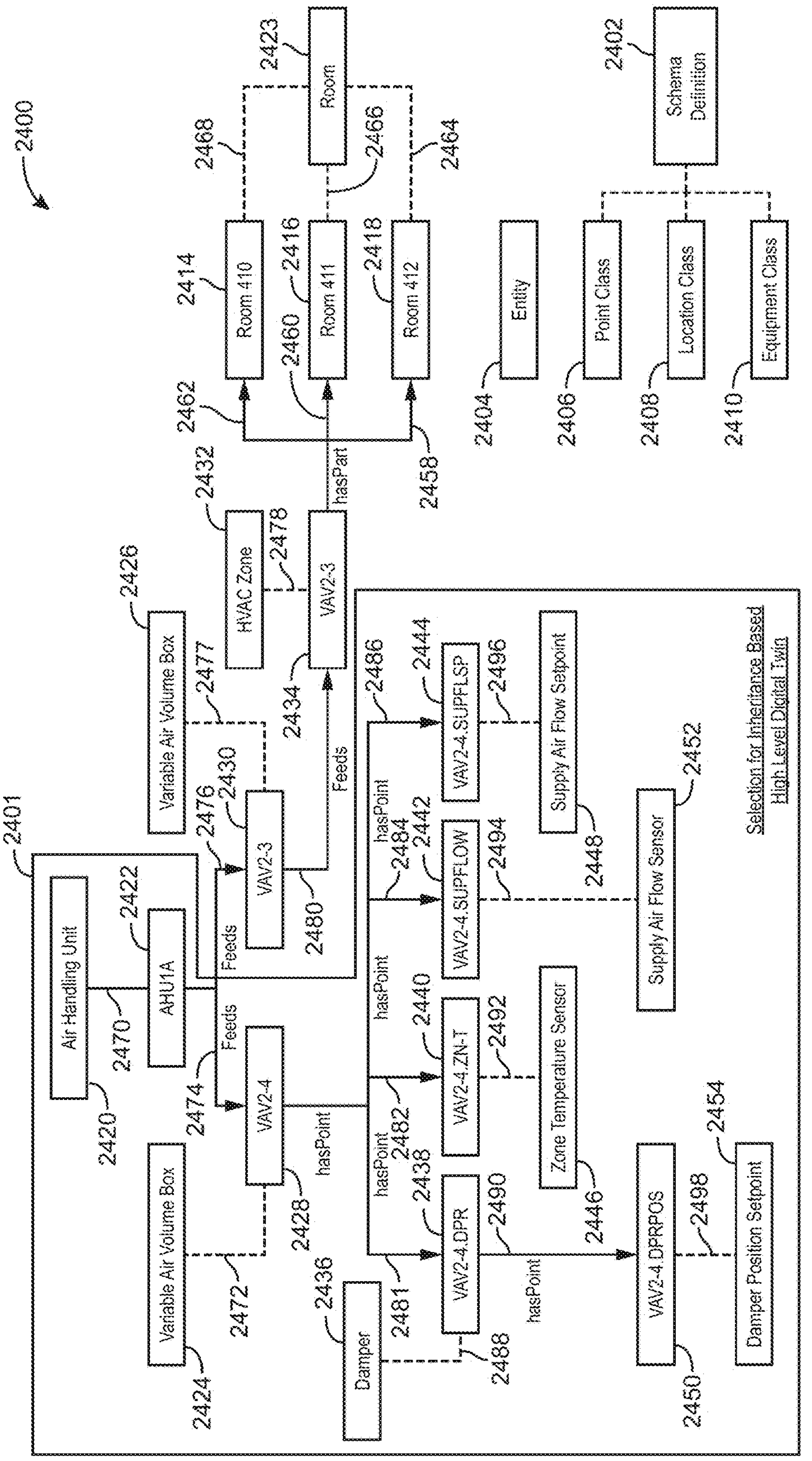
FIG. 24 is a block diagram of a building graph with a selection of nodes and edges that the twin manager of FIG. 5 analyzes to generate an inheritance based high level digital twin, according to an exemplary embodiment.

Referring now to FIG. 24, a block diagram of a building graph 2400 with a selection 2401 from nodes 2412-2450 and edges 2458-2490 that the twin manager 108 of FIG. 5 analyzes to generate an inheritance based high level digital twin is shown, according to an exemplary embodiment. The twin manager 108 can, in some embodiments, store the building graph 2400. The building graph 2400 can be the same as, or similar to, the building graphs described with reference to FIGS. 1-5 and elsewhere herein. The twin manager 108 can analyze at least some of the nodes 2412-2450 and edges 2458-2490 to identify a group of entities, and corresponding digital twins, that form a hierarchy. The hierarchy can be identified through the edges 2458-2490, e.g., the direction of the edges if the edges are unidirectional or based on a direction of a particular relationship type of a bidirectional relationship, e.g., identify a "feeds" and "fed by" bidirectional edge indicating that one node (that is being fed) depends from another node (that performs the feeding).

The building graph 2400 can be defined with nodes and edges of a particular schema, e.g., defined by schema definition 2402. The schema definition 2402 can be stored by the twin manager 108, in some embodiments. The schema definition 2402 can be the BRICK schema, in some embodiments. BRICK is described in *Brick: Towards a Unified Metadata Schema For Buildings* by Balaji et al., which is incorporated by reference herein. In some embodiments, the schema definition 2402 is a customized and/or extended schema. For example, an extended version of BRICK. Schema extensibility for digital twins is described in U.S. patent application Ser. No. 17/528,026 filed Nov. 16, 2021 and U.S. patent application Ser. No. 17/528,038 filed Nov. 16, 2021, the entireties of which are incorporated by reference herein.

The schema definition 2402 can define classes 2406-2410 that the entities (e.g., entity 2404) can be an entity of. The classes can be a point class 2406 which can define the various types of available points, e.g., a zone temperature point, a zone humidity point, a temperature setpoint, a pressure setpoint, etc. The location class 2408 can define various types of available locations, e.g., rooms, conference rooms, hallways, floors, buildings, campuses, etc. The equipment class 2410 can indicate various different pieces of equipment AHUs, VAVs, thermostats, sensors, dampers, actuators, etc. The various classes 2405-2410 can define information such as the connections available between entities of different or the same class and/or whether entities should exist. For example, if a thermostat entity of a thermostat class of the equipment class 2410 is created, the thermostat class can indicate that the thermostat should have a "hasA" edge between the thermostat and a temperature setpoint of a temperature setpoint class of the point class 2406. The schema definition 2402 may further define various available semantic relationships (e.g., "hasA," "feeds," "includes," "isAPartOf," etc.). Furthermore, the schema definition can define what relationship types can be made between what entities of particular entity classes.

The building graph 2400 includes an AHU1A node 2422 representing an AHU of a building. The AHU1A node 2422 can be of a particular air handling unit class indicated by the edge 2470 between the node 2422 and the air handling unit class node 2420. The AHU represented by the AHU1A node 2422 can feed air to two VAVs. This is indicated by the feeds edge 2474 between the AHU1A node 2422 and the VAV2-4 node 2428 and the feeds edge 2476 between the AHU1A node 2422 and the VAV2-3 node 2430. The VAV2-4 and the VAV2-3 can each be a variable air volume box class indicated by the edge 2472 between the VAV 2-4 and the variable air volume box class node 2424 and the edge 2476 between the VAV 2-3 and the variable air volume box class 2426.

The VAV represented by the VAV2-3 node 2430 can feed air into a particular zone, e.g., a zone represented by the VAV2-3Zone node 2434 and the feeds edge 2480 between the VAV2-3 node 2430 and the VAV2-3Zone node 2434. The zone represented by the VAV2-3Zone can include multiple rooms indicated by the room 410 node 2414, the room 411 node 2416, and the room 412 node 2418 being related by the VAV2-3Zone 2434 via "hasPart" edges 2458-2462. Each of the room nodes 2414-2418 can be of a room class indicated by the edges 2464-2468 between the nodes 2414-2418 and the room class node 2412.

The VAV2-4 can include various points, e.g., point nodes 2438-2444, representing zone temperature, supply air flow, and a supply air flow setpoint respectively. The zone temperature and supply air flow can represent sensor measurements while the supply air flow setpoint represents a control point. The VAV2-4.ZNT node 2440, representing a zone temperature sensor, can be related to the VAV2-4 node 2428 via a "hasPoint" edge 2482 between the VAV2-4 node 2428 and the VAV2-4.ZN-T node 2440. The VAV2-4.ZN-T node 2440 can be of a zone temperature sensor class node 2446 indicated by the edge 2492 between the node 2440 and the node 2446. The VAV2-4.SUPFLOW node 2442, representing a supply air flow sensor, can be related to the VAV2-4 node 2428 via a "hasPoint" edge 2484 between the VAV2-4 node 2428 and the SUPFLOW node 2442. The VAV2-4.SUPFLOW node 2442 can be of a supply air flow sensor class node 2452 indicated by the edge 2494 between the node 2443 and the node 2452. The VAV2-4.SUPFLSP node 2444, representing a supply air flow setpoint, can be related to the VAV2-4 node 2428 via a "hasPoint" edge 2486 between the VAV2-4 node 2428 and the VAV2-4.SUPFFLSP node 2444. The VAV2-4.SUPFFLSP node 2444 can be of a supply air flow sensor class node 2448 indicated by the edge 2496 between the node 2444 and the node 2448.

The damper represented by the VAV2-4.DPR node 2438 can include a damper position setpoint indicated by the VAV2-4.DPRO node 2450. The damper node 2438 can be related to the damper position setpoint node 2450 via the edge 2490. The damper setpoint can be of a particular damper position setpoint class indicated by the edge 2498 between the node 2450 and the node 2454.

Figure 25A:
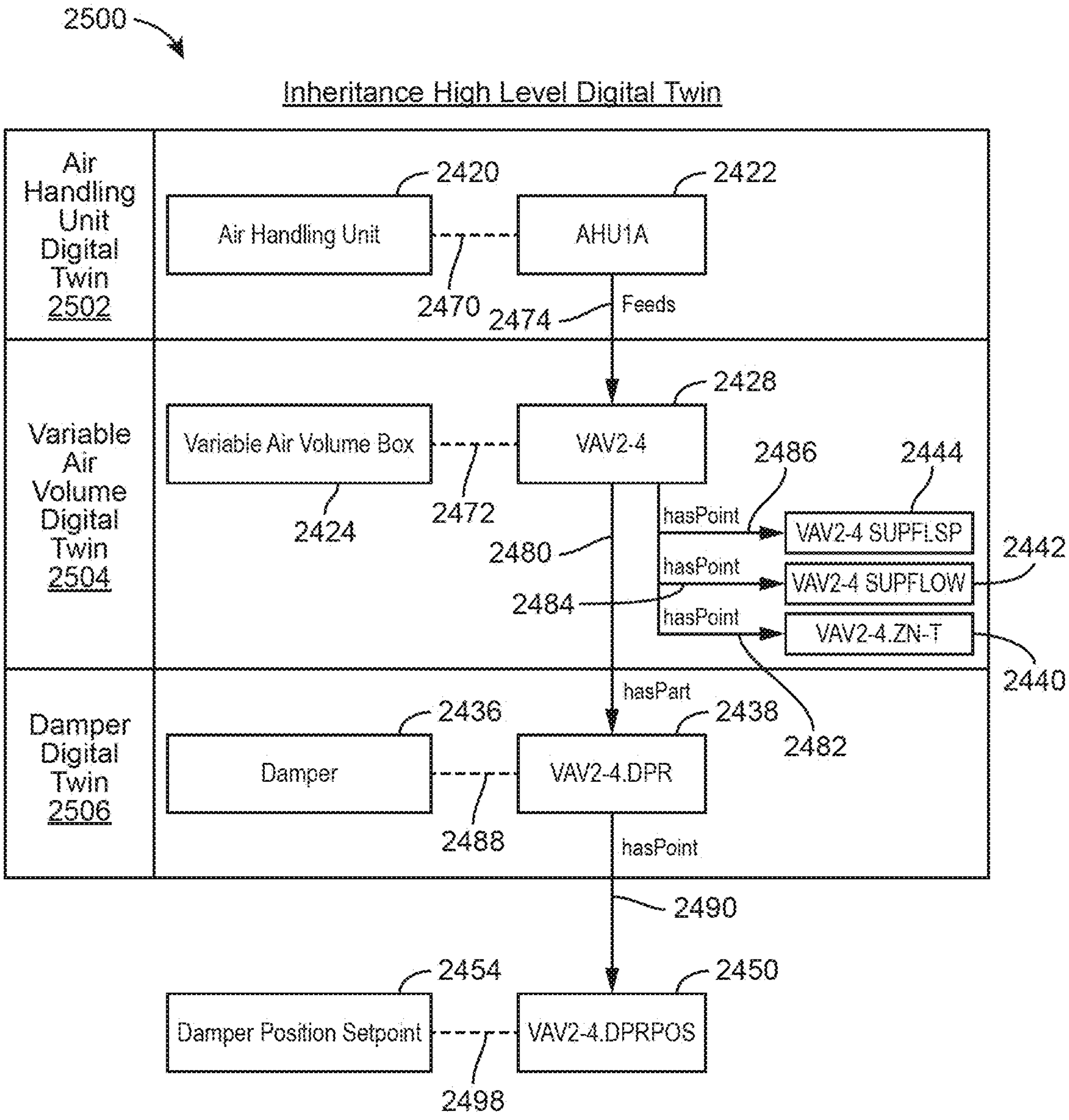
FIG. 25A is a chart of an air handling unit digital twin generated from lower level digital twins by the twin manager of FIG. 1, the air handling unit digital twin forming the inheritance based high level digital twin, according to an exemplary embodiment.

Referring now to FIG. 25A, a chart 2500 of an air handling unit digital twin 2502 generated from lower level digital twins 2504 and 2506 by the twin manager 108, the air handling unit digital twin 2502 forming the inheritance based high level digital twin, according to an exemplary embodiment. In some embodiments, the twin manager 108 separately generates the twins 2502-2506 and then combines the twins 2502-2506 together to form one high level inheritance digital twin. In some embodiments, the twin manager 108 separately generates the twins 2502-2506 and then combines the twins 2504 and 2506 into the twin 2502 to form a high level inheritance digital twin. In some embodiments, the twins 2502-2506 are already generated and the twin manager 108 generates the high level digital twin by selecting and/or combining the various digital twins 2502-2506 together.

In some embodiments, the twin manager 108 can analyze the building graph 2400 and make the selection 2401 based on identified dependencies between the various entities of the building graph 2400. The selection 2401 could indicate that a damper depends from a VAV and the VAV depends from an AHU. This is indicated by the node 2438 depending from the node 2428 via the edge 2480 and the node 2428 depending from the node 2422 via the edge 2474. In some embodiments, the twin manager 108 can identify a hierarchy of equipment via the class nodes 2420, 2424, and 2436. In some embodiments, the twin manager 108 can generate a digital twin, e.g., capabilities, for each equipment entity in the hierarchy. For example, the twin manager 108 can generate the air handling unit digital twin 2502, the variable air volume digital twin 2504, and the damper digital twin 2506. In some embodiments, the digital twins already exist for the various pieces of equipment and the twin manager 108 selects and/or groups existing digital twins based on the hierarchy.

In some embodiments, the high level digital twin can be an inheritance based high level digital twin. The inheritance digital twin can inherit the capabilities of child digital twins as indicated by the building graph 2400 (or the portion shown in FIG. 25A identified by the twin manager 108). Since the higher level digital twins inherit capabilities of the lower level digital twins, the inheritance may be a reverse inheritance.

In some embodiments, after the hierarchy shown in the chart 2500 is identified by the twin manager 108, the twin manager 108 can define a high level digital twin. The high level digital twin may be the air handling unit digital twin 2502 or a digital twin that includes the air handling unit digital twin 2502. The capabilities of the various lower level digital twins can be pushed up to the higher level digital twin and exposed through the higher level digital twins based on the various types relationships between the entities of the building graph 2400, e.g., the edges shown in the chart 2500 connecting the various entities.

The damper digital twin 2506 could be related to the damper represented by the node 2438 and the capabilities of the damper digital twin 2506 could be related to the points for the node 2438, e.g., the damper position setpoint represented by the VAV2-4.DPRP node 2438. The twin manager 108 could identify that the damper digital twin 2506 has capabilities by identifying what points are related to the damper node 2438, e.g., identify the "hasPoint" edge 2490 between the node 2438 and the node 2450. The capabilities can be triggers, e.g., determining whether to change some piece of information based on the setpoint, determine whether to change the setpoint, etc. The capabilities can be actions, determining to change the damper setpoint to a particular value. The capabilities of the damper digital twin 2506 could be pushed up to the higher level variable air volume digital twin 2504 based on the damper node 2438 depending via the edge 2480 from the VAV node 2428 that the variable air volume digital twin 2504 is generated for.

For example, the variable air volume digital twin 2504 could be related to the VAV represented by the node 2428 and the capabilities of the variable air volume digital twin 2504 could be related to the points for the node 2428, e.g., a zone temperature sensor, a supply air flow sensor, and/or a supply air flow setpoint. The twin manager 108 could identify that the variable air volume digital twin 2504 has capabilities by identifying what points are related to the VAV2-4 node 2438, e.g., identify the "hasPoint" edges 2482-2486 between the node 2428 and the nodes 2440-2444. The capabilities can be triggers, e.g., determining whether to change the supply air flow setpoint and can be based on various sensor measurements, e.g., the zone temperature and/or the supply air flow. The capabilities can be actions, determining to change the supply air flow setpoint. The capabilities of the variable air volume digital twin 2504 (including the inherited capabilities from the damper digital twin 2506) could be pushed up to the higher level air handling unit digital twin 2504 based on the VAV2-4 node 2438 depending via the edge 2474 from the AHU1A node 2422 that the air handling unit digital twin 2502 is generated for.

The air handling unit 2502 can include various capabilities. The capabilities can be triggers or actions associated with points of the AHU. The capabilities could be triggers and actions. The triggers and actions could determine whether to run a fan, to heat air, to cool air, to humidify air, to dehumidify air, to increase or decrease an outdoor air mixture, etc. Furthermore, the capabilities of the air handling unit digital twin 2502 could be the inherited capabilities inherited from the variable air volume digital twin 2504 and the damper digital twin 2506. In some embodiments, the twin manager 108 can combine multiple capabilities of the air handling unit digital twin 2502 together. For example, a trigger of the air handling unit digital twin 2502 could be combined with an action of the damper digital twin 2506 inherited by the air handling unit digital twin 2502. In some embodiments, the twin manager 108 can run one or more machine learning algorithms to identify patterns to connect the capabilities. In some embodiments, a user can provide manual input to combine the various capabilities together.

In some embodiments, the capabilities of the higher level digital twin, e.g., the air handling unit digital twin 2502, can get run at the air handling unit digital twin 2502 or alternatively pushed down to the lower level digital twins as appropriate. For example, if a capability of the higher level digital twin is inherited from the lower level digital twin, the higher level digital twin could communicate to the lower level digital twin causing the capability to be implemented by the lower level digital twin. For example, the air handling unit digital twin 2502 could have a capability to operate the damper associated with the damper digital twin 2506. If the air handling unit digital twin 2502 determines to implement the capability of the damper, the air handling unit digital twin 2502 could cause the damper digital twin 2506 to implement the capability. In some embodiments, triggers and/or actions can be run at a variety of levels of the digital twin.

Referring now to FIG. 25B, a table 2550 indicating attributes 2552, inherited attributes 2554, triggers 2556, and actions 2558 for the digital twins 2502-2506 is shown, according to an exemplary embodiment. The triggers 2556 and the actions 2558 can be the same as, or similar to, the triggers and actions described with respect to FIGS. 5-23. Furthermore, the triggers 2556 and the actions 2558 can be learned by the twin manager 108, e.g., as described in FIGS. 12-23.

The damper digital twin 2506 can include a damper position setpoint. The twin manager 108 can identify that the damper digital twin 2506 includes the damper position setpoint by identifying that the node representing the damper, node 2438, is related to the node 2450 representing the damper position setpoint. In some embodiments, the twin manager 108 can query the building graph 2400 for all entities of a point class connected to the node 2450 to identify all attributes for the damper digital twin 2506.

The damper digital twin 2506 may have various triggers based on the damper position setpoint. The triggers may be performing some action responsive to a logical determination made with the damper position. The logical determination can use an equality comparison, a greater than comparison, a less than comparison, and/or a not equal to comparison. The logical determination can include various variables and/or constants.

The damper digital twin 2506 can further includes an action that can be performed based on the damper position setpoint. The action may be to set the damper position setpoint to a particular value. The action can, in some embodiments, be a logical command, a control algorithm (e.g., a PID algorithm, a PI algorithm, etc.) that uses some received feedback to generate a new value the damper position, etc.

The variable air volume digital twin 2504 can include various attributes including a zone temperature measurements of a sensor, supply air flow measurements of a sensor, and/or supply air flow setpoint. The twin manager 108 can identify that the variable air volume digital twin 2504 includes the zone temperature measurements of a sensor, the supply air flow measurements of a sensor, and/or the supply air flow setpoint by identifying that the node representing the VAV, node 2428, is related to the nodes 2440, 2442, and 2444 representing the zone temperature measurements of a sensor, the supply air flow measurements of a sensor, and the supply air flow setpoint respectively. In some embodiments, the twin manager 108 can query the building graph 2400 for all entities of a point class connected to the node 2428 to identify all attributes for the variable air volume digital twin 2504.

The variable air volume digital twin 2504 may have various triggers based on the zone temperature measurements of a sensor, the supply air flow measurements of a sensor, and/or the supply air flow setpoint. The triggers may be performing some action responsive to a logical determination made with one of, or a combination of, the zone temperature measurements of a sensor, the supply air flow measurements of a sensor, and/or the supply air flow setpoint. The logical determination can use an equality comparison, a greater than comparison, a less than comparison, and/or a not equal to comparison. The logical determination can include various variables and/or constants.

The variable air volume digital twin 2504 can further include an action that can be performed based on the zone temperature measurements of a sensor, the supply air flow measurements of a sensor, and/or the supply air flow setpoint. The action can, in some embodiments, be a logical command, a control algorithm (e.g., a PID algorithm, a PI algorithm, etc.) that uses some received feedback to generate a new values, etc. The zone temperature could be set to a particular value responsive to a trigger occurring. In some embodiments, the trigger could identify that a particular value of the zone temperature or the supply air flow is out of a particular range. The action could cause a measurement to be replaced with an inferred value (e.g., a historical average) responsive to detecting the particular value is out of the range. The supply air flow setpoint could be adjusted based on zone temperature and/or supply air flow, e.g., to change to a value that the VAV is capable of meeting under certain zone temperature and/or supply air flow conditions. The action could be to change the supply air flow setpoint based on other triggers, e.g., a change in occupancy, a change in time of day, based on outdoor weather conditions, etc.

The variable air volume digital twin 2504 may inherit attributes from the damper digital twin 2506. For example, the variable air volume digital twin 2504 can inherit the damper position setpoint from the damper digital twin 2506. Furthermore, the variable air volume digital twin 2504 can inherit the triggers and actions of the damper digital twin. The inherited triggers and actions can be inherited based on the hierarchy, e.g., the variable air volume digital twin 2504 being above the damper digital twin 2506. In some embodiments, the inherited triggers and actions may identify the digital twin from which the trigger or action originated. For example, the trigger or action could be "{DAMPER_ID}.DPRPOS." The "DAMPER_ID" could be an identifier that uniquely identities the damper digital twin 2506 and/or the physical damper that the damper digital twin 2506 is linked to. In some embodiments, in a system with only a single damper, the damper identifier might be assumed by the twin manager 108 and may not be included.

The air handling unit digital twin 2502 can include various attributes including a fan speed, a static pressure, and/or an outdoor air mix. The twin manager 108 can identify that the air handling unit digital twin 2502 includes the fan speed, the static pressure, and/or the outdoor air mix by identifying that the node representing the AHU, node 2422, is related to the nodes representing the fan speed, the static pressure, and/or the outdoor air mix respectively. In some embodiments, the twin manager 108 can query the building graph 2400 for all entities of a point class connected to the node 2422 to identify all attributes for the air handling digital twin 2502.

The air handling unit digital twin 2502 may have various triggers based on the fan speed, the static pressure, and/or the outdoor air mix. The triggers may be performing some action responsive to a logical determination made with one of, or a combination of, the fan speed, the static pressure, and/or the outdoor air mix. The logical determination can use an equality comparison, a greater than comparison, a less than comparison, and/or a not equal to comparison. The logical determination can include various variables and/or constants.

The air handling unit digital twin 2502 can further include an action that can be performed based on the fan speed, the static pressure, and/or the outdoor air mix. The action can, in some embodiments, be a logical command, a control algorithm (e.g., a PID algorithm, a PI algorithm, etc.) that uses some received feedback to generate a new values, etc. The actions could be increasing or decreasing the fan speed, in some embodiments. The actions could be increasing or decreasing the mixture of outdoor air and return air to provide as supply air to the VAV, in some embodiments. The static pressure setpoint can further be set based on various factors to ensure that proper air flow through the air system is achieved. In some embodiments, the static pressure setpoint could be set based on airflow at various VAVs of a building, e.g., identify that there is low or no air flow at various VAVs of the building, indicating that a setpoint should be increased. Increasing the setpoint may further cause the air handling unit digital twin 2502 to increase the fan speed to meet the static pressure setpoint.

The air handling unit digital twin 2502 may inherit attributes from the damper digital twin 2506 and/or the damper digital twin 2506. For example, the air handling unit digital twin 2502 can inherit the triggers of the VAV, e.g., the triggers for zone temperature, supply air flow, and/or supply air flow setpoint. Similarly, the air handling unit digital 2502 can inherit actions from the variable air volume digital twin 2504, e.g., actions that set the zone temperature, supply air flow, and/or supply air flow setpoint. Each of the triggers and actions inherited from the variable air volume digital twin 2504 can include an identifier in each trigger or action, e.g., "{VAV_ID}." This can indicate which VAV the trigger or action is for and/or where the trigger or action originated. The "VAV_ID" could be an identifier that uniquely identities the VAV digital twin 2504 and/or the physical damper that the damper digital twin 2506 is linked to. In some embodiments, in a system with only a single VAV, the VAV identifier might be assumed by the twin manager 108 and may not be included.

The air handling unit digital twin 2502 can inherit triggers and/or actions of the variable air volume digital twin 2504 that were in turn inherited by the variable air volume digital twin 2504 from the damper digital twin 2506. For example, the air handling unit digital twin 2502 could inherit the damper position setpoint triggers and/or actions from the variable air volume digital twin 2504 and the damper digital twin 2506. These inherited triggers and actions can identify both the variable air volume and the damper, e.g., could include two identifiers. For example, the triggers and/or actions could indicate "{VAV_ID}. {DAMPER_ID}" to indicate that the trigger and/or action is inherited two times.

In some embodiments, the air handling unit digital twin 2502 can combine the various triggers and/or actions it includes (e.g., both inherited and/or original triggers and/or actions). In some embodiments, the triggers and/or actions can be combined by rules engine 925. For example, the rules engine 925 can be configured to cause a trigger of the air handling unit digital twin 2502 could trigger an action of the damper digital twin 2506. In some embodiments, complex combinations of the triggers and/or actions can be combined to perform a particular operation. For example, the air handling unit digital twin 2502 could indicate a trigger to perform an air flush of a building. The air handling unit digital twin 2502 could identify to perform a flush of all air in the building. To perform the flush, the outdoor air mix could be set to fully outdoor air, the fan could be set to full, and the camper could be set to completely open.

In some embodiments, the air handling unit digital twin 2502 may use a supply air flow sensor to operate. However, if the sensor stops functioning, the air handling unit digital twin 2502 could use an inherited air flow sensor from the variable air volume digital twin 2504 to replace the supply air flow sensor of the air handling unit digital twin 2502. In some embodiments, the air handling unit digital twin 2502 could run simulations to identify fail over points, some of which may be triggers, actions, or attributes inherited from lower level digital twins.

Figure 26:
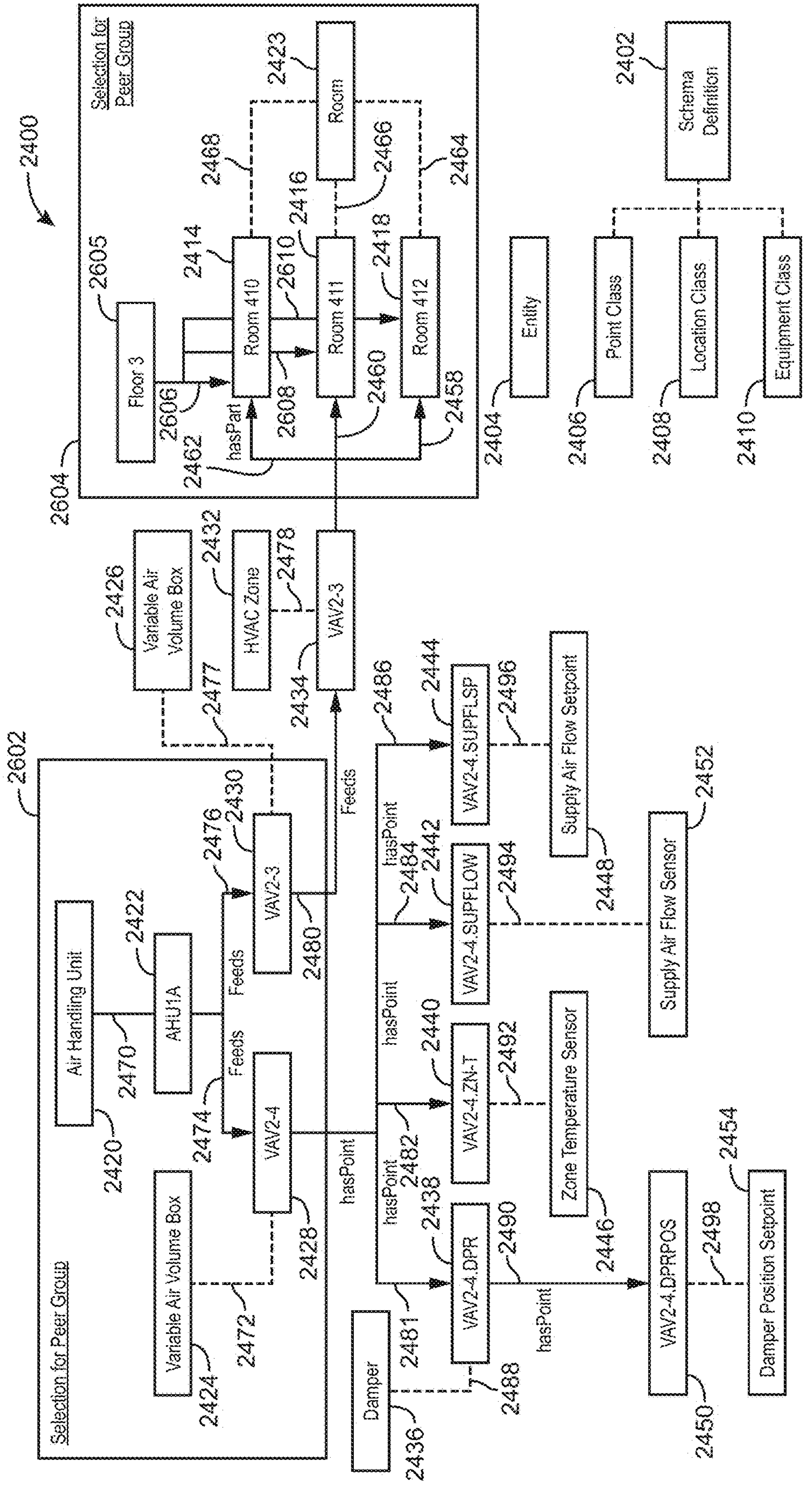
FIG. 26 is a block diagram of a building graph with a selection of nodes and edges that the twin manager of FIG. 1 analyzes to generate a peer grouped digital twin, according to an exemplary embodiment.

Referring now to FIG. 26, the building graph 2400 is shown with a selection 2602 of nodes and edges that the twin manager 108 analyzes to generate a peer grouped high level digital twin, according to an exemplary embodiment. In some embodiments, the twin manager 108 can analyze the building graph 2400 to identify that multiple entities of the building graph 2400 all relate to the same group, e.g., are all of the same type (e.g., are all VAV digital twins). The peer grouped digital twin can be a grouping of digital twins that are for the same entity type (person, space, piece of equipment, etc.). The grouping of digital twins can be set up to work together and can be rolled up to the same parent digital twin.

For example, the entities may all be linked to a particular system. For example, the twin manager 108 could identify that a set of devices all relate to controlling operation for a particular space and generate a group of high level digital twin based on the set of devices. The twin manager 108 could identify that a set of devices are all associated with a particular user and generate a group of high level digital twin based on the set of devices. In some embodiments, the twin manager 108 could identity that devices all make up a particular subsystem of a building and that a high level digital twin could be generated for.

In some embodiments, the twin manager 108 can identify that the AHU represented by the AHU node 2422, the VAV represented by the VAV node 2428, and the VAV represented by the VAV node 2430 all operate together to control air flow to a zone of a building, e.g., a floor 3. The floor 3 is represented by a node 2605, that includes the various rooms indicated by the edges 2606, 2608, and 2610 between the node 2605 and the nodes 24414-2418. The twin manager 108 can identify edges that relate the VAVs of the AHU to the particular zone, e.g., the edge 2480 between the VAV2-3 node 2430 and the VAV2-3Zone 2434 which is related to rooms of the floor 3 via edges 2462, 2460, and/or 2458 to the nodes 2414-2418.

In some embodiments, the twin manager 108 can periodically search the building graph 2400 to identify whether any new peer grouped digital twins can be generated. In some embodiments, a user and/or other system may provide an indication of an entity type for a peer group digital twin to be generated for, e.g., identify VAVs of an air system (the selection 2602), identify rooms of a floor (selection 2604), etc. The twin manager 108 can query the building graph 2400 based on the entity type, identify entities of the entity type, generate or select digital twins for the entities, and/or combine the digital twins into a peer grouped digital twin that can be added into a higher level digital twin. For example, digital twins of the nodes 2428 and 2430 can be rolled into the digital twin for the AHU represented by the node 2422. Similarly, digital twins of the floors represented by the nodes 2414-2418 can be rolled into the digital twin for the floor represented by the node 2605.

Figure 27A:
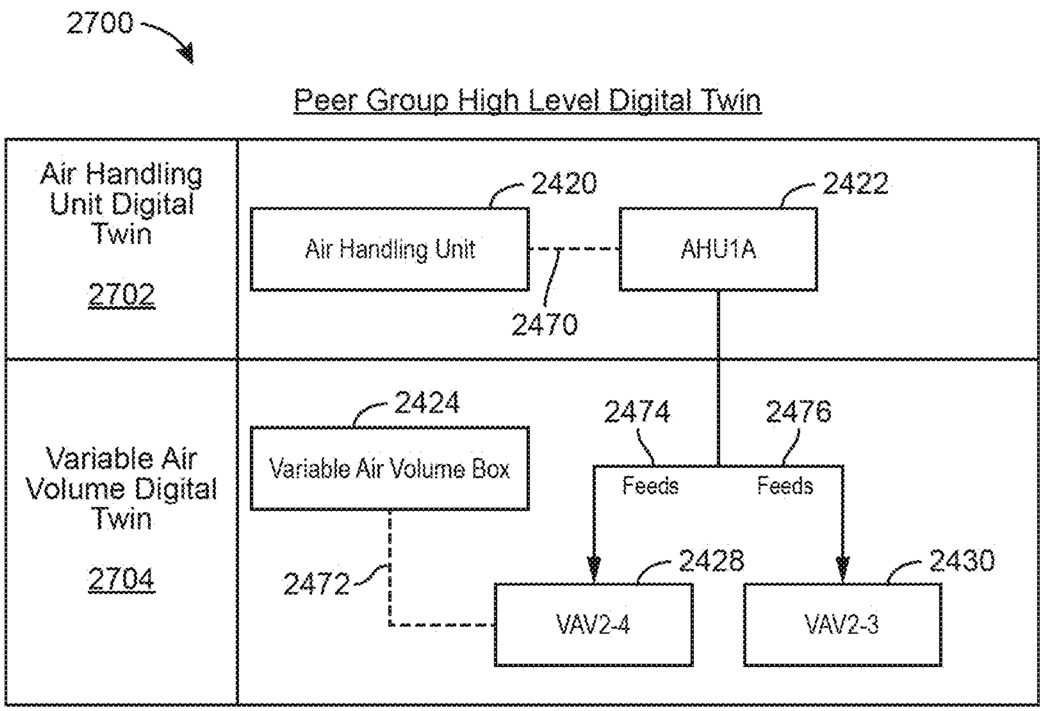
FIG. 27A is a block diagram of an air handling unit digital twin generated from lower level digital twins that are peer grouped by the twin manager of FIG. 1, according to an exemplary embodiment.

Referring now to FIG. 27A, a chart 2700 of an air handling unit digital twin 2702 generated from a lower level digital twin 2704 that is a peer grouped digital twin generated by the twin manager 108 is shown, according to an exemplary embodiment. Based on the selection 2602, the twin manager 108 can generate and/or select a digital twin for each entity identified in the selection 2602. For example, the twin manager 108 can generate a variable air volume digital twin 2704 for the VAV2-4 and/or VAV2-3. In some embodiments, a single digital twin is generated (and/or selected) to represent both of the VAVs. In some embodiments, two digital twins are generated (and/or selected), one for the VAV2-4 and a second for the VAV2-3. These two digital twins can be grouped together as a peer grouped digital twin.

The twin manager 108 can identify that the air handling unit digital twin 2702 is a higher level digital twin than the variable air volume digital twin 2704 based on dependencies between the AHU and the VAV in the building graph 2400. For example, the twin manager 108 can identify that the node 2428 representing the VAV2-4 depends from the AHU node 2422 via the "Feeds" edge 2474 and identify that the node 2430 representing the VAV2-3 depends from the AHU node 2422 via the "Feeds" edge 2476. Based on this dependency, the twin manager 108 can organize the digital twins 2702-2704 in a hierarchy such that the air handling unit digital twin 2702 is above the variable air volume digital twin 2704.

In some embodiments, the twin manager 108 can combine the twins 2702 and 2704 into a single digital twin. The digital twin may, in some embodiments, be a new digital twin. In some embodiments, the variable air volume digital twin 2704 is a peer grouped digital twin that is rolled up into the air handling unit digital twin 2702 to form a high level digital twin.

Referring now to FIG. 27B, a table 2750 indicating attributes 2752, inherited attributes 2754, triggers 2756, and actions 2758 for the digital twins 2702 and 2704 is shown, according to an exemplary embodiment. The variable air volume digital twin 2704 may be similar to, or the same as, the variable air volume digital twin 2504 and can include various of the same attributes, e.g., zone temperature, supply air flow, supply air flow setpoint, etc. However, the variable air volume digital twin 2704 may include attributes for both of the VAVs represented by the nodes 2428 and 2430 and thus may include two sets of the attributes. Similar to the variable air volume digital twin 2504, the variable air volume digital twin 2704 can inherit a damper position setpoint or setpoints from dampers that the VAVs represented by the nodes 2428 and 2430 include, e.g., the damper represented by the damper node 2438.

The variable air volume digital twin 2704 can include triggers and actions based on the attributes. The triggers and actions may be triggering on or setting the various attributes, e.g., zone temperature, supply air flow, supply air flow setpoint. The variable air volume digital twin 2704 can indicate triggers and/or actions for one or both of the VAVs represented by the nodes 2428 and 2430. The variable air volume digital twin 2704 can further include inherited triggers and/or actions for the dampers of the VAVs represented by the nodes 2428 and 2430 respectively.

In some embodiments, the triggers of the air handling unit digital twin 2702 can include a trigger that is based on a total value of an inherited attribute. For example, a total supply air flow of the VAVs could trigger a particular action, e.g., changing a fan speed, changing a static pressure, etc. Furthermore, in some embodiments, a trigger may change based on either or both of a particular attribute of the VAVs represented by nodes 2428 and 2430 and/or the dampers of the VAVs meets particular conditions, e.g., if either one or both zone temperatures meet a condition, perform an operational action, e.g., changing zone temperatures, changing fan speed, changing damper position etc. Furthermore, in some embodiments, an action can change one or multiple attributes. For example, one action may be to change one supply air flow setpoint of one VAV while another action might be to change all supply air flow setpoints of all VAVs. In some embodiments, the peer grouped digital twin could operate the VAVs in parallel (e.g., the same) or separately. In some embodiments, if one entity (e.g., chiller) of a chiller peer grouped digital twin fails or encounters an error, a rebalancing twin could cause the chillers to update operation to rebalance operation to account for the failing chiller.

Figure 28:
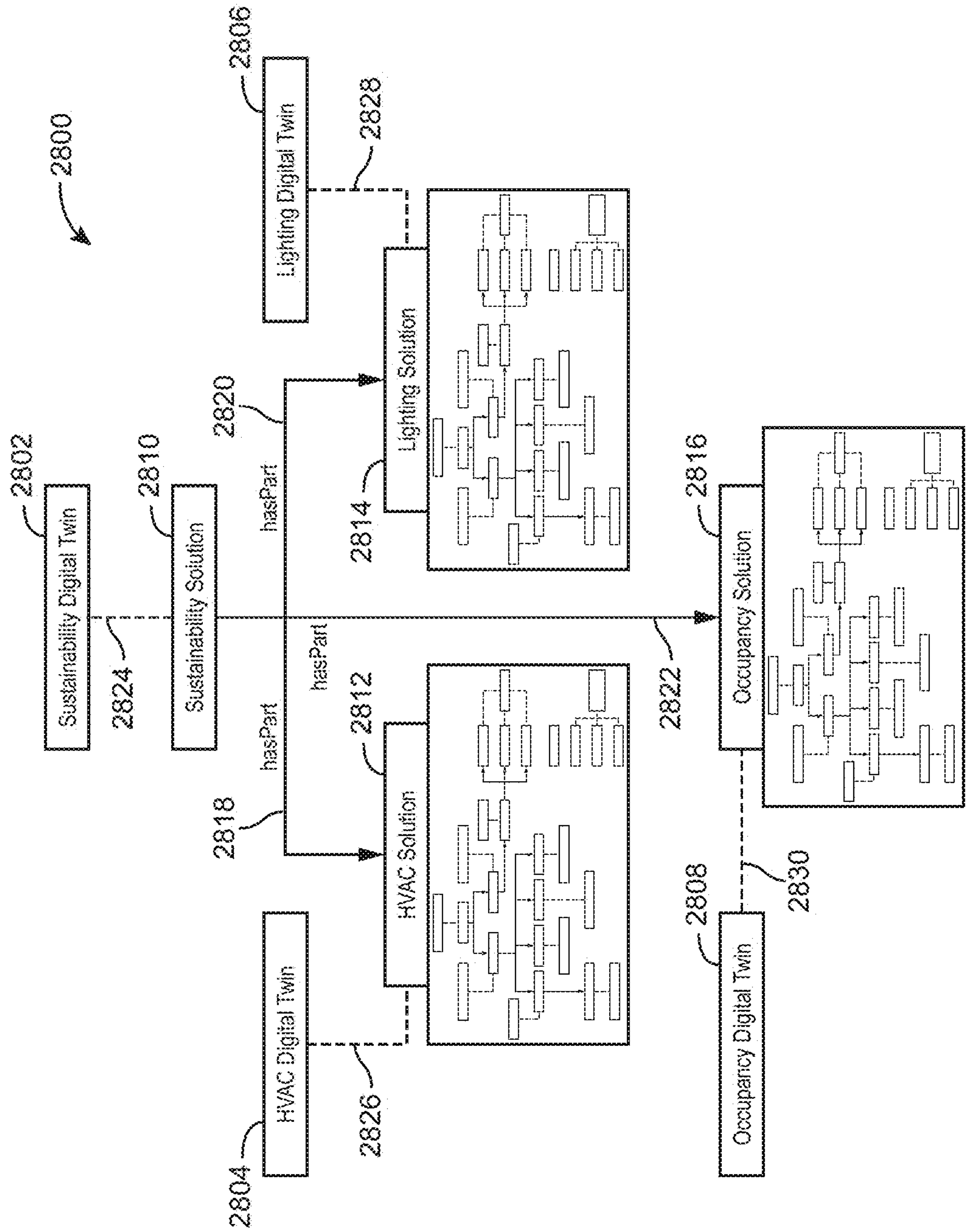
FIG. 28 is a block diagram of solution digital twins, according to an exemplary embodiment.

Referring now to FIG. 28, a block diagram 2800 of solution digital twins 2810-2816 is shown, according to an exemplary embodiment. In some embodiments, digital twins can be combined in an ad-hoc manner to form a digital twin that provides actions that meet a goal of a particular building solution. The digital twins can be combined in an ad hoc manner where related and/or unrelated digital twins (e.g., where there may be various degrees of separation away from each other in the building graph 2400) can be collectively defined as a solution twin serving a purpose or providing a business value. The solution may be an occupancy solution 2816 for tracking occupancy, a lighting solution 2814 for operating light systems of a building, an HVAC solution 2812 for operating HVAC equipment, a sustainability solution 2810 for building sustainability, etc. The solution could be facility management, in some embodiments. In some embodiments, a solution twin could be an economizer digital twin that users underlying digital twins for sensors, actuators, etc. to implement an economizer solution.

The solution twin could be an asset tracking twin, geolocation twin, occupancy tracking twin, infectious disease contact tracing twin, etc. In some embodiments, contact tracing could be performed by a contact tracing digital twin. The contact tracing digital twin could make contact tracing inferences based on asset tracking determinations of an asset tracking digital twin, occupancy tracking of an occupancy tracking digital twin, etc. Contact tracing is described in U.S. patent application Ser. No. 17/220,795 filed Apr. 1, 2021, the entirety of which is incorporated by reference herein. In some embodiments, a geolocation tracking digital twin could perform occupant tracking for a particular geolocation of a building. In some embodiments, an occupant tracing digital twin could receive data from various tracking systems, e.g., a Wi-Fi tracking system, a Bluetooth beacon system, a 5G tracking system, etc. The twin could identify which tracking system is most reliable for each scenario and select between the data of the various tracking systems to make occupant tracking determinations. The occupant tracking twin could identify unexpected occupant changes. For example, the speed at which occupancy is changing.

In some embodiments, the solution twin is an outside environment twin that collects data from various systems within a building, outside a building, ambient light, weather prediction systems, outdoor sensors, etc. to determine outdoor environments. Determinations from the outside environment twin can be fed to other twins, in some embodiments. The twin can, in some embodiments, identify whether weather conditions or normal or should be an alarm, e.g., whether it is normal for a particular side of the building to have high temperature based on sunlight. In some embodiments, the twin can select between conflicting temperature measurements, e.g., one temperature sensor that light is shining on might be extremely high and conflict with another temperature sensor not in direct sunlight.

In some embodiments, each solution includes a solution digital twin formed from lower level digital twins. For example, the occupancy solution 2816 can include an occupancy digital twin 2808. In response to identifying that a digital twin for the occupancy solution 2816 should be generated, the twin manager 108 can identify all entities of the building graph 2400 that generate occupancy related data and combine the digital twins for the entities (e.g., either new generated digital twins or existing digital twins) into a single occupancy digital twin 2808, e.g., with inheritance as described in FIGS. 24-27B. Similarly, in response to identifying that a digital twin for the HVAC solution 2812 should be generated, the twin manager 108 can identify all entities of the building graph 2400 that manage HVAC systems and combine the digital twins for the entities (e.g., either new generated digital twins or existing digital twins) into a single HVAC digital twin 2804, e.g., with inheritance as described in FIGS. 24-27B. Furthermore, in response to identifying that a digital twin for the lighting solution 2814 should be generated, the twin manager 108 can identify all entities of the building graph 2400 that manage lighting systems and combine the digital twins for the entities (e.g., either new generated digital twins or existing digital twins) into a single lighting digital twin 2806, e.g., with inheritance as described in FIGS. 24-27B.

In some embodiments, one solution may be a higher level solution than other solutions. For example, one solution may combine multiple different solutions together. For example, the sustainability solution 2810 may include the HVAC solution 2826, the occupancy solution 2816, and the lighting solution 2814. In some embodiments, each of the solutions 2810-2814 may be nodes within a graph, e.g., the building graph 2400. Edges may relate the various solutions 2810-2814, e.g., the "hasPart" edges 2818-2822. These edges may, in some embodiments, be inferred by the twin manager 108 and/or input by a user via the user device 176.

In some embodiments, based on the dependencies between the solutions, the twin manager 108 can identify that the twins 2804-2808 should be ordered in a hierarchy similar to the hierarchy of the solutions. Based on the hierarchical ordering of the twins 2804-2808, the twin manager 108 can generate a high level solution twin that inherits lower level attributes, triggers, and/or actions, in some embodiments.

Figure 29A:
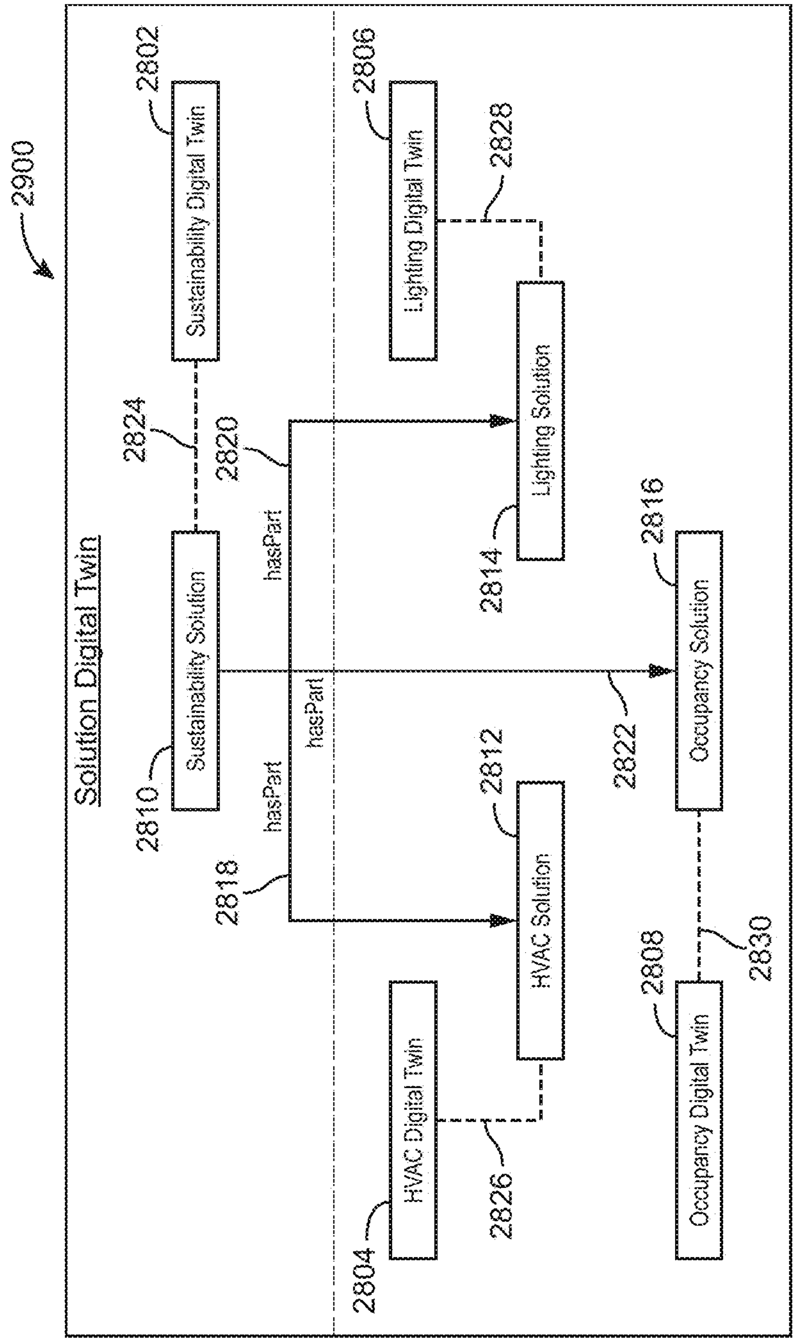
FIG. 29A is table indicating a hierarchy of the digital twins of FIG. 28, according to an exemplary embodiment.

Referring now to FIG. 29A, a table 2900 indicating a hierarchy of the digital twins 2802-2808 of FIG. 28 is shown, according to an exemplary embodiment. The table 2900 organizes the digital twins 2802-2808 in a hierarchy of dependencies, e.g., the sustainability digital twin 2802 is a higher level digital twin while the HVAC digital twin 2804, the occupancy digital twin 2808, and the lighting digital twin 2806 are lower level digital twins. The twin manager 108 can identify, that the sustainability solution 2810 is a particular objective aimed at reducing carbon emissions for a building, improving a sustainability score, driving the building towards net zero emissions production, etc.

The twin manager 108 can identify (or generate) other digital twins that generate information for other solutions that handle lower level objectives that are needed to accomplish the sustainability objective. For example, the twin manager 108 can identify that for the sustainability digital twin 2802 to meet a sustainability objective, the sustainability digital twin needs to be aware of occupancy data and have control over HVAC and lighting systems. Therefore, the twin manager 108 can group the HVAC solution 2812, the lighting solution 2814, and the occupancy solution 2816 (and the corresponding digital twins 2804, 2808, and 2806) under the sustainability solution 2810 (and the corresponding sustainability digital twin 2802).

Referring now to FIG. 29B, a table 2950 indicating attributes, inherited attributes, triggers, and actions for the digital twins 2802-2808 is shown, according to an exemplary embodiment. The table 2950 indicates attributes 2952, inherited attributes 2954, triggers 2956, and actions 2958, for the sustainability digital twin 2802, the HVAC digital twin 2804, the lighting digital twin 2806, and the occupancy digital twin 2808.

The HVAC digital twin 2804 can include various HVAC mode attributes. The HVAC mode could be a weekend mode, a weekday mode, a cooling mode, a heating mode, an energy reduction mode, etc. The lighting digital twin 2806 can include various lighting mode attributes. The mode could be lighting on or off (or at a particular level) in various lighting zones. The occupancy digital twin 2808 could include various occupancy mode attributes. The attributes could be a weekend mode, a weekday mode, an inside work hours mode, an outside work hours mode, a predicted occupancy level for a future time, a current occupancy level, etc. Furthermore, each of the digital twins 2804-2808 can include attributes inherited from underlying digital twins. For example, the HVAC digital twin 2804 could inherit various setpoints and/or sensor measurements of underlying VAV digital twins and/or damper digital twins. The lighting digital twin 2806 could include control points of various lighting digital twins, each for a particular light system, to control various lights on or off, hue points to control the hue of various lights, intensity points to control the intensity of various lights, etc. Furthermore the occupancy digital twin 2808 can include various inherited attributes such as passive infrared (PIR) sensor measurements of a PIR sensor digital twin, building entry counts of an access control digital twin for an access control system, occupant counts of a surveillance system digital twin of a surveillance system, etc.

The digital twins 2804-2808 can include various triggers and actions. For example, the HVAC digital twin 2804 can include an HVAC trigger indicating to trigger a setpoint change action responsive to detecting changes in occupancy level, outdoor air temperature, calendar day, day of week, etc. The lighting digital twin 2806 can include various triggers and actions. For example, a trigger could be receiving a command event from an application for light control and performing an action to control a lighting system based on the command event. The trigger could be a particular time of day and responsive to the time of day being reached, an action occurring that turns lighting on or off. In some embodiments, the trigger could be based on schedule data of a schedule system. In some embodiments, a trigger may cause an action to turn lights on ten minutes before a scheduled meeting or turn lights off ten minutes after the scheduled meeting.

The sustainability digital twin 2802 can include attributes including a sustainability score and a sustainability mode. The score could be a value indicating carbon emissions, energy consumption, level of carbon neutrality, etc. In some embodiments, the score could be a value combining one or multiple sustainability factors. The sustainability digital twin 2802 includes a sustainability mode. The mode can indicate to consume energy from a particular source, e.g., an electricity grid, solar panels, a battery reserve system, a hydroelectric system, operate with reduced environmental heating or cooling, etc. The sustainability digital twin 2802 can further inherit the attributes of the digital twins 2804-2808 based on the hierarchy of the sustainability digital twin 2802 being a higher level twin than the digital twins 2804-2808, in some embodiments. In some embodiments, the sustainability digital twin 2802 could run an emissions model based on HVAC operations, lighting operations, occupancy levels, etc. indicated by the twins 2804-2808.

In some embodiments, the trigger(s) of the sustainability digital twin 2802 can indicate a trigger based on the sustainability score and/or the sustainability mode. If the sustainability score is greater than, less than, equal to, or not equal to a particular value, a particular action could be triggered (e.g., reducing lighting intensity to reduce energy consumption, precooling a building to save energy, increasing heating to increase occupant comfort, etc.). Various logical comparisons and/or functions can be included by the sustainability digital twin 2802 that include the sustainability score, the sustainability mode, the various attributes of the twins 2804-2808, various constants, etc. Furthermore, the sustainability digital twin 2802 can inherit the triggers of the various digital twins 2804-2808.

In some embodiments, the triggers of the sustainability digital twin 2802 can cause an action to occur, e.g., changing the sustainability mode. In some embodiments, other actions could be inherited, e.g., actions of the digital twins 2804-2808. For example, if a sustainability score is below a particular value, to improve the sustainability score, an energy reduction sustainability more could be entered which causes an HVAC action that reduces energy consumption to be triggered.

Figure 30:
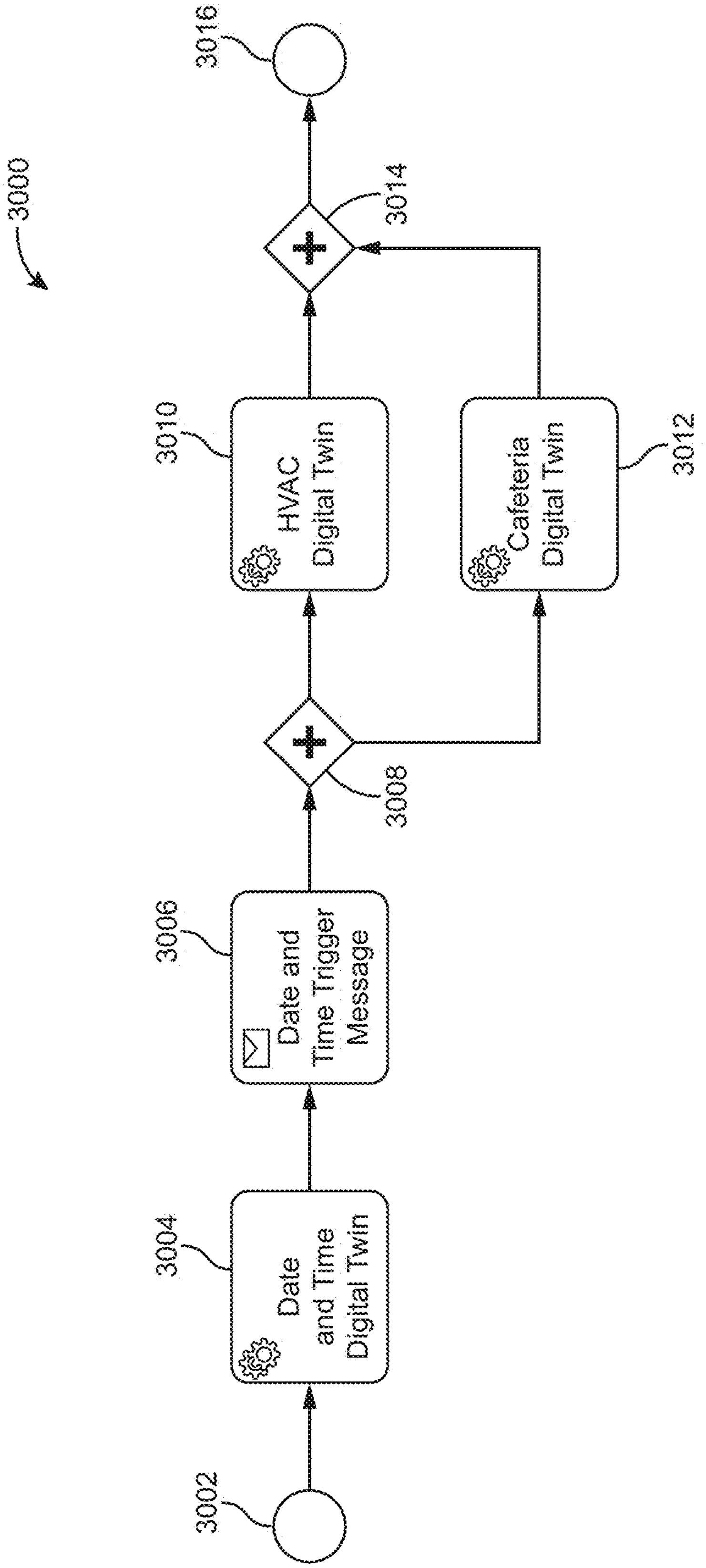
FIG. 30 is a schematic diagram of user interface elements of a user interface for constructing a high level digital twin based on user input, according to an exemplary embodiment.
Figure 32:
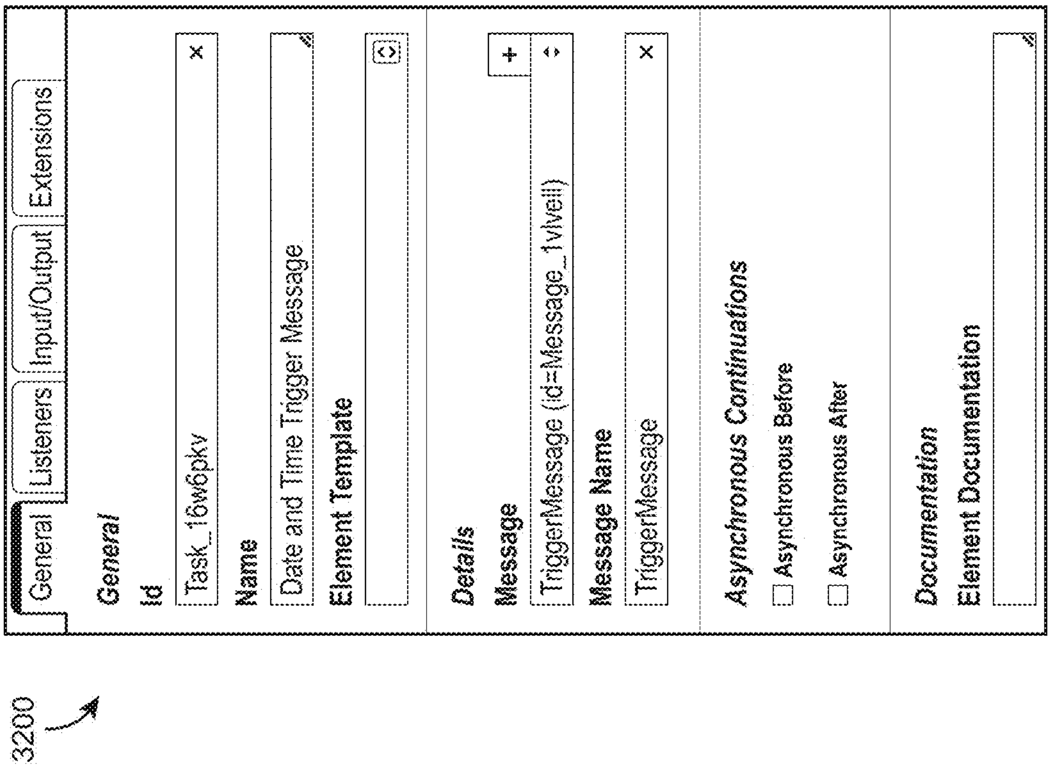
FIG. 32 is a user interface element for configuring a date and time trigger message of the high level digital twin of FIG. 30, according to an exemplary embodiment.
Figure 31:
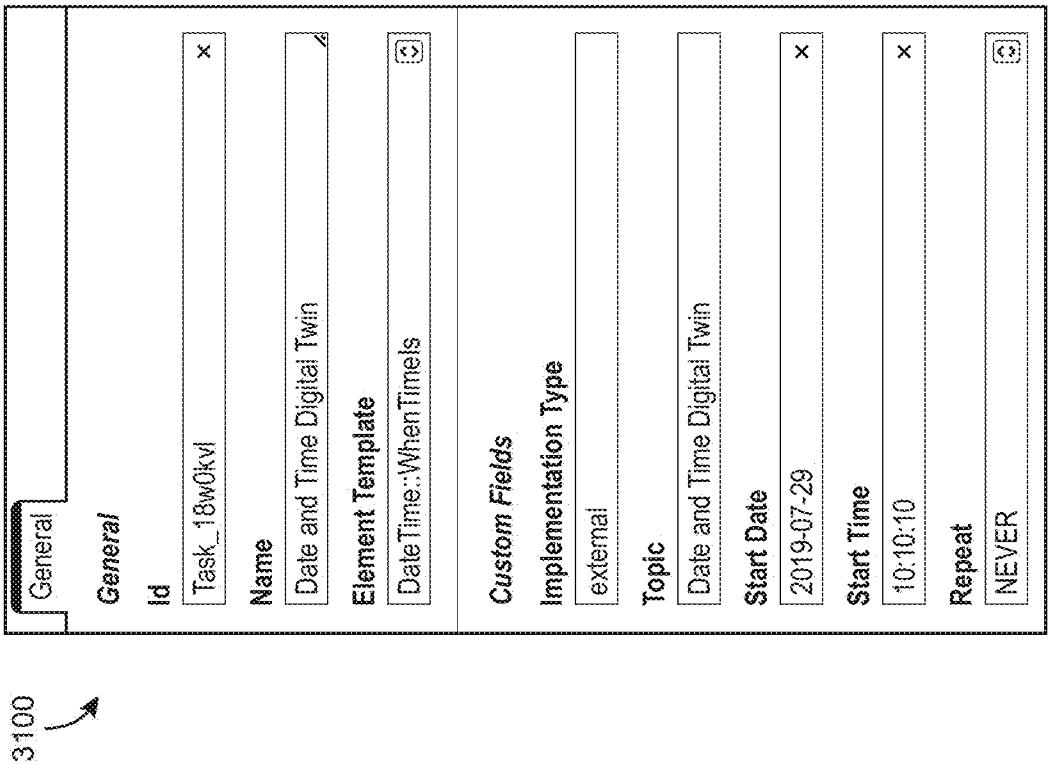
FIG. 31 is a user interface element for configuring a date and time digital twin of the high level digital twin of FIG. 30, according to an exemplary embodiment.

Referring now to FIG. 30, user interface elements 3002-3012 of a user interface 3000 for constructing a high level digital twin based on user input is shown, according to an exemplary embodiment. The user interface 3000 can be a user interface displayed on the user device 176. The user interface 3000 can allow a user to interact with the various elements of the user interface 3000. For example, a user can add, delete, move, order, etc. the various elements of the user interface 3000. The user input can, in some cases, define digital twins, define the triggers and/or actions of the digital twins, and/or define how the twins are interrelated (e.g., how one trigger of one twin causes an action in a different twin).

In the user interface 3000, a start element 3002 defines a logical start to the flow of the user interface 3000. The start could be a trigger of a date and time digital twin 3004, in some embodiments. The trigger could be a date or time changing, e.g., the start of a new hour, the start of a new date, a particular date and/or time occurring, etc. The date and time digital twin 3004 can be configured by the user based on the user interface 3100 shown in FIG. 31. In some embodiments, the date and time digital twin can be set for a particular start date and time and, in some cases, can repeat. The result of the date and time digital twin triggering can be a date and time trigger message 3006. The message 3006 can be configured in the user interface 3200 shown in FIG. 32. The user interface 3200 can allow a user to define a name for the message, a template, asynchronous continuations, etc.

A parallel element 3008 can indicate that the message 3006 should be provided to both an HVAC digital twin 3010 and a cafeteria digital twin 3012. The HVAC digital twin 3010 and/or the cafeteria digital twin 3012 can execute in parallel each based on the message 3006. For example, the HVAC digital twin 3010 may turn a chiller on at the particular date and/or time, in some embodiments. The cafeteria digital twin 3012 may, in some embodiments, initiate cafeteria functionality, e.g., place an order in an order system, turn lights on in the cafeteria, unlock cafeteria doors, etc. The parallel element 3014 and the end element 3016 can indicate that end of the flow define din the user interface 3000.

Figure 33:
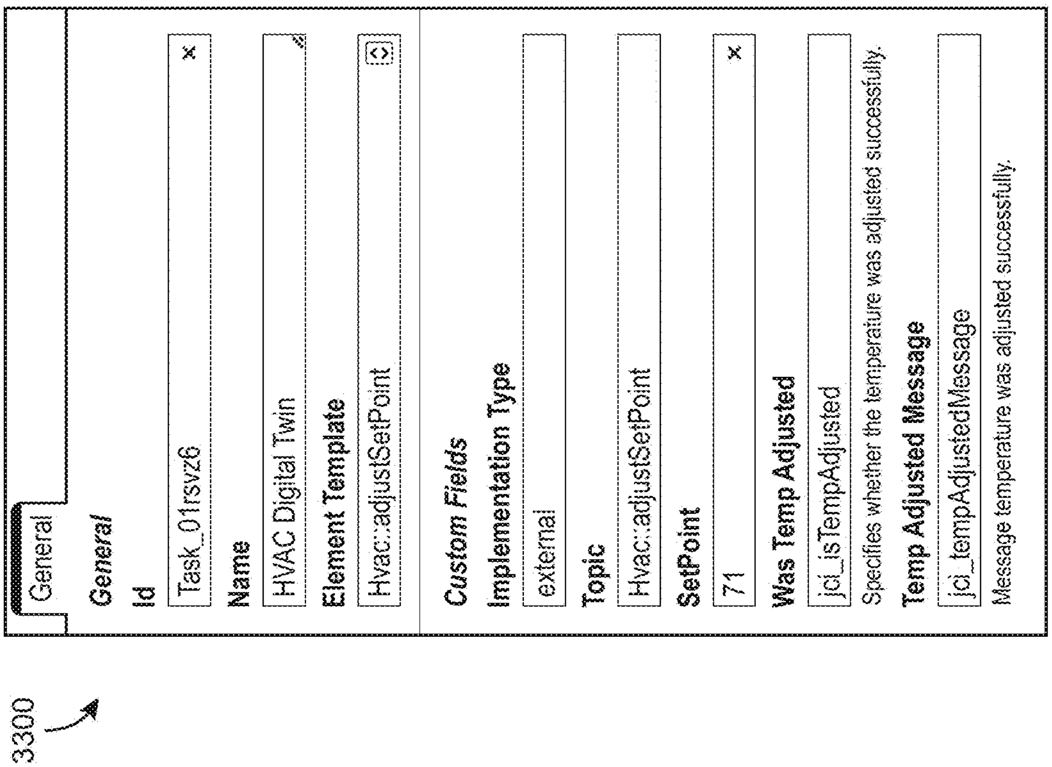
FIG. 33 is a user interface element for configuring an HVAC digital twin of the high level digital twin of FIG. 30, according to an exemplary embodiment.
Figure 34:
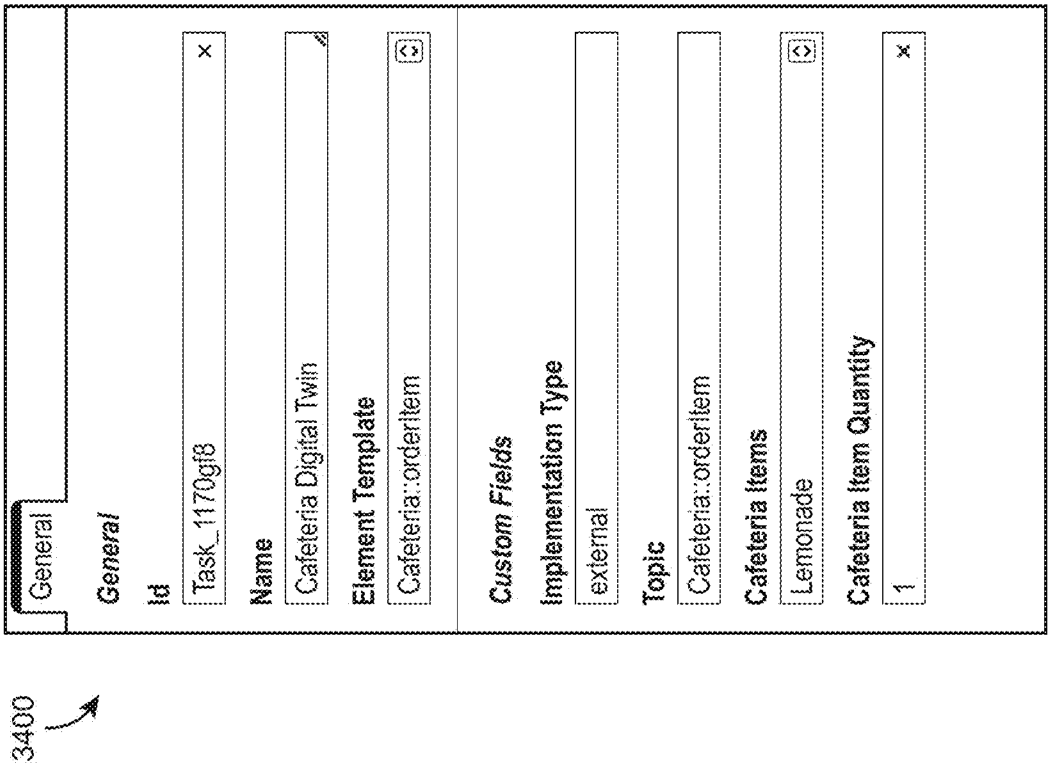
FIG. 34 is a user interface element for configuring a cafeteria digital twin of the high level digital twin of FIG. 30, according to an exemplary embodiment.

The HVAC digital twin 3010 can be defined in the user interface 3300 of FIG. 33. In some embodiments, the user can configure a name of the digital twin, an element template, an implementation type, a topic, a setpoint which the triggered HVAC digital twin 3010 changes temperature to (e.g., 71 degrees Fahrenheit), an indication of whether a temperature was adjusted successfully, etc. The cafeteria digital twin 3012 can be defined in the user interface 3400 of FIG. 34. The cafeteria digital twin 3012 can indicate a name of the digital twin, an element template for the digital twin, an implementation type, a topic for the cafeteria digital twin 3012, an item to be ordered responsive to the twin triggering, and a number of items to be ordered responsive to the cafeteria digital twin 3012 triggering.

Figure 35:
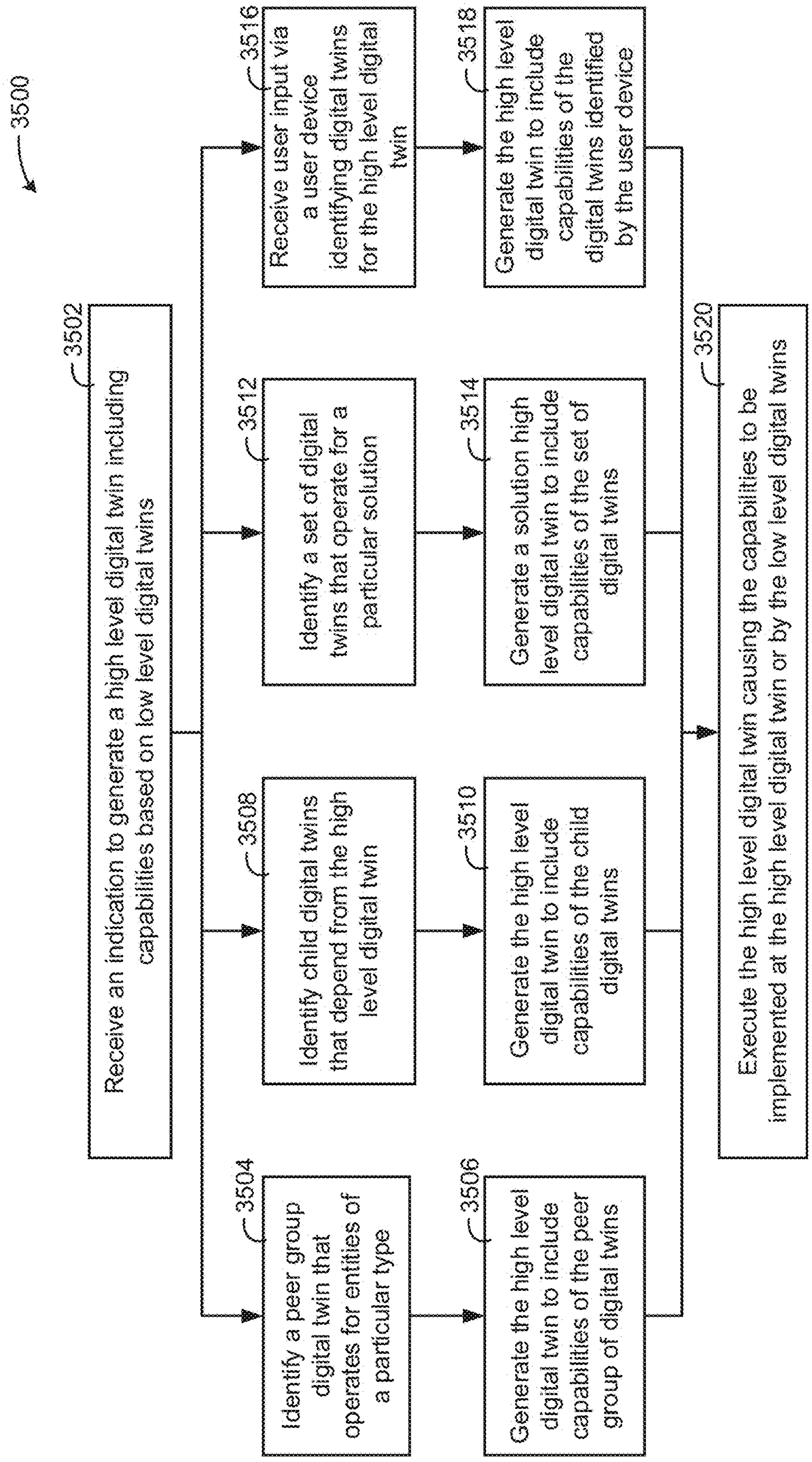
FIG. 35 is a flow diagram of a process of generating a high level digital twin, according to an exemplary embodiment.

Referring now to FIG. 35, a process 3500 of generating a high level digital twin is shown, according to an exemplary embodiment. The process 3500 can be performed by the twin manager 108 to generate high level digital twins, in some embodiments. Furthermore, any computing devices described herein can be configured to perform the process 3500. The high level digital twins generated according to the process 3500 may be based on a peer group based digital twin as discussed in FIGS. 26-27B, an inheritance based digital twin as discussed in FIGS. 24-25B, a solution twin that operates to provide a particular solution as discussed in FIGS. 28-29B, and/or may be based on user input.

In step 3502, the twin manager 108 can receive an indication to generate a high level digital twin that includes capabilities that are at least in part based on the capabilities of lower level digital twins. The indication may be a trigger to search the building graph 2400 for nodes and edges that indicate a new peer group digital twin, inheritance based digital twin, or solution digital twin should be generated. The indication may further be a request by a user (e.g., via the user device 176) and/or system that a new digital twin be generated based on a selection of a peer group, a selection of parent and child digital twins, an indication of a solution, and/or a direct identification of digital twins to be combined. In some embodiments, the indication may be an update to the building graph 2400, e.g., new nodes or edges being added to the building graph 2400. An update to the building graph 2400 may indicate that new high level digital twins should be created or existing digital twins should be adjusted.

In some embodiments, one digital twin could be generated responsive to a particular state occurring. For example, if a people counter identifiers a particular occupancy level, an overpopulation digital twin could be implemented if the occupancy level is over a particular level. In some embodiments, an under population digital twin could be implemented if the occupancy level is below a particular level. The instantiated digital twins could be generated, e.g., according to the steps 3504-3520 or elsewhere herein to perform a particular solution for overpopulation or under population. In some embodiments, one virtual twin could update its own internal state based on its triggers and update its operation based on the state. The people counter twin could set an overpopulation or under population mode that it operates on based on people counting it performs.

In step 3504, the twin manager 108 can identify a peer group digital twin that is a digital twin for entities of a particular entity type. For example, the twin manager 108 can query the building graph 2400 based on a particular entity type, e.g., person, space, or device. In some embodiments, each identified entity of the building graph 2400 that is part of the peer group can be associated with a digital twin. The digital twin can be generated by the twin manager 108. In some embodiments, the digital twin already exists for the entities of the peer group and is selected instead. Furthermore, continuing from the above example, if the peer group digital twin is a digital twin for VAVs fed by an air handling unit, a digital twin for the air handler unit, the air handling unit digital twin 2702 can be selected as well for the peer group digital twin for the VAVs to be rolled into.

In step 3506, the twin manager 108 can generate the high level digital twin to include capabilities of the peer group digital twin identified in the step 3504. For example, the peer group digital twin may be lower level digital twin that could be combined into a higher level digital twin. In some embodiments, the high level digital twin is generated (or modified) to include all of capabilities of the peer group of digital twins. In some embodiments, the twin manager 108 may rank one or more peer groups of digital twins and/or individual digital twins and cause lower level digital twins to be absorbed into the higher level digital twin. For example, the capabilities of the variable air volume digital twin 2704, that forms a peer group for VAVs, could be rolled up into an air handling unit digital twin for an AHU that feeds air to the VAVS (as identified by the twin manager 108 from the VAV nodes 2428 and 2430 being linked to the AHU node 2422).

In step 3508, the twin manager 108 can identify child digital twins that depend from a high level digital twin. For example, the twin manager 108 could query the building graph 2400 to identify dependent entities that depend from each other and/or a higher level entity. As an example, the twin manager 108 could identify that the damper node 2438 depends from the VAV node 2428 via the edge 2480 and that the VAV node 2428 depends from the AHU node 2422 via the edge 2474. In some embodiments, the twin manager 108 could select or generate a digital twin for each entity, e.g., generate the damper digital twin 2506 for the damper, generate the variable air volume digital twin 2504 for the variable air volume, and/or the air handling unit digital twin 2502 for the air handling unit.

In step 3510, the twin manager 108 can generate the high level digital twin to include the capabilities of the child digital twins identified in the step 3508. For example, in some embodiments, a digital twin could be generated that inherits all of the capabilities of the child digital twins. For example, a parent digital twin could include the capabilities of all of the digital twins that depend from it. For example, the variable air volume digital twin 2504 could inherit the capabilities of the dependent damper digital twin 2506. These capabilities of the variable air volume digital twin 2504 and the damper digital twin 2506 could in turn be inherited into the higher level air handling unit digital twin 2502.

In step 3512, the twin manager 108 can identify a set of digital twins that operate for a particular solution. For example, the twin manager 108 could identify one or more digital twins that have capabilities, attributes, or other information that supports a particular operational goal, e.g., improving sustainability, predicting building load, etc. For example, the twin manager 108 could identify the HVAC digital twin 2804, the lighting digital twin 2806, and the occupancy digital twin 2808 that all support a sustainability solution 2810. In step 3514, the twin manager 108 can generate a solution high level digital twin to include capabilities of the child digital twins, this can form a digital twin that uses the capabilities of other digital twins to perform operations to meet a goal for a solution. For example, if the solution is sustainability, the twin manager 108 can generate the sustainability digital twin 2802 and cause the sustainability digital twin 2802 to inherit the capabilities of the lower level digital twins (which may also be solution twins), e.g., the HVAC digital twin 2804, the occupancy digital twin 2808, and the lighting digital twin 2806.

In step 3516, the twin manager 108 can receive user input via the user device 176 identifying digital twins. The selection can indicate that various digital twins and how each digital twin depends from another digital twin. In some embodiments, the user input may define peer group digital twins, parent-child dependencies between the digital twins, and/or solution based digital twins. Based on the users selections and the hierarchy which they provide for the digital twins, in step 3518, the twin manager 108 can generate the high level digital twin to include capabilities of the digital twins identified by the user device 176. The high level digital twin can, in some embodiments, inherit the capabilities of the lower level digital twins.

In step 3520, the twin manager 108 can execute the high level digital twin generated in any one of the steps 3506-3518. The execution of the high level digital twin can cause the various capabilities of the digital twins to be executed. The execution can cause capabilities of the high level digital twin to execute. The execution can further cause inherited capabilities of the high level digital twin, inherited from lower level digital twins, to execute. In some embodiments, the capabilities are performed by the high level digital twin, or alternatively pushed down to the lower level digital twins by the high level digital twins for the lower level digital twins to execute. The capabilities can be the triggers, actions, or any other functionality as described herein. The result of the execution can be generating predictions, generating inferences, deriving new information, performing environmental control of temperature, humidity, lighting, etc., operating equipment (e.g., boilers, chillers, motors, engines, pumps, etc.), etc.

Figure 36:
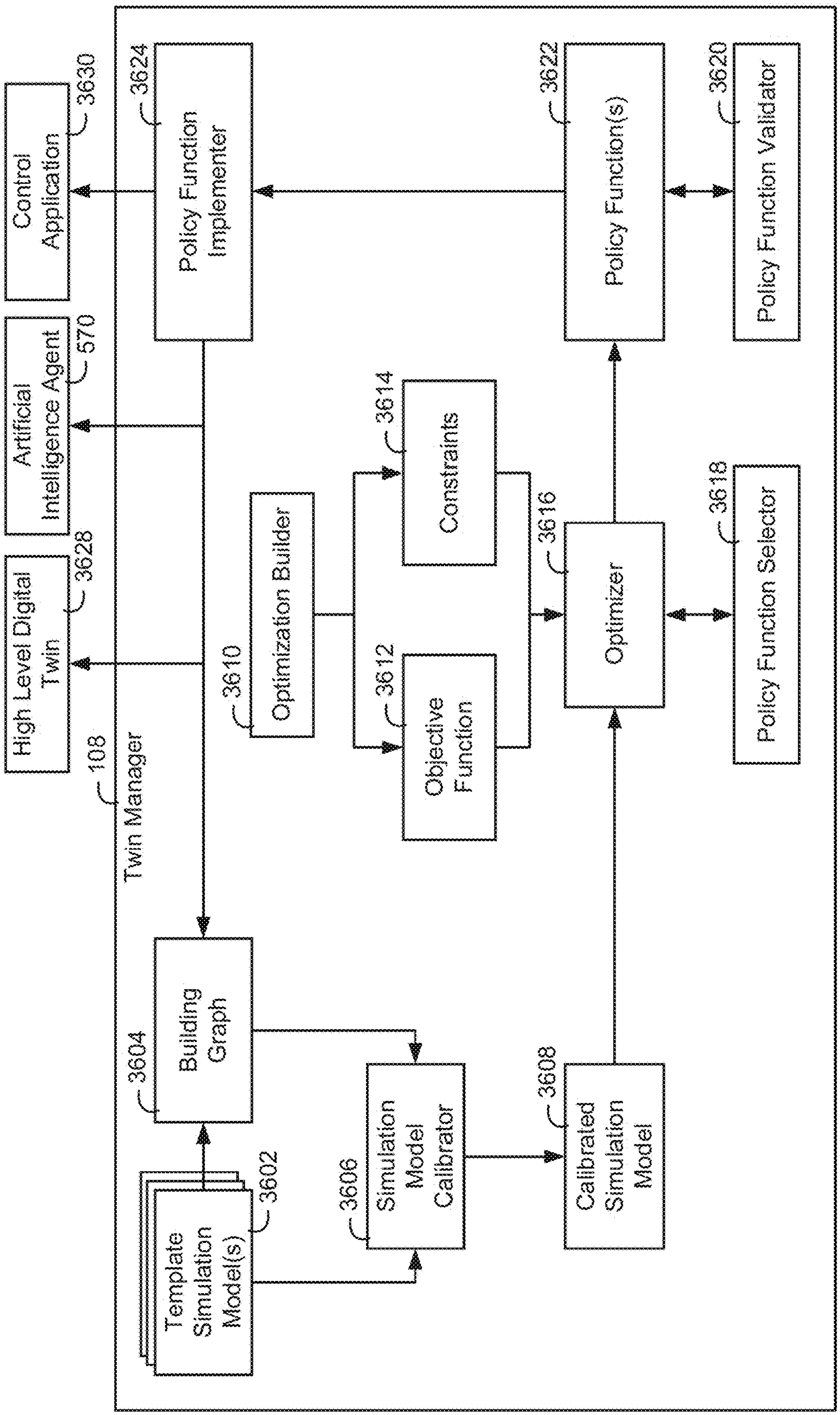
FIG. 36 is a block diagram of the twin manager of FIG. 1 implementing a simulation model and an objective function to perform an optimization to learn a policy function, according to an exemplary embodiment.

Referring now to FIG. 36, the twin manager 108 is shown implementing a calibrated simulation model 3608 and an objective function 3612 to perform an optimization to learn a policy function 3622, according to an exemplary embodiment. In some implementations, the twin manager 108 can operate to automatically identify and/or train operational policy functions 3622 using digital twin based simulation models (e.g., the calibrated simulation model 3608). The twin manager 108 can further keep the policy functions 3622 to a low complexity to allow users to more easily understand the policy functions 3622 while still creating policy functions 3622 that provide operational benefits for a system, in some implementations.

The twin manager 108 includes template simulation model(s) 3602. The template simulation models 3602 can indicate an artificial intelligence (AI), a machine learning model, a function, a physics model, etc. that predicts various output variables for input variables for an entity or set of entities. For example, an entity could be a room and the simulation model could predict room temperature of the room based on a setpoint for the room. Furthermore, the simulation model could predict infection probability for occupants of a building based on operational parameters of an AHU of the building. In another example, the simulation model may assess and/or predict sustainability information for equipment, spaces, and/or people of the building, such as carbon emissions information relating to operation of equipment and/or occupancy and/or activity in a space. In some embodiments, the simulation models 3602 identify both a model, parameters for the model, and a graph template (or graph query) that identifies specific entities of a building graph 3604 that the simulation model 3602 performs simulations for.

The building graph 3604 can be the building graphs described with reference to FIGS. 1-35. The twin manager 108 can compare template simulation models 3602 against the building graph 3604 to identify an instance in the building graph 3604 that the template simulation model 3602 applies. For example, if the template simulation model 3602 is for a room with a thermostat, the twin manager 108 could identify one or multiple rooms with thermostats and perform a policy function optimization for each instance.

In some embodiments, the simulation model calibrator 3606 can receive a selection of a template simulation model 3602, a corresponding instance of the building graph 3604, and/or data (e.g., metadata and/or timeseries data) for the instance. The simulation model calibrator 3606 can calibrate a model of the template simulation model 3602 based on the data for the instance. The simulation model calibrator 3606 can run a training and/or fitting algorithm to fit the template simulation model 3602 based on data of the specific instance to generate the calibrated (or trained, tuned, etc.) simulation model 3608. The calibrated simulation model 3608 can predict behaviors specific to the instance that the calibrated simulation model 3608 is calibrated.

The twin manager 108 includes an optimization builder 3610. The optimization builder 3610 can select an objective function 3612 and/or constraints 3614. The objective function 3612 selected by the optimization builder 3610 can be configured to sum scores based on one or more factors (which may be weighted) including energy consumption, carbon emissions, occupant comfort, infectious disease risk, etc. The constraints may define a parameter space with equality and/or inequality constraints. In some embodiments, the selection can be performed by a user, e.g., via the user device 176, in some embodiments. The objective function 3612 can be a reward function, e.g., a reward for reducing energy consumption. The constraint 3614 could define that the objective function 3612 is optimized to minimize energy consumption while maintaining occupant comfort.

The twin manager 108 can include an optimizer 3616. The optimizer 3616 can be configured to train one or multiple policy function(s) 3622 based on the objective function 3612, the constraints 3614, and/or the calibrated simulation model 3608. The optimizer 3616 can train particular policy functions provided by the policy function selector 3618. The policy function selector 3618 can select and provide various different policy functions that the optimizer 3616 trains by performing an optimization. The policy function selector 3618 can, in some embodiments, iteratively select various combinations of inputs and outputs, e.g., measurements and actions respectively, for multiple policy functions and the optimizer 3616 can train each policy function. In some embodiments, the policy function selector 3618 iteratively tests combinations of the inputs and outputs of the calibrated simulation model 3608.

The optimizer 3613 can be configured to run an optimization with one or multiple different optimization methods. The optimization could be a first-order method, e.g., gradient descent, when the calibrated simulation model 3608 is differentiable. The optimization could be a derivative-free optimization method, e.g., a Nelder-Mead and/or a Bayesian technique.

In some embodiments, the policy function selected by the policy function selector 3618 could be the rule 2208. The policy function could include input measurements, e.g., setpoint and angle of the sun. Furthermore, the policy function could include output actions, e.g., setting the blind position and/or adjusting the setpoint.

In some embodiments, for each combination of actions and measurements for a policy function 3622 provided by the policy function selector 361, the optimizer 3616 trains an appropriate policy function 3622. The policy function 3622 can be defined mathematically with initial weights. The optimizer 3616 can perform a policy optimization using the calibrated simulation model 3608 and training data to update the initial weights.

The twin manager 108 includes a policy function validator 3620 configured to validate the performance of each policy function 3622. The policy function validator 3620 can analyze each policy function 3622 to identify a score for each policy function 3622. The score can indicate number of constraint violations, energy consumption levels, comfort levels, carbon emissions levels, etc. The policy function validator 3620 can be configured to assess the performance of the policy function and select a particular policy function 3622. The policy function validator 3620 can be configured to compare the performance of the policy functions 3622 to a baseline and/or default policy. Furthermore, the policy function validator 3620 can identify a number of input and/or output variables and select a policy function 3622 with a low number of input and/or output variables. The policy function validator 3620 can select the highest performing policy function 3622, or a policy function 3622 that meets a particular score level, and provide the policy function 3622 to the policy function implementer 3624 for deployment. In some embodiments, the policy function validator 3620 can select a policy function 3622 with a highest performance that includes less than a particular number of input and/or output variables. In some embodiments, the policy validation is performed by simulating a policy function 3622 alongside a calibrated system model 3608.

In the following equations, $x_t$ can represents internal model states (that may or may not be measured in the real system) needed to run the simulation model 3608 forward in time. $x_t$ can include quantities like zone air temperature (measurable) or wall mass temperature (not measurable), but the exact values can be specific to each simulation model 3608. In addition, if the simulation model 3608 is based on a neural network, the $x_t$ variables may not have any physical significance.

In the following equations, $u_t$ represents the control actions that are taken by the policy function 2622 to affect a system. $u_t$ could include the zone temperature setpoint, blinds position command, etc. $y_t$ can represent outputs that are measured in the real system and are used in the objective function 3612 or constraints 3614. $y_t$ could include the zone temperature, supply airflow, energy consumption, etc. $\varepsilon_t$ can represent violation of constraints. For example, suppose there is an upper comfort limit of 75° F. for zone temperature. If the zone temperature is 76° F., then the constraint 3614 is violated, and $\varepsilon_t$ would be set to 1° F. By contrast, if the zone temperature is 74° F., then the constraint 3614 is satisfied, and $\varepsilon_t$ would be set to 0° F. $\theta$ can represent parameters of the policy function 3622. Values of $\theta$ can be optimized so as to minimize the predicted value of the objective function 3612.

The optimizer 3616 can be configured to minimize or maximize the objective function 3612. The optimizer 3616 can optimize parameters, $\theta$, that minimize or maximize the objective function 3612 and reduce violations of the constraint 3614 based on predictions of the calibrated simulation model 3608. The objective function 3612 could be:

$$\min_{\theta}\sum_{t} l_t(y_t, u_t, \varepsilon_t)$$

$l_t(y_t,u_t,\varepsilon_t)$ defines the objective function being minimized. For example, it could calculate energy consumption from the relevant variables in y and u. The constraint violations $\varepsilon$ are also included as an input so they can be appropriately penalized (via the appropriate scaling factor) if they occur.

The objective function 3612 could be optimized according to simulations made by the calibrated simulation model 3608 based on actions, $u_t$, determined by the policy function 3622. The calibrated simulation model 3608 could simulate a particular variable a time step into the future, $x_{t+1}$, based on the actions and the current state of the variable.

$$\text{Calibrated Simulation Function: } x_{t+1} = f_t(x_t, u_t)$$
$$y_t = h_t(x_t, u_t)$$

$f_t(x_t,u_t)$ can be the simulation model 3608 used to update the simulation state $x_t$ at each timestep based on the current time t and control action $u_t$. For example, the simulation model 3608 could include the differential equations used to describe heat transfer in a zone as well as any regulatory control logic that is included within the system (e.g., proportional integral (PI) controller logic to map zone temperature to a VAV flow rate). $h_t(x_t,u_t)$ can be the mapping from the full simulation state x to the observable outputs y. In many cases, y may just be a subset of x (so the function just extracts the relevant values), but other logic can be used (e.g., x could include temperature for multiple finite elements in the zone, while y includes just their average value). During model calibration, the functions $x'=f(x,u)$ and $y_t=h(x,u)$ are fit using historical data for u and y such that the predicted values of y match the historical values.

Furthermore, the policy function, which produces the various actions for input into the calibrated simulation model 3608, may define an action based on some parameter $\theta$, given a particular input measurement, $y_t$:

$$\text{Policy Function: } u_t = K_t(y_t, \theta)$$

$K_t(y_t,\theta)$ can be the mapping from current outputs to control actions. The system can learn the optimal values of $\theta$ so that the resulting closed-loop behavior of the system is performs higher than a level or is optimal.

Furthermore, the optimization performed by the optimizer 3616 can execute to minimize a particular number of constraint violations. The inputs to the constraint 3614, $y_t$ and $u_t$, can include outputs of the calibrated simulation model 3608.

$$\text{Constraints (Soft): } g_t(y_t, u_t) \le \varepsilon_t$$

$g_t(y_t,u_t)$ can calculate the values of constraints imposed on the problem (if any). The variable $\varepsilon$ can be zero if constraints are satisfied and nonzero if they are violated.

Because the optimization can be performed with the calibrated simulation model 3608, the policy parameters can be optimized using the calibrated simulation model 3608 without requiring actual control and feedback of building equipment. This can allows for speculative policies to be tested without incurring energy costs and/or comfort issues.

In some embodiments, the optimization can be an optimization with a goal to minimize the objective function 3612. The optimizer can optimize the policy parameters $\theta$. The optimization can include multiple features via specification of weights and/or constraint thresholds. The constraint thresholds could be to "minimize energy consumption subject to keeping comfort violation below 10° F.·hr/day." The objective function 3612 and constraint values can be the outputs of the calibrated simulation model 3608. Each profile can specified by different weights or values of thresholds. Each profile may have its own values for policy parameters determined in separate optimizations. The profiles can be specific objective functions 3612 (or multiple objective functions 3612 with specific values of weights for each component) consistent with given priorities.

As an example, suppose a system is minimizing energy use while maintaining comfort by adjusting the temperature setpoint of a local heater. Variables and equations could be as follows:

x: Zone Air Temperature, Zone Mass Temperature, Heater Controller State u: Heater Temperature Setpoint y: Zone Air Temperature, Heater Energy Consumption ∈: Temperature Upper Bound Violation, Temperature Lower Bound Violation f(x, u, t): ODE for Zone Air Temperature, ODE for Zone Mass Temperature, Logic for Heater Controller h(x, u): Copy Zone Temperature from x, Calculate Heater Energy Consumption from Heater Controller State g(x, u): Zone Temperature Upper Bound Check, Zone Temperature Lower Bound Check l(y, t): Heater Energy Consumption×Energy Cost+(Temperature Upper Bound Violation+Temperature Lower Bound Violation)×Discomfort Cost The policy function implementer 3624 can be configured to deploy a selected policy function selected by the policy function validator 3620. The selected policy function can be deployed into a control application 3630 and may, in some embodiments, be used to control equipment of the building in accordance with the policy function. The control application 3630 could be an application of the applications 110. In some embodiments, the policy function 3622 can be ingested into the building graph 3604. In some embodiments, the policy function can be saved into an artificial intelligence agent 570, and/or the output of the policy function may be used by an agent 570 to perform functions. In some embodiments, the policy function can be included within a high level digital twin 3628.

In some embodiments, input measurements can be provided to a digital twin and the policy function 3622 can be output according to the description of FIG. 36. The digital twin could make the policy function a trigger and/or action of the digital twin. In some embodiments, the policy function can be included with a high level/solution digital twin instead of the underlying digital twins of the high level/solution digital twin. In some embodiments, responsive to a policy being triggered, the high level/solution digital twin could push down actions of the policy to lower level digital twins for implementation. In some embodiments, the triggers of the digital twins could be monitoring a condition of the digital twin and/or subscribing to messages of other digital twins for other measurements to determine whether to trigger and action of the digital twin.

Figure 37:
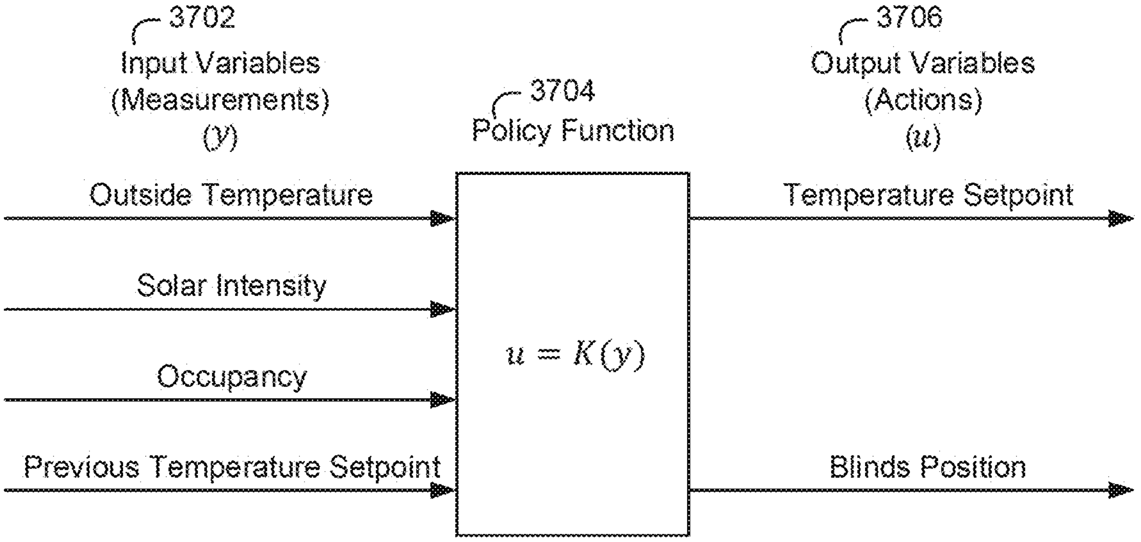
FIG. 37 is a block diagram of an example of the policy function of FIG. 36, according to an exemplary embodiment.

Referring now to FIG. 37, a policy function 3704 is shown, according to an exemplary embodiment. The policy function 3704 may be a mathematical mapping of measurements, e.g., input variables 3702, to actions, e.g., output variables 3706. The policy function 3704 may have various levels of complexity. For example, the policy function 3704 could be a proportional, linear, logarithmic, and/or exponential mathematical equation. Furthermore, the policy function 3704 could be a machine learning model, e.g., a neural network, a deep neural network with multiple neural network layers, a decision tree, an artificial intelligence, etc.

In some cases, the more complex the policy function 3704, the more likely the policy function 3704 is to misbehave. In this regard, the twin manager 108 can cause the policy function 3704 to include only those inputs that have a significant impact on the outputs 3706. In some embodiments, the twin manager 108 can cause the policy function 3704 to include only those inputs and outputs that have the most impact on the performance of the policy function 3704, e.g., cause a high score to be reached and/or a low number of constraint violations to occur when optimized. Variables that are not helpful in generating the policy function 3704, e.g., have little effect on policy function 3704, can be omitted.

The input variables 3702 can be various measurements for a particular room entity, e.g., the entity that a simulation model is selected for based on the building graph 3604. The input variables can be outside temperature, solar intensity, occupancy, a previous temperature setpoint, etc. The policy function 3704 can, in some embodiments, receive only direct measurements of the input variables 3702, e.g., the current or most recent measurement. The policy function 3704 may not consider a past history of values of the input variables 3702, in order to keep the policy function 3704 less complex. The policy function 3704 can be limited to a complexity level such that a user can understand the policy function 3704 through review, e.g., may include less than five inputs and no more than three outputs, include less than four inputs and no more than two outputs, include only one to three input variables for each output variable, etc. The various input variables 3702 can be run through the policy function 3704 based on one or more trained parameters to generate the output variables 3706.

Figure 38:
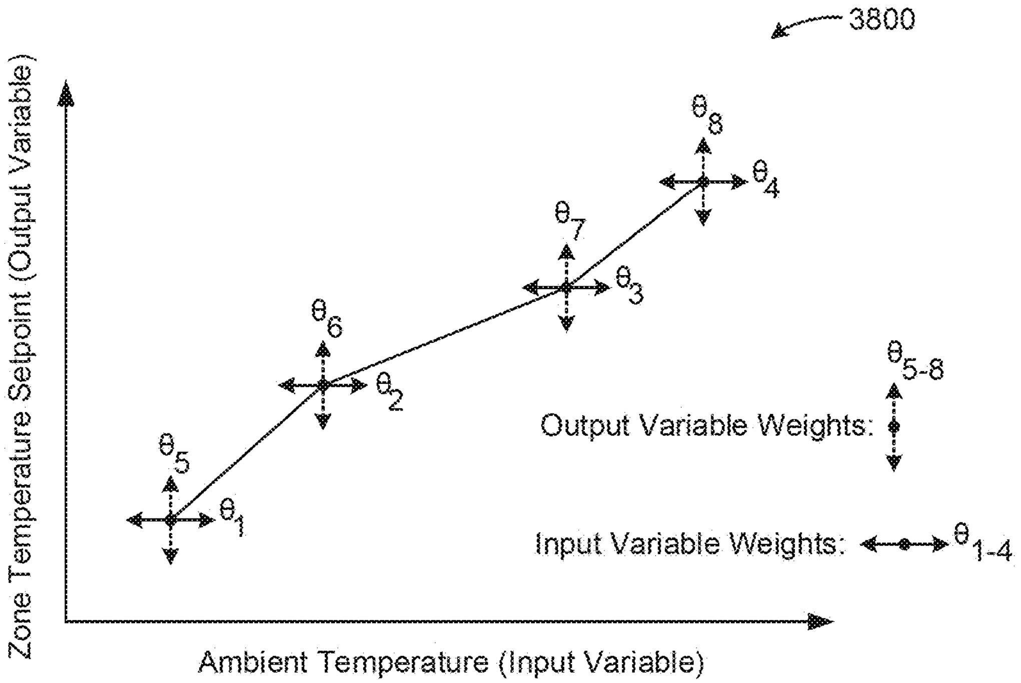
FIG. 38 is a chart illustrating a linear piece-wise policy function, according to an exemplary embodiment.

Referring now to FIG. 38, a chart 3800 illustrating a piece-wise policy function is shown, according to an exemplary embodiment. In some embodiments, for a template application, a policy function can be defined via input and output variables with adjustable weights that changing a mapping of input and output variables. The policy function may be a piece-wise linear mapping as shown in the chart 3800. The piece-wise linear mapping illustrates a relationship between an input, ambient temperature on the x-axis, and an output, zone temperature setpoint, on the y-axis. The chart 3800 indicates an optimization for ambient temperature setpoint. The optimization can identify values for the input variable weights $\theta_{1-4}$ and output variable weights $\theta_{5-8}$. Each node of the piece-wise function can be defined by a pair of weights that control the location of the node in the x and y directions, e.g., $\theta_1$ and $\theta_5$, $\theta_2$ and $\theta_6$, etc.

While four nodes are shown in the chart 3800 for three separate pieces of the piece-wise linear function, more or less nodes may be included in some embodiments. For a fixed number of pieces, n, there may be 2(n+1) parameters. The piece-wise nature of the policy function can be templatized. This structure may facilitate understandability and explainability for a user and reduce complexity of training the policy function. In some embodiments, the chart 3800 can be displayed to a user via user interface via the user device 176. A user can, in some embodiments, adjust the locations of the nodes of the graph via the user device 176, thus changing the parameter pairs and adjusting the piece-wise linear function.

In some embodiments, each output variable of a policy function includes a different curve. Each curve may, in some embodiments, relate one or multiple input variables to an output variable through a piece-wise function. In some embodiments, instead of being a two dimensional function, e.g., only one input and one output variable, the piece-wise function could be three dimensional, e.g., two input variables and one output variable. Furthermore, various higher dimensional functions can be defined. In some embodiments, the template for the policy function may have a default set of parameters used to establish a value. In some embodiments, an optimized policy is only useful if it improves performance of a default policy function.

Figure 39:
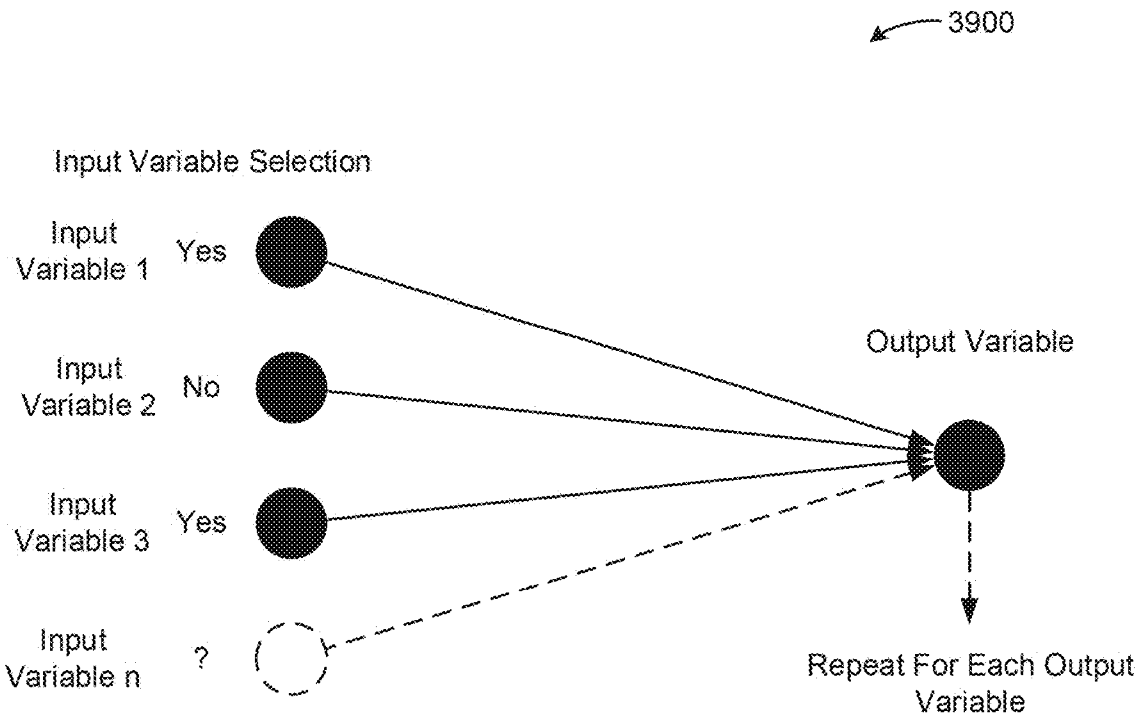
FIG. 39 is a chart illustrating an iterative analysis of input and output variables to identify input and output variables for the policy function of FIG. 36, according to an exemplary embodiment.

Referring now to FIG. 39, a chart 3900 illustrating an iterative analysis of input and output variables to identify input and output variables for the policy function 3622 is shown, according to an exemplary embodiment. In some cases, the twin manager 108 may generate the policy function 3622 to include only input variables that are important. Unimportant variables may add complexity, complicate training, and can lead to noise in outputs. In this regard, the twin manager 108 can iteratively optimize a policy function to determine parameters with different sets of variables and compare the performance of each optimization. In FIG. 39, a first variable is identified to be significant, a second variable insignificant, and a third variable significant. The process for selecting input variables can be repeated for each output variable, in some embodiments.

In some embodiments, the twin manager 108 uses a greedy approach to select which input variables are selected for an output variable. First, the twin manager 108 can consider one-variable policies between some or all of the input variables and the output variable. The twin manager 108 can select one variable that is the highest performing variable and proceed to considering two variable policies. The twin manager 108 can consider the selected variable with some or all other variables and select the best two variable policy. This process can proceed with selecting additional combinations of variables until a performance of the policy function plateaus and/or reaches a particular level.

In some embodiments, instead of using the greedy approach, the twin manager 108 can be configured to identify every possible combination of input variables and then optimize the policy function 3704 for each combination and select the highest performing policy function. This approach may, in some cases, be feasible and/or appropriate for ten variables or less. In some embodiments, each output variable can include unique input variables or each output variable can share one or more input variables. In some embodiments, the variables that are unavailable for a particular instance may be excluded from the policy function 3704. In some embodiments, the twin manager 108 can deploy the best policy function, accounting for both performance and complexity.

Figure 40:
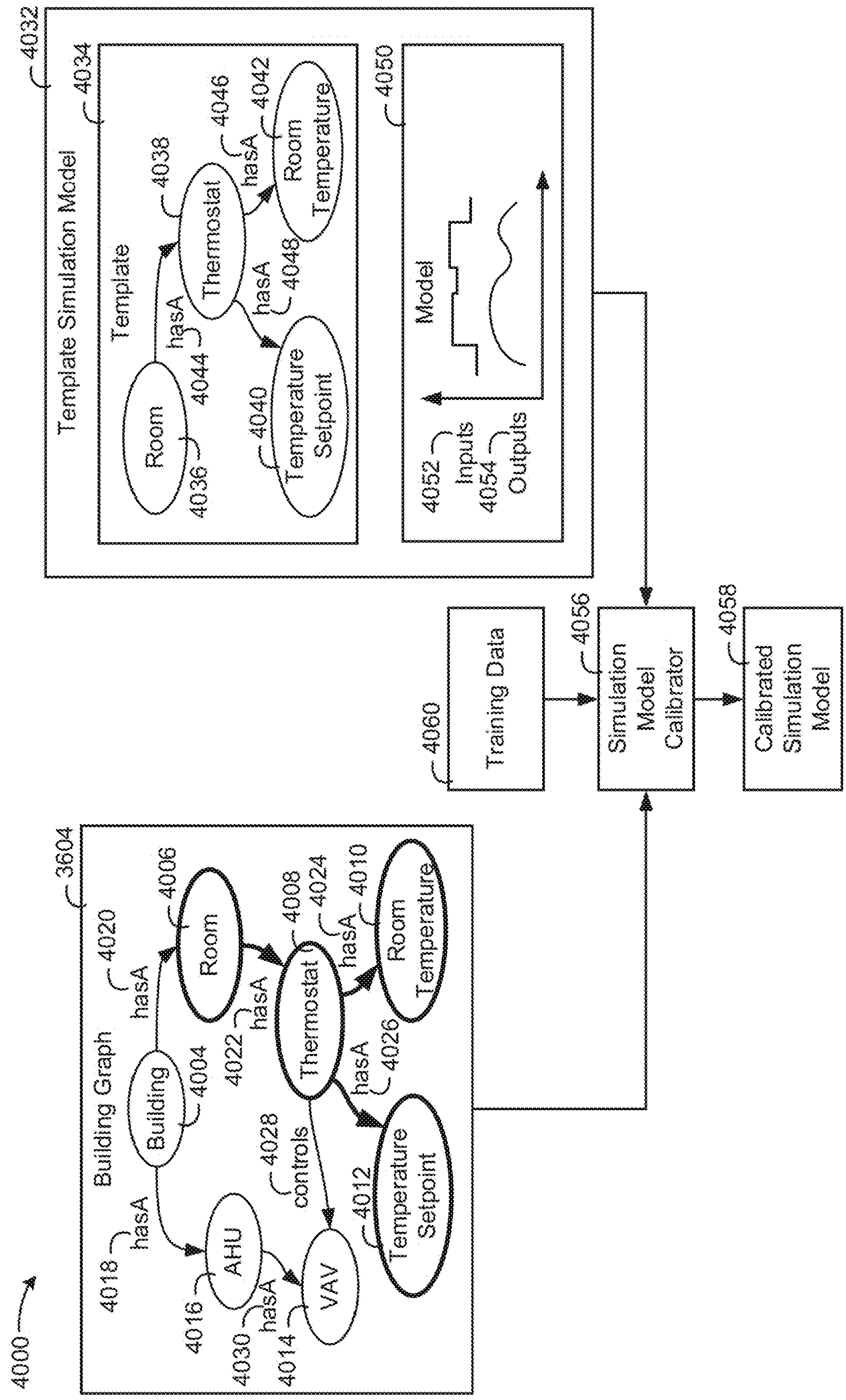
FIG. 40 is a block diagram of the calibration model of FIG. 36 being trained, according to an exemplary embodiment.

Referring now to FIG. 40, a block diagram 4000 of the calibration model 3608 of FIG. 36 being trained is shown, according to an exemplary embodiment. The twin manager 108 can select an instance of an entity and/or entities from the building graph 3604 based on a template 4034 of the template simulation model 4032. The template 4034 can be a query, e.g., a graph query, a SPARQL query, etc. In some embodiments, the template 4034 may be graphically defined via one or more nodes and edges.

The building graph 3604 can include nodes 4004-4016 and edges 4018-4030. The building graph 3604 includes a building node 4004 representing a building. The building includes a room indicated by a room node 4006 linked between the building node 4004 and the room node 4006 via a “hasA” edge 4020. The building further includes an AHU indicated by an AHU node 4016 being connected to the building node 4004 via a “hasA” edge 4018. The AHU includes a VAV, indicated by a VAV node 4014 being connected to the AHU node 4016 via a “hasA” edge 4030.

The room includes a thermostat, indicated by a thermostat node 4008 linked to the room node 4006 via a “hasA” edge 4022. The thermostat may control the VAV, indicated by the thermostat node 4008 being linked to the VAV node 4014 via the “controls” edge 4028. The thermostat can include multiple points. For example, a temperature setpoint and a room temperature. This is shown via the thermostat node 4008 being connected to a temperature setpoint node 4012 via a “hasA” edge 4026 and the thermostat node 4008 being connected to a room temperature node 4010 via a “hasA” edge 4024.

The twin manager 108 can compare the template 4034 against the building graph 3604 and identify an instance in the building graph, a collection of nodes and edges, indicating one or multiple nodes that the template simulation model 4032 can be implemented. The template 4034 can specify a room node 4036 connected to a thermostat node 4038 via a “hasA” edge 4044. The thermostat node 4038 can be connected to a temperature setpoint node 4040 via a “hasA” edge 4048 and to a room temperature node 4042 via a “hasA” edge 4046. This template 4034 can be compared against the building graph 3604 to identify nodes 4006-4012 and edges 4022-4026 that match the template 4034. In some embodiments, the template simulation model 4032 can put restrictions on available data, e.g., select an instance only if it has a particular amount of training data available for the instance.

Each application may have its own simulation model. For example, the template simulation model 4032 can include a model 4050 that simulates one or more outputs 4054 based on one or more inputs 4052. For example, the model 4050 could simulate indoor temperature of a room based on a setpoint of the room and/or outdoor temperature. The model 4050 could simulate room illuminance for the room based on shade position, sun position, cloud cover level, etc. In some embodiments, the model 4050 is a grey box physics-based model. In some embodiments, the model 4050 is a black box neural-network.

In some embodiments, the simulation model calibrator 4056 can tune the parameters of the model 4050 based on training data 4060. The training data 4060 can be data for the particular instance selected in the building graph 3604. In some embodiments, the training data 4060 is retrieved from a timeseries database and/or from the building graph 3604 itself. If sufficient training data is not available for training the model 4050, the simulation model calibrator 4056 may utilize a pre-trained model or a model calibrated for a different instance of entities of the building graph 3604. In some embodiments, the twin manager 108 can perform validation of the model, but can use less data than needed for full training. Once the model 4050 is fitted, the calibrated simulation model 4058 can be used to guide policy optimization to generate and/or train a policy function.

Figure 41:
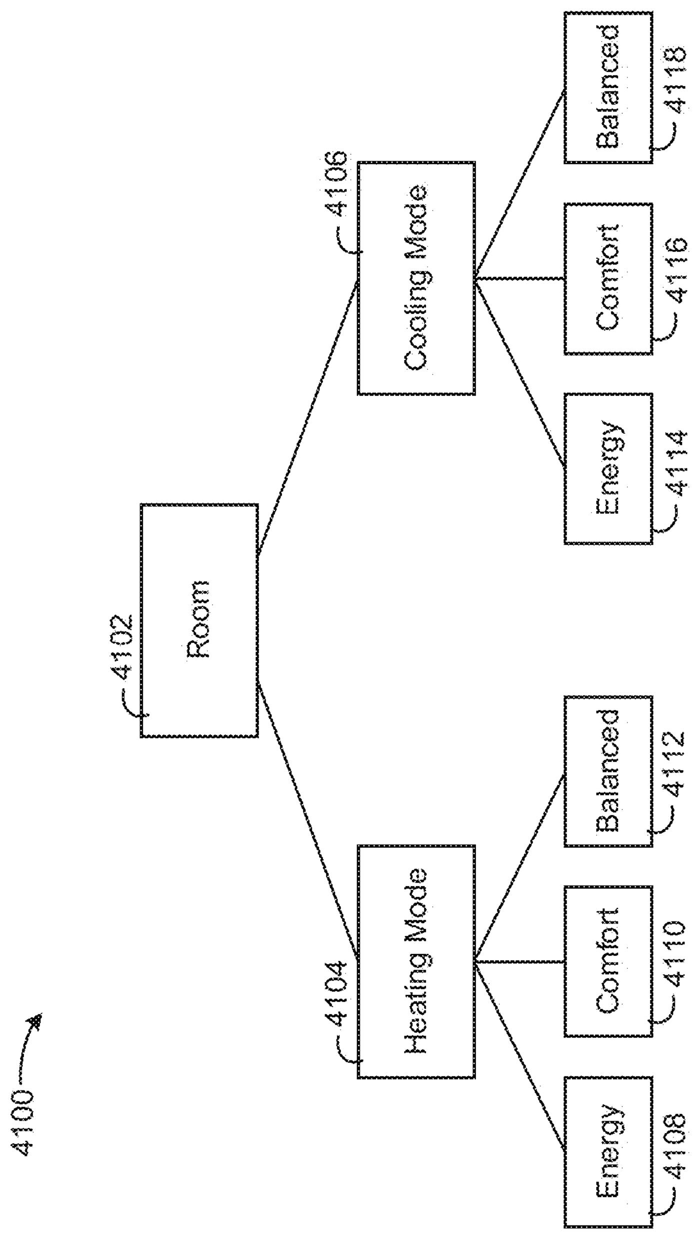
FIG. 41 is a block diagram of situational policies, according to an exemplary embodiment.

Referring now to FIG. 41, is a block diagram 4100 of situational policy is shown, according to an exemplary embodiment. In some embodiments, the twin manager 108 can define situational policy functions that only apply in certain circumstances. These situational policies can reflect system operation for various operational modes or states of an entity, e.g., a heating mode 4104 or a cooling mode 4106 for the room 4102. Each state can be associated with an objective function that provides a different prioritization of goals. For example, there may be a policy that is for energy 4108, for comfort 4110, or is balanced 4112 for the heating mode 4104. There may be another policy for energy 4114, for comfort 4116, or is balanced 4118 for the cooling mode 4106. These differences in priority may reflect user preferences for the heating mode 4104 and the cooling mode 4106 respectively.

In some embodiments, training data for a specific policy for a specific mode or state may only include data collected while the entity or entities were in the specific mode and/or state. For example, only winter data may be used for training the policy function for the heating mode while only summer data may be used for training the policy function for the cooling mode. For various user preferences, the policy training could use different objective function weights or constraint thresholds. For example, the weights could be 90% energy+10% comfort for the energy-minimization or 50% energy+50% comfort for balanced optimizations. The appropriate policy could be selected at runtime with a set of possible policy functions stored in a digital twin. In some embodiments, a user could select the specific profile based on their current preferences, and the corresponding policy can be automatically be implemented.

Figure 42:
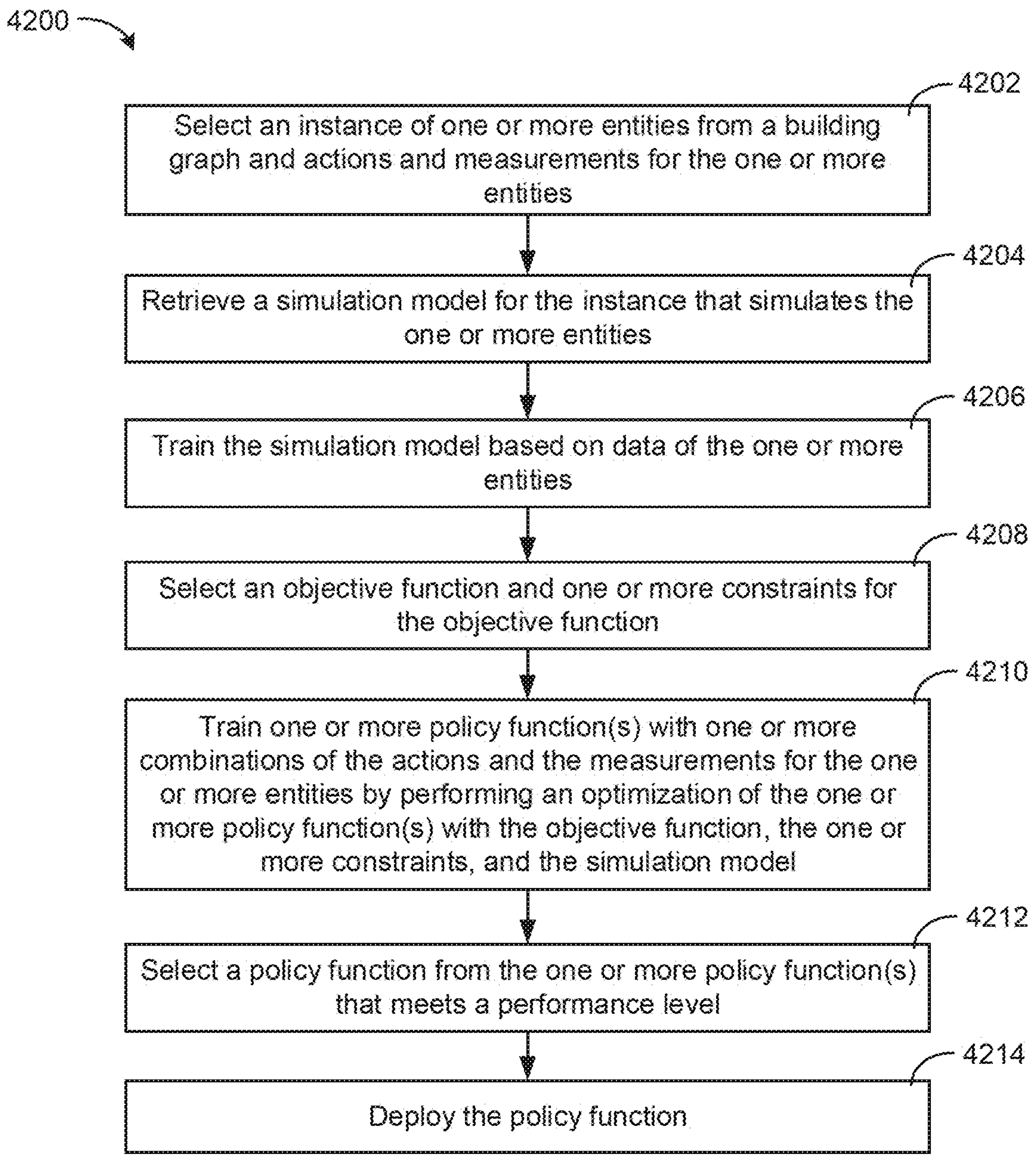
FIG. 42 is a flow diagram of a process of implementing a simulation model and an objective function to perform an optimization to learn a policy function, according to an exemplary embodiment.

Referring now to FIG. 42, a process 4200 of implementing a simulation model and objective function to perform an optimization to learn a policy function is shown, according to an exemplary embodiment. The process 4200 can be performed by the twin manager 108. Furthermore, any computing device described herein can be configured to perform the process 4200.

In step 4202, the process 4200 can select an instance of one or more entities from the building graph 3604 and actions and/or measurements for the one or more entities. The particular instance of the one or more entities can be selected based on indications of a simulation model that simulates behavior of the one or more entities. The actions and/or measurements can be defined by template simulation models 3602. The template may identify actions and/or measurements for the one or more entities and the twin manager 108 can identify whether the particular instance of the entities includes the particular actions and/or measurements. The twin manager 108 can select the actions and/or measurements defined by the template simulation models 3602 that are available for the instance of the one or more entities.

In step 4204, the twin manager 108 can retrieve a simulation model for the instance of the one or more entities, where the simulation model simulates the one or more entities. In some embodiments, the simulation model simulates the actions and/or measurements for the one or more entities, e.g., how specific actions affect conditions that are measured. In step 4206, the twin manager 108 can train the simulation model based on data of the one or more entities. For example, the model may be pre-trained and tuned based on the data for the one or more entities in order to cause the model to generate predictions specific to the one or more entities.

In step 4208, the twin manager 108 can select an objective function 3612 and one or more constraints 3614 for the objective function 3612. The objective function 3612 can prioritize a particular outcome and/or balance one or more outcomes, e.g., energy consumption, cost, carbon emissions, air quality, occupant comfort, etc.

In step 4210, the twin manager 108 can train one or more policy functions 3622 with one or more combinations of the actions and the measurements for the one or more entities by performing an optimization of the one or more policy functions 3622 with the objective function 3612, the one or more constraints 3614, and the simulation model 3608. The twin manager 108 can identify actions of the policy functions 3622 and simulate the behavior of the one or more entities based on the actions and/or one or more measurements. The result may be a prediction of the behavior, e.g., changes in the one or more measurements. The parameters of the policy functions 3622 can be optimized to maximize or minimize the objective function 3612 and/or minimize a number of constraint violations of the constraints 3614.

In step 4212, the policy functions 3622 can be analyzed by the twin manager 108. The twin manager 108 can select the policy function 3622 that provides the best optimization (or an optimization of a particular level) of the objective function 3612 and/or provides the least (or less than a particular number) of constraint violations. The selected policy function 3622 can be deployed, e.g., added into a digital twin, in step 4214.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

In various implementations, the steps and operations described herein may be performed on one processor or in a combination of two or more processors. For example, in some implementations, the various operations could be performed in a central server or set of central servers configured to receive data from one or more devices (e.g., edge computing devices/controllers) and perform the operations. In some implementations, the operations may be performed by one or more local controllers or computing devices (e.g., edge devices), such as controllers dedicated to and/or located within a particular building or portion of a building. In some implementations, the operations may be performed by a combination of one or more central or offsite computing devices/servers and one or more local controllers/computing devices. All such implementations are contemplated within the scope of the present disclosure. Further, unless otherwise indicated, when the present disclosure refers to one or more computer-readable storage media and/or one or more controllers, such computer-readable storage media and/or one or more controllers may be implemented as one or more central servers, one or more local controllers or computing devices (e.g., edge devices), any combination thereof, or any other combination of storage media and/or controllers regardless of the location of such devices.

What is claimed:

1. A building system of a building comprising one or more memory devices including instructions stored thereon that, when executed by one or more processors, cause the one or more processors to:

select an instance of one or more entities of one or more particular entity types from a digital twin of the building for creating a policy function, the digital twin including representations of a plurality of entities of the building and relationships between the plurality of entities of the building;

perform an optimization that learns the policy function by selecting one or more inputs for the policy function from a plurality of inputs identified as associated with the one or more entities based on the digital twin, selecting one or more actions for the policy function from a plurality of actions identified as associated with the one or more entities based on the digital twin, and identifying one or more parameters for the policy function; and deploy the policy function for the one or more entities by causing the digital twin to include the policy function.

2. The building system of claim 1, wherein the policy function generates first values for the one or more actions based on the one or more parameters and second values of the one or more inputs.

3. The building system of claim 1, wherein the instructions cause the one or more processors to perform the optimization by:

performing a plurality of first optimizations each with a single input of the plurality of inputs and one action of the plurality of actions;

selecting a first input of the plurality of inputs associated with a highest performance indicated by the plurality of first optimizations;

performing a plurality of second optimizations with the first input and another single input of the plurality of inputs; and selecting a pair of the first input and a second input of the plurality of inputs, the pair associated with another highest performance indicated by the plurality of second optimizations.

4. The building system of claim 1, wherein the instructions cause the one or more processors to:

generate a plurality of combinations of the plurality of inputs and the plurality of actions;

perform a plurality of optimizations on the plurality of combinations; and select one combination of the plurality of combinations for the policy function, the one combination associated with a highest performance indicated by the plurality of optimizations.

5. The building system of claim 1, wherein the digital twin executes the policy function by generating first values for the one or more actions of the policy function based on second values of the one or more inputs, the first values of the one or more actions causing one or more devices of the building to control environmental conditions of the building.

6. The building system of claim 1, wherein the instructions cause the one or more processors to:

perform a first set of optimizations to identify one or more first inputs of the plurality of inputs to determine a first action of the plurality of actions for the policy function; and perform a second set of optimizations to identify one or more second inputs of the plurality of inputs to determine a second action of the plurality of actions for the policy function.

7. The building system of claim 1, wherein the instructions cause the one or more processors to:

generate a first policy function based on the optimization for a first state of the one or more entities, the first policy function trained to optimize one or more first goals; and generate a second policy function based on the optimization for a second state of the one or more entities, the second policy function trained to optimize one or more second goals different from the one or more first goals.

8. The building system of claim 1, wherein the policy function is a piece-wise function including a plurality of pieces relating the one or more inputs to the one or more actions;

wherein the plurality of pieces are defined based on the one or more parameters of the policy function.

9. The building system of claim 1, wherein the instructions cause the one or more processors to perform the optimization by maximizing or minimizing an objective function based on one or more constraints.

10. The building system of claim 9, wherein the objective function indicates at least one of, or a weighted combination of, occupant comfort or energy consumption.

11. The building system of claim 1, wherein the instructions cause the one or more processors to:

select a simulation model that simulates behavior of the one or more entities; and train the simulation model based on at least one of timeseries data or metadata of the one or more entities;

wherein the instructions cause the one or more processors to perform the optimization based on simulating the behavior of the one or more entities with the simulation model.

12. The building system of claim 11, wherein the simulation model is linked to a template indicating the one or more particular entity types that the simulation model performs a simulation for.

13. The building system of claim 11, wherein the simulation model is a pre-trained model;

wherein the instructions cause the one or more processors to train the simulation model based on the timeseries data or the metadata of the one or more entities to tune the simulation model to perform simulations specific to the one or more entities.

14. The building system of claim 11, wherein the instructions cause the one or more processors to:

simulate the behavior of the one or more entities with the simulation model based on values of the one or more actions; and optimize an objective function with one or more constraints based on the behavior of the one or more entities simulated by the simulation model for the one or more actions.

15. A method, comprising:

selecting, by one or more processing circuits, an instance of one or more entities of one or more particular entity types from a digital twin of a building for creating a policy function, the digital twin including representations of a plurality of entities of the building and relationships between the plurality of entities of the building;

performing, by the one or more processing circuits, an optimization that learns the policy function by selecting one or more inputs for the policy function from a plurality of inputs identified as associated with the one or more entities based on the digital twin, selecting one or more actions for the policy function from a plurality of actions identified as associated with the one or more entities based on the digital twin, and identifying one or more parameters for the policy function; and deploying, by the one or more processing circuits, the policy function for the one or more entities by causing the digital twin to include the policy function.

16. The method of claim 15, wherein the policy function generates first values for the one or more actions based on the one or more parameters and second values of the one or more inputs.

17. The method of claim 15, comprising:

performing, by the one or more processing circuits by:

performing a plurality of first optimizations each with a single input of the plurality of inputs and one action of the plurality of actions;

selecting a first input of the plurality of inputs associated with a highest performance indicated by the plurality of first optimizations;

performing a plurality of second optimizations with the first input and another single input of the plurality of inputs; and selecting a pair of the first input and a second input of the plurality of inputs, the pair associated with another highest performance indicated by the plurality of second optimizations.

18. The method of claim 15, comprising:

generating, by the one or more processing circuits, a plurality of combinations of the plurality of inputs and the plurality of actions;

performing, by the one or more processing circuits, a plurality of optimizations on the plurality of combinations; and selecting, by the one or more processing circuits, one combination of the plurality of combinations for the policy function, the one combination associated with a highest performance indicated by the plurality of optimizations.

19. The method of claim 15, comprising:

selecting, by the one or more processing circuits, a simulation model that simulates a behavior of the one or more entities; and training, by the one or more processing circuits the simulation model based on at least one of timeseries data or metadata of the one or more entities.

20. One or more non-transitory storage medium storing instructions thereon, that, when executed by one or more processors, cause the one or more processors to:

select an instance of one or more entities of one or more particular entity types from a digital twin of a building for creating a policy function, the digital twin including representations of a plurality of entities of the building and relationships between the plurality of entities of the building;

perform an optimization that learns the policy function by selecting one or more inputs for the policy function from a plurality of inputs identified as associated with the one or more entities based on the digital twin, selecting one or more actions for the policy function from a plurality of actions identified as associated with the one or more entities based on the digital twin, and identifying one or more parameters for the policy function; and deploy the policy function for the one or more entities by causing the digital twin to include the policy function.

* * * * *